(12) United States Patent
Shiflett et al.

(10) Patent No.: US 8,568,608 B2
(45) Date of Patent: Oct. 29, 2013

(54) VAPOR COMPRESSION CYCLE UTILIZING IONIC LIQUID AS COMPRESSOR LUBRICANT

(75) Inventors: Mark Brandon Shiflett, New Castle, DE (US); Akimichi Yokozeki, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1765 days.

(21) Appl. No.: 11/755,950

(22) Filed: May 31, 2007

(65) Prior Publication Data

US 2007/0295478 A1    Dec. 27, 2007

Related U.S. Application Data

(60) Provisional application No. 60/809,622, filed on May 31, 2006.

(51) Int. Cl.
C09K 5/04 (2006.01)
F25D 11/00 (2006.01)

(52) U.S. Cl.
USPC ............... 252/68; 252/364; 62/119; 62/84; 62/468

(58) Field of Classification Search
USPC .................... 252/68, 364; 62/119, 84, 468
See application file for complete search history.

(56) References Cited

U.S. PATENT DOCUMENTS

| | | | |
|---|---|---|---|
| 4,388,812 | A | 6/1983 | Clark |
| 5,827,602 | A | 10/1998 | Koch |
| 6,579,343 | B2 | 6/2003 | Brennecke |
| 7,208,605 | B2 | 4/2007 | Davis |
| 7,297,289 | B2 | 11/2007 | Sato |
| 7,709,635 | B2 | 5/2010 | Davis |
| 7,744,838 | B2 | 6/2010 | Davis |
| 7,765,823 | B2 | 8/2010 | Shiflett |
| 8,318,644 | B2 | 11/2012 | Kamimura |
| 2002/0015883 | A1 | 2/2002 | Hilarius |
| 2002/0015884 | A1 | 2/2002 | Schmidt |
| 2004/0035293 | A1 | 2/2004 | Davis |
| 2004/0133058 | A1 | 7/2004 | Arlt et al. |
| 2005/0222411 | A1* | 10/2005 | Ignatyev et al. ............... 544/224 |
| 2006/0197053 | A1* | 9/2006 | Shiflett et al. ................... 252/67 |
| 2006/0251961 | A1 | 11/2006 | Olbert et al. |
| 2007/0019708 | A1 | 1/2007 | Shiflett et al. |
| 2007/0131535 | A1 | 6/2007 | Shiflett et al. |
| 2007/0144186 | A1 | 6/2007 | Shiflett et al. |
| 2007/0284078 | A1* | 12/2007 | Leck et al. ...................... 165/58 |
| 2007/0284555 | A1* | 12/2007 | Leck et al. ...................... 252/68 |
| 2007/0295478 | A1 | 12/2007 | Shiflett et al. |
| 2008/0028777 | A1 | 2/2008 | Boesmann et al. |
| 2008/0153697 | A1 | 6/2008 | Shiflett et al. |
| 2008/0293978 | A1 | 11/2008 | Shiflett |
| 2009/0131728 | A1 | 5/2009 | Shiflett |
| 2010/0095703 | A1 | 4/2010 | Jork |
| 2010/0145073 | A1 | 6/2010 | Foo |
| 2010/0145074 | A1 | 6/2010 | Foo |
| 2010/0152465 | A1 | 6/2010 | Davis |
| 2010/0200799 | A1* | 8/2010 | Mouli ............................. 252/68 |
| 2011/0005723 | A1* | 1/2011 | Mouli ....................... 165/104.21 |

FOREIGN PATENT DOCUMENTS

| | | |
|---|---|---|
| EP | 1 672 051 A1 | 6/2006 |
| JP | 2005/154755 | 6/2005 |
| JP | 2006/037826 | 2/2006 |
| JP | 2006-037826 | 2/2006 |
| WO | WO 2005/035702 A1 | 4/2005 |
| WO | WO 2005/113702 A1 | 12/2005 |
| WO | WO 2005113702 A1 * | 12/2005 |
| WO | WO 2006/029884 A1 | 3/2006 |
| WO | WO 2006/133815 A1 | 12/2006 |
| WO | WO 2007070607 A2 * | 6/2007 |
| WO | WO 2007126760 A2 * | 11/2007 |
| WO | WO 2007143051 A2 * | 12/2007 |

OTHER PUBLICATIONS

CAS Reg. No. 1547-26-8, Nov. 16, 1984.*
CAS Reg. No. 374683-43-9, Dec. 11, 2001.*
CAS Reg. No. 172870-67-6, Feb. 2, 1996.*
U.S. Appl. No. 60/732,581, filed Nov. 1, 2005, Allen Capron Sievert et al.
U.S. Appl. No. 60/876,406, filed Dec. 21, 2006, Donald Bernard Bivens.
Ye et al., Room-Temperature Ionic Liquids: A Novel Versatile Lubricant, Chem. Comm., 2001, vol. 21:2244-2245.
Wang et al., Friction and Wear Behaviors of Ionic Liquid of Alkylimidazolium Hexafluorophosphates as Lubricants for Steel/Steel Contact, Wear, 2004, vol. 256:44-48.
Rogers et al., Ionic Liquids—Solvents of the Future?, Science, 2003, vol. 302:792-793.
Kenneth R. Seddon, Ionic Liquids for Clean Technology, J. Chem. Tech. Biotechnol., 1997, vol. 68:351-356.
Olivier et al., Nonaqueous Room-Temperature Ionic Liquids: A New Class of Solvents for Catalytic Reactions, Chem. Ind., 1996, vol. 68:249-263.
John E. Enderby, Ionic Liquids: Recent Progress and Remaining Problems, J. Phys. Condensed Matter., 1993, vol. 5:B99-B106.
Michael Freemantle, Designer Solvents: Ionic Liquids May Bost Clean Technology Development, Chemical and Engineering News, 1998, pp. 32-37.
Gordon et al., Ionic Liquid Crystals: Hexafluorophosphate Salts, J. Mater. Chem., 1998, vol. 8:2627-2636.
Thomas Welton, Room-Temperature Ionic Liquids. Solvents for Synthesis and Catalysis, Chem. Rev., 1999, vol. 99:2071-2084.
Xu et al., Fluoroalkylated N-Heterocyclic Carbene Complexes of Palladium, Journal of Organometallic Chemistry, 2000, vol. 598:409-416.
F.E. Pinkerton et al., High-Pressure Gravimetric Measurement of Hydrogen Capacity in Vapor-Grown Carbon Nanofibers and Related Materials, Proceedings of The 11th Canadian Hydrogen Conference, 2001, pp. 633-642.
Shiflett et al., Solubilities and Diffusivities of Carbon Dioxide in Ionic Liquids: [bmin][PF6] and [BMIN][BF4]Ind. Eng. Chem. Research, 2005, vol. 44:4453-4464.
Yokozeki, Time-Dependent Behavior of Gas Absorption in Lubricant Oil, Int. J. Refrigeration, 2002, vol. 22:695-704.
International Search Report and Written Opinion in PCT/US2007/012866 (May 6, 2008).

* cited by examiner

*Primary Examiner* — Douglas McGinty

(57) ABSTRACT

This invention relates to the use of ionic liquids as lubricants in vapor compression systems for cooling or heating. This invention also relates to an apparatus for adjusting temperature that operates a vapor compression cycle.

18 Claims, 18 Drawing Sheets

Figure 1 – A schematic diagram of a simple vapor compression cycle

Figure 2 –

Solubility of difluoromethane (HFC-32) in 1-butyl-3-methylimidazolium hexafluorophosphate ([bmim][PF$_6$])

Solubility of pentafluoroethane (HFC-125) in 1-butyl-3-methylimidazolium hexafluorophosphate ([bmim][PF$_6$])

Solubility of 1,1,1,2-tetrafluoroethane (HFC-134a) in 1-butyl-3-methylimidazolium hexafluorophosphate ([bmim][PF$_6$])

Solubility of 1,1,1-trifluoroethane (HFC-143a) in 1-butyl-3-methylimidazolium hexafluorophosphate ([bmim][PF$_6$])

Solubility of 1,1-difluoroethane (HFC-152a) in 1-butyl-3-methylimidazolium hexafluorophosphate ([bmim][PF$_6$])

Solubility of difluoromethane (HFC-32) in 1-butyl-3-methylimidazolium tetrafluoroborate ([bmim][BF$_4$])

Solubility of trifluoromethane (HFC-23) in 1-butyl-3-methylimidazolium hexafluorophosphate ([bmim][PF$_6$]).

Solubility of trifluoromethane (HFC-23) in 1-ethyl-3-methylimidazolium tetrafluoroborate ([emim][PF$_6$])

Solubility of difluoromethane (HFC-32) in 1, 2-dimethyl-3-propylimidazolium tris(trifluoromethylsulfonyl) methide ([dmpim][TMeM])

Solubility of difluoromethane (HFC-32) in 1-ethyl-3-methylimidazolium bis(pentafluoroethylsulfonyl)imide ([emim][BEI])

Solubility of difluoromethane (HFC-32) in 1-ethyl-3-methylimidazolium bis(trifluoroethylsulfonyl)imide ([emim][BMeI])

Solubility of difluoromethane (HFC-32) in 1-methyl-3-propylpyridinium bis(trifluoroethylsulfonyl)imide ([pmpy][BMeI])

Solubility of difluoromethane (HFC-32) in 1-butyl-3-methylpyridinium bis(trifluoroethylsulfonyl)imide ([bmpy][BMeI])

Isotherm Comparison of Difluoromethane (HFC-32) and Imidazolium based Ionic Liquids at 25 °C

P/P₀ versus mole fraction.

In the figure, R is "HFC".

Figure 18- A schematic diagram of the gravimetric microbalance
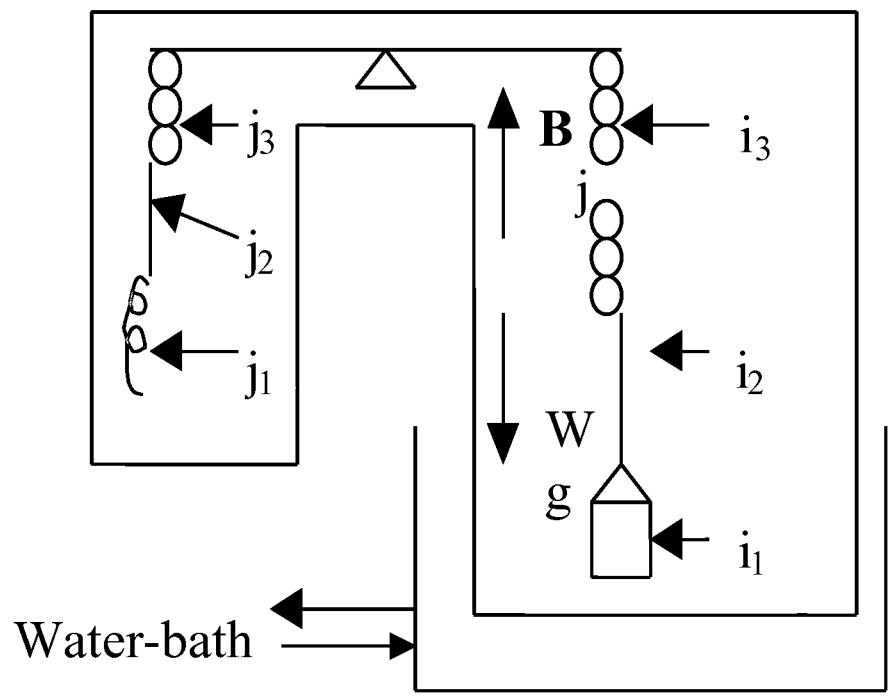

VAPOR COMPRESSION CYCLE UTILIZING IONIC LIQUID AS COMPRESSOR LUBRICANT

This application claims the benefit of U.S. Provisional Application No. 60/809,622, filed May 31, 2006, which is incorporated in its entirety as a part hereof for all purposes.

TECHNICAL FIELD

This invention relates to the operation or execution of a vapor compression cycle using a compressor, wherein at least one ionic liquid is provided as a lubricant for the compressor.

BACKGROUND

Many refrigeration, heating and air-cooling and air-heating systems operate using a vapor compression cycle. This cycle consists of compressing refrigerant gas from a low pressure to a high pressure. The high-pressure gas exits a device used for increasing the pressure of the refrigerant, typically a compressor, and is condensed to a liquid, typically by a heat exchanger called a condenser, where heat is removed from the refrigerant. The high-pressure liquid refrigerant is lowered in pressure through an expansion device (valve or capillary tube) and the refrigerant liquid expands to a gas through a second heat exchanger called an evaporator where heat is absorbed by the refrigerant. This process of removing and absorbing heat produces a heating and cooling affect, which can be used for refrigeration, air-conditioning, and heating.

While all of these steps are important, the compression step is a crucial part of the cycle (Fluorocarbon Refrigerants Handbook, R. C. Downing, Prentice-Hall, Inc. 1988). When a compressor is used to mechanically increase the pressure of a refrigerant, a lubricant (i.e. oil) is needed in the compressor to lubricate the compressor bearings and other moving parts, and the properties of the oil must be suitable for this purpose. Often the oil leaves the compressor by slipping (i.e. leaking) past the piston rings in reciprocating compressors, by entrainment with the refrigerant, and by excessive foaming as refrigerant is released from solution in the oil. A small amount of oil circulating with the refrigerant may not cause any significant problems; however, if the oil accumulates in the system over time, the oil level in the compressor can become critically low and the compressor bearings and other moving parts can overheat and fail. Many sealed (hermetic) compressors are used for refrigerators, window air-conditioners, residential heat pumps, and commercial air-handlers. These compressors are precharged at the factory with the correct amount of oil, and a drop in oil level can reduce the life expectancy for these machines.

Problems related to compressor oil migration in a vapor compression system are related to the fact that oil may accumulate in the evaporator and cause a decrease in the cooling capacity of the system. Designers of refrigeration and air-conditioning systems often install oil separators in the discharge line of the compressor to trap oil and return it to the compressor crankcase. The oil is pushed along in the condenser by the liquid refrigerant and in the evaporator and suction line back to the compressor by the velocity of the refrigerant gas. The refrigerant pipes can also be designed to allow the oil to flow downhill back to the compressor using gravity. When oil leaves the compressor, however, it may or may not be soluble in the refrigerant, and the more soluble the refrigerant is in the oil, the better oil return to the compressor will be. The refrigerant dissolves in the oil, and reduces the viscosity of the oil that assists with the oil moving through the piping back to the compressor. Although these measures can be helpful, they are not 100% effective and may postpone the problem rather than solve it completely. For example, when there is a drop in the cooling capacity of the system, high temperatures in the compressor can lead to thermal breakdown and copper plating on valve surfaces, thus interfering with the proper operation of the compressor. Sludging and acid formation may limit the life of the system.

Several classes of commercial oils exist. Historically, the most common lubricants were natural or mineral-based oils (MO). Initially, when most refrigerants were based on chlorofluorocarbons (CFCs), the chlorine content in the refrigerant [i.e. fluorotrichloromethane (CFC-11) and difluorodichloromethane (CFC-12)] provided excellent solubility with mineral oil. With the development of the hydrofluorocarbon (HFC) refrigerants to replace CFCs, mineral oil had little to no solubility with the new refrigerants [e.g. 1,1,1,2-tetrafluoroethane (HFC-134a)]. Therefore, new synthetic based lubricants such as polyalkene glycol-based oil (PAG) and polyolester-based oil (PO) were developed. Although the new synthetic oils had better solubility with the HFC refrigerants, the solubility was still not as good as that of CFCs and mineral-based oils. Furthermore the PAG and PO oils are not as effective as lubricants, and additive packages must be mixed with the synthetic oils to improve their lubricating performance. Refrigerant gases other than HFCs, such as non-fluorinated hydrocarbons and carbon dioxide ($CO_2$), have been proposed. Non-fluorinated hydrocarbons have excellent solubility in MOs, however no suitable lubricant has been found for $CO_2$ refrigeration and air-conditioning compressors.

Ionic liquids have been described as potential lubricants. Wang et al [WEAR (2004) 256:44-48] and Ye et al [Chem. Comm. (2001) 21:2244-2245] describe the tribological properties and predicted lubricant functionality of alkylimidazolium hexafluorophosphate and alkylimidazolium tetrafluoroborate, respectively. WO 05/35702 discloses the heat resistance and friction characteristics of lubricating oils containing ionic liquids as base oils.

A need nevertheless remains for lubricants that are well suited for use in conjunction with the current and new refrigerants that are used in a vapor compression system. A lubricant with high solubilty for HFCs and $CO_2$, for example, would be desirable to replace, or be mixed with, traditional synthetic oils such as PAGs and POs to increase the operating lifetime of vapor compression systems. As a result, ionic liquids are disclosed herein, for use with various refrigerants in a vapor compression system, as type of compressor lubricant having a balance of properties that is superior to that of the current synthetic lubricants.

SUMMARY

The present invention relates to the use of ionic liquids as lubricants in the compressor of a vapor compression system that provides cooling or heating.

In one embodiment, this invention provides an apparatus for temperature adjustment that includes (a) a compressor that increases the pressure of the vapor of at least one refrigerant, wherein the compressor comprises moving parts that are lubricated by at least one ionic liquid;

(b) a condenser that receives refrigerant vapor that is passed out of the compressor, and condenses the vapor under pressure to a liquid;

(c) a pressure reduction device that receives liquid refrigerant that is passed out of the condenser, and reduces the pressure of the liquid to form a mixture of refrigerant in liquid and vapor form;

(d) an evaporator that receives the mixture of liquid and vapor refrigerant that is passed out of the pressure reduction device, and evaporates the remaining liquid in the mixture to form refrigerant vapor; and (e) a conduit that returns to the compressor refrigerant vapor that is passed out of the evaporator.

In another embodiment, this invention provides an apparatus for temperature adjustment that includes (a) a compressor that increases the pressure of the vapor of at least one refrigerant;

(b) a condenser that receives refrigerant vapor that is passed out of the compressor, and condenses the vapor under pressure to a liquid;

(c) a pressure reduction device that receives liquid refrigerant that is passed out of the condenser, and reduces the pressure of the liquid to form a mixture of refrigerant in liquid and vapor form;

(d) an evaporator that receives the mixture of liquid and vapor refrigerant that is passed out of the pressure reduction device, and evaporates the remaining liquid in the mixture to form refrigerant vapor; and (e) a conduit that returns to the compressor refrigerant vapor that is passed out of the evaporator;

wherein a refrigerant is admixed with at least one ionic liquid.

Either of these apparatus may adjust temperature by absorbing heat from, or transferring heat to, an object, medium or space. In such an apparatus, the condenser may for example, be located in proximity to an object, medium or space to be heated; or the evaporator may be located in proximity to an object, medium or space to be cooled.

In a further embodiment, this invention provides a process for adjusting the temperature of an object, medium or a space by (a) providing a mechanical device having moving parts to increase the pressure of the vapor of at least one refrigerant, and providing at least one ionic liquid to lubricate the moving parts of the device;

(b) condensing the refrigerant vapor under pressure to a liquid;

(c) reducing the pressure of the liquid refrigerant to form a mixture of refrigerant in liquid and vapor form;

(d) evaporating the liquid refrigerant to form refrigerant vapor; and (e) repeating step (a) to increase the pressure of the refrigerant vapor formed in steps (c) and (d).

In yet another embodiment, this invention provides a process for adjusting the temperature of an object, medium or a space by (a) increasing the pressure of the vapor of at least one refrigerant;

(b) condensing the refrigerant vapor under pressure to a liquid;

(c) reducing the pressure of the liquid refrigerant to form a mixture of refrigerant in liquid and vapor form;

(d) evaporating the liquid refrigerant to form refrigerant vapor;

(e) separating from the refrigerant vapor any ionic liquid present therein; and (f) repeating step (a) to increase the pressure of the refrigerant vapor formed in steps (c) and (d).

In either of such processes, temperature may be adjusted by absorbing heat from, or transferring heat to, an object, medium or space. In such a process, the refrigerant vapor may in step (b) be condensed to a liquid in proximity to an object, medium or space to be heated; or the liquid refrigerant may in step (d) be evaporated to form refrigerant vapor in proximity to an object, medium or space to be cooled.

In yet another embodiment, this invention provides a method for operating a mechanical compressor that has moving parts by providing an ionic liquid as the lubricant for the moving parts.

BRIEF DESCRIPTION OF THE DRAWINGS

FIG. 18 shows a schematic diagram of the gravimetric microbalance used for measuring gas absorption in the ionic liquids. In the diagram j$_1$, j$_2$, and j$_3$ refer to the counterweight, hook and chain, respectively; i$_1$, i$_2$ and i$_3$ refer to the sample container, wire and chain, respectively, W$_g$ refers to the force due to gravity; and B refers to the force due to buoyancy.

DETAILED DESCRIPTION

Figure 1:
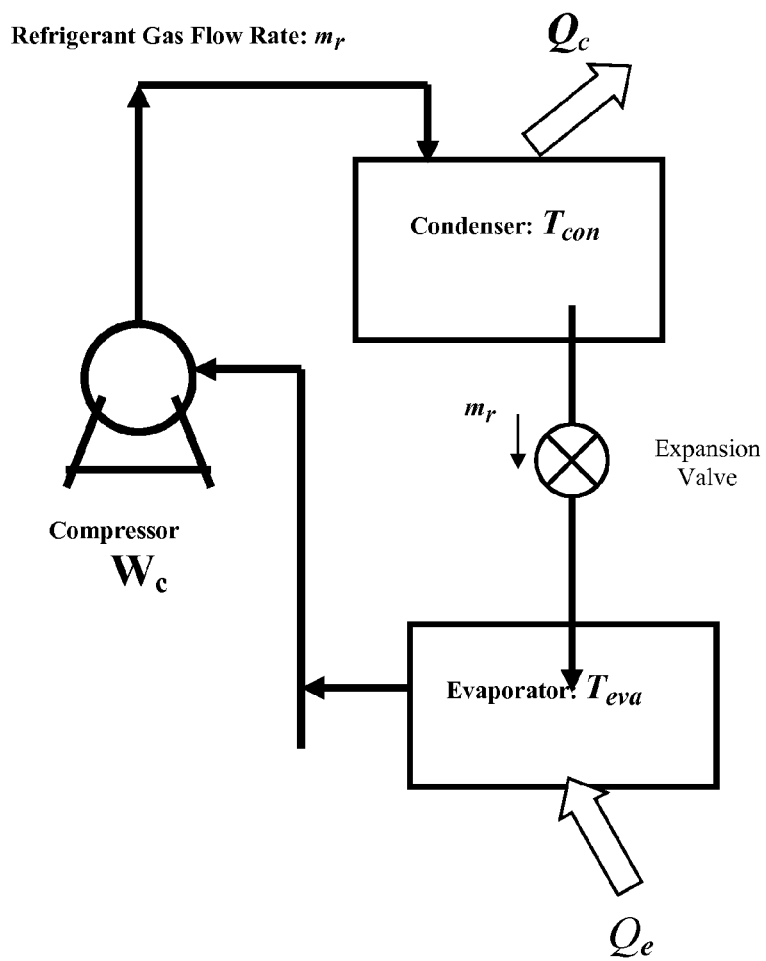
FIG. 1. is a schematic diagram of a simple vapor compression cycle.

In the description of this invention, the following definitional structure is provided for certain terminology as employed in various locations in the specification:

An "ionic liquid" is an organic salt that is fluid at about 100° C. or below, as more particularly described in *Science* (2003) 302:792-793. A "fluorinated ionic liquid" is an ionic liquid having at least one fluorine on either the cation or the anion. A "fluorinated cation" or "fluorinated anion" is a cation or anion, respectively, comprising at least one fluorine.

A "halogen" is bromine, iodine, chlorine or fluorine.

A "heteroaryl" is an alkyl group having a heteroatom.

A "heteroatom" is an atom other than carbon in the structure of an alkanyl, alkenyl, cyclic or aromatic compound.

A "hydrofluorocarbon" is a compound comprising fluorine, carbon, and at least one hydrogen atom. A hydrofluorocarbon compound (HFC) includes a hydrochlorofluorocarbon (HCFC), wherein HFC and HCFC are common terms used to define refrigerants [see, for example, Ralph C. Downing, Fluorocarbon Refrigerants Handbook, Prentice-Hall, Inc., Englewood Cliffs, N.J. (1988)]. Hydrofluorocarbon compounds also include compounds selected from the group consisting of hydrofluoroethers, hydrofluoroketones, hydrofluoroaromatics and hydrofluoroolefins; representative examples of which include methyl nonafluoroisobutyl ether, methyl nonafluorobutyl ether, ethyl nonafluoroisobutyl ether, ethyl nonafluorobutyl ether, and 3-ethoxy-1,1,1,2,3,4,4,5,5,6,6,6-dodecafluoro-2-trifluoromethylhexane. Hydrofluorocarbon compounds also include compounds wherein one or more substituents is bromine, chlorine or iodine.

"Optionally substituted with at least one member selected from the group consisting of", when referring to an alkane, alkene, alkoxy, fluoroalkoxy, perfluoroalkoxy, fluoroalkyl, perfluoroalkyl, aryl or heteroaryl radical or moiety, means that one or more hydrogens on a carbon chain of the radical or moiety may be independently substituted with one or more of the members of a recited group of substituents. For example, a substituted —C$_2$H$_5$ radical or moiety may, without limitation, be —$CF_2CF_3$, —$CH_2CH_2OH$ or —$CF_2CF_2I$ where the group or substituents consist of F, I and OH.

A "refrigerant" is a fluidic substance such as a fluorocarbon (FC), hydrofluorocarbon (HFC), chlorofluorocarbon (CFC), hydrochlorofluorocarbon (HCFC), or carbon dioxide that may be used as a thermal energy transfer vehicle. A refrigerant, when it changes phase from liquid to vapor (evaporates), removes heat from the surroundings; and when it changes phase from vapor to liquid (condenses), adds heat to the surroundings. Although the term refrigerant may typically carry the connotation of a substance used only for cooling, the term is used herein in the generic sense of a thermal energy transfer vehicle or substance that is applicable for use in a system or apparatus that may be used for heating or cooling by the absorption or rejection of heat in a selected location. For the present invention, the term "refrigerant" can be used to indicate one fluidic substance as described above, or may indicate a blend or mixture of two or more such fluidic substances.

A "vacuum" is a pressure less than 1 bar but greater than $10^{-4}$ bar for practical use in extractive distillation equipment.

The present invention relates to the use of ionic liquids as lubricants in the operatio of a compressor in a vapor compression system that provides cooling or heating. This invention thus also relates to an apparatus for adjusting temperature that operates or executes a vapor compression cycle. The invention also provides a process for temperature adjustment, either cooling or heating, utilizing a vapor compression system in which an ionic liquid is used as a lubricant.

Figure 2:
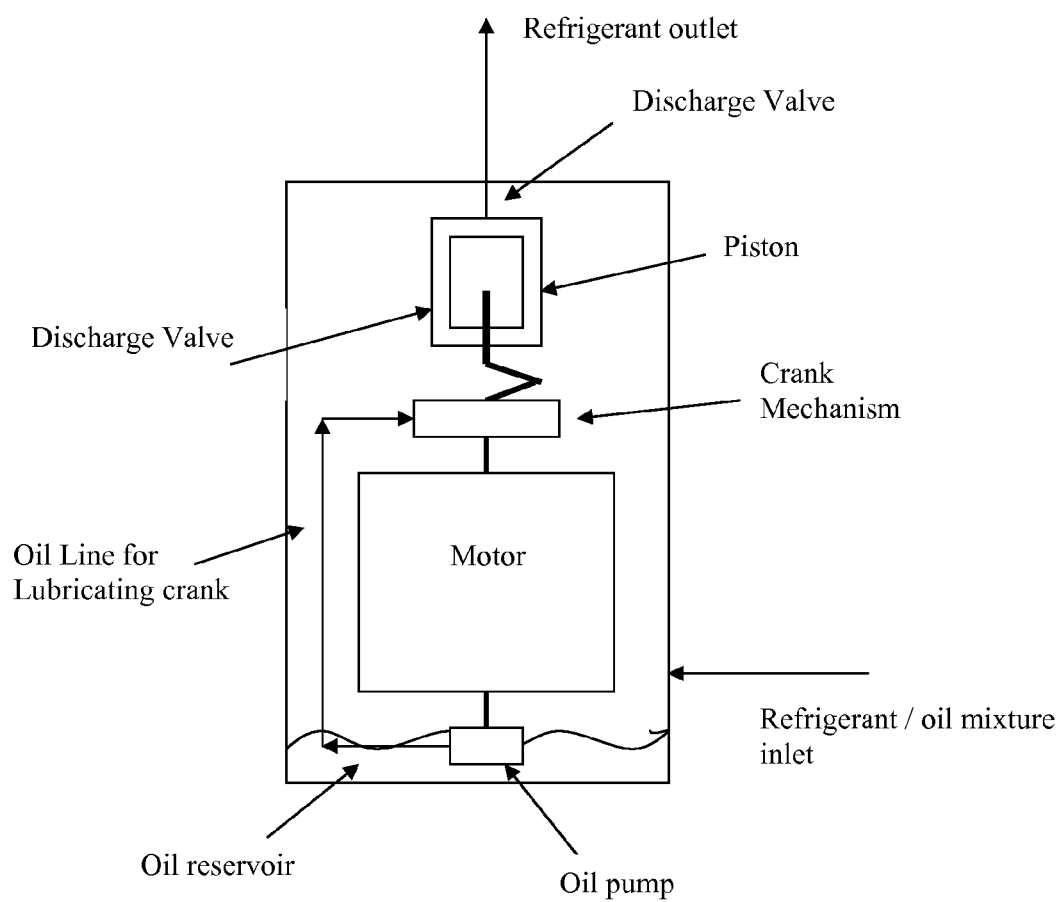
FIG. 2. is a schematic diagram of a simple vapor compressor.
Figure 3:
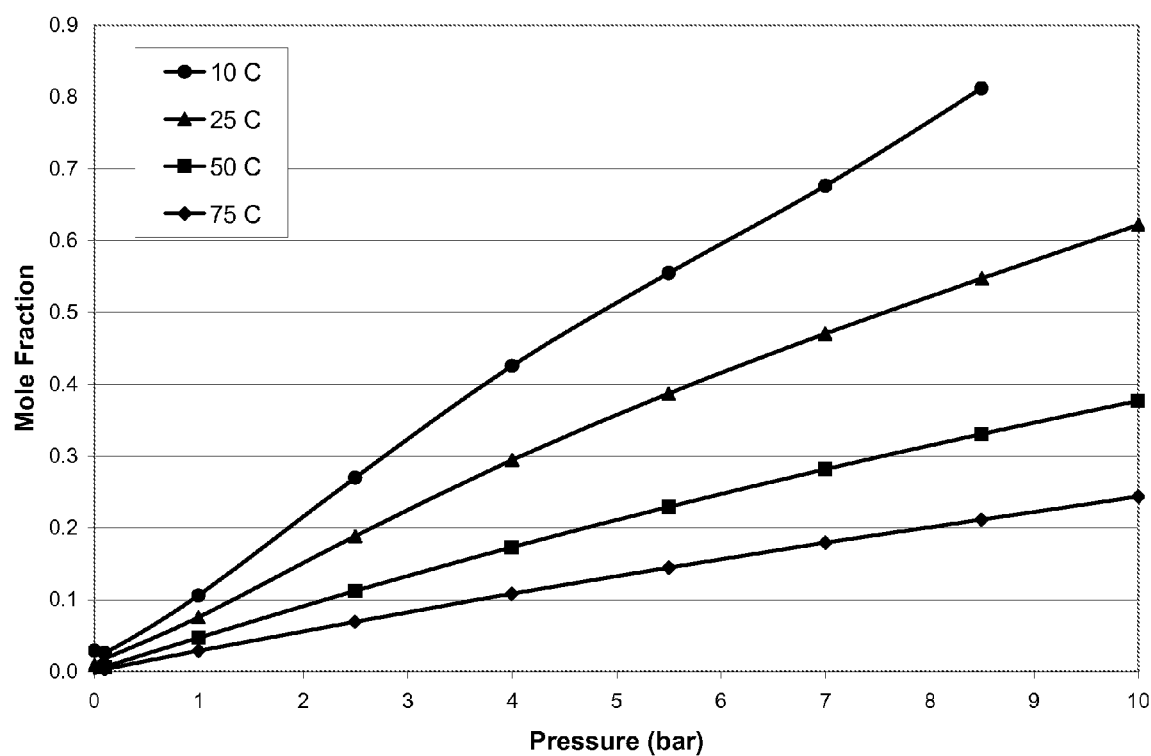
FIG. 3 shows measured isothermal solubility data (in mole fraction) of the system HFC-32+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 4:
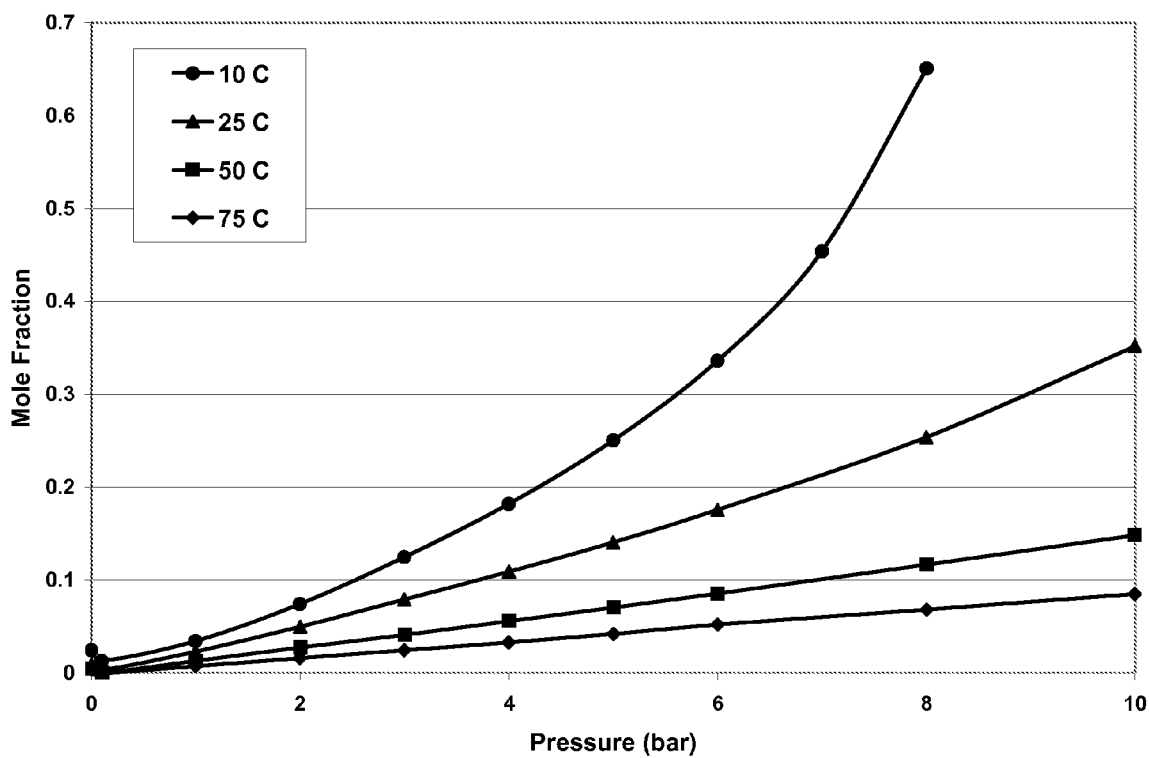
FIG. 4 shows measured isothermal solubility data (in mole fraction) of the system HFC-125+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 5:
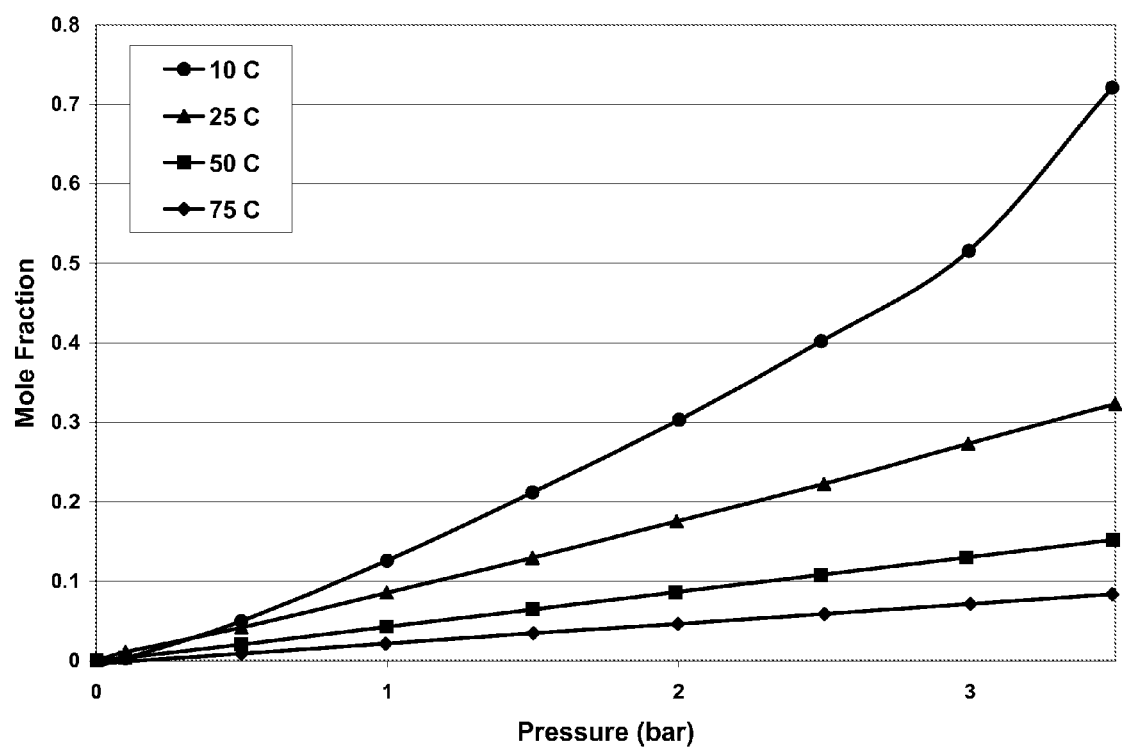
FIG. 5 shows measured isothermal solubility data (in mole fraction) of the system HFC-134a+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 6:
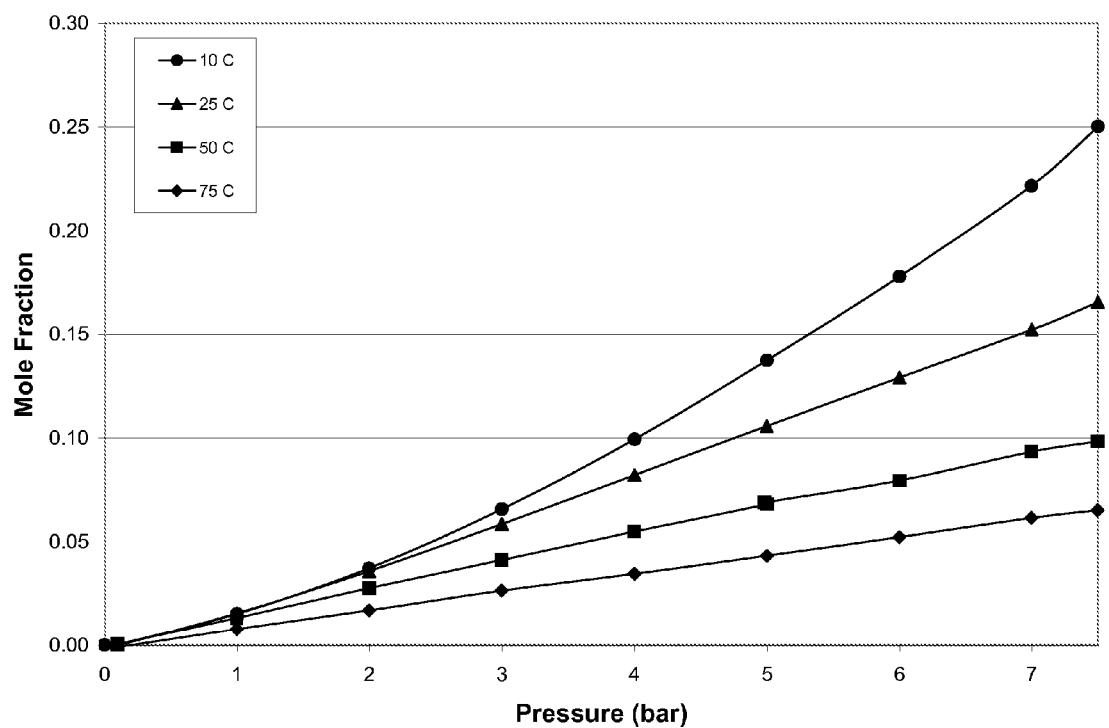
FIG. 6 shows measured isothermal solubility data (in mole fraction) of the system HFC-143a+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 7:
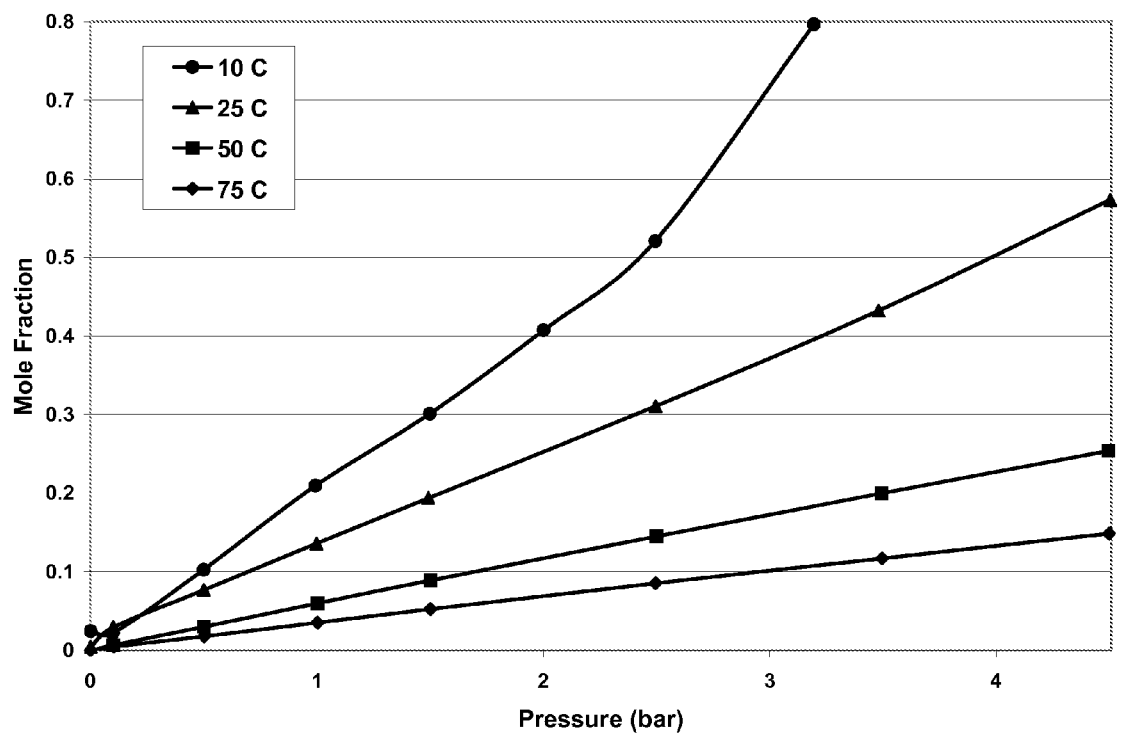
FIG. 7 shows measured isothermal solubility data (in mole fraction) of the system HFC-152a+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 8:
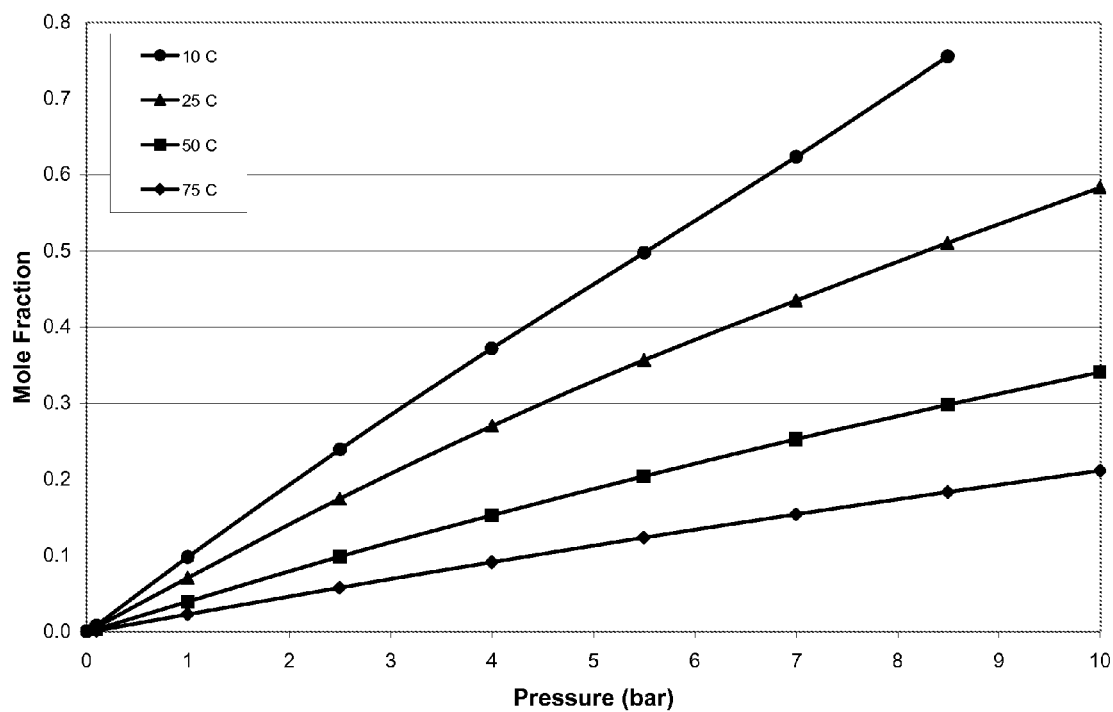
FIG. 8 shows measured isothermal solubility data (in mole fraction) of the system HFC-32+[bmim][BF$_4$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.

Vapor compression cycles for cooling or heating are known in the art from sources such as *Application Guide for Absorption Cooling/Refrigeration Using Recovered Heat* [Dorgan Cb, et al. (American Society of Heating, Refrigeration and Air Conditioning Engineers, Inc., 1995, Atlanta, Ga., Chapter 5)]. A schematic diagram for a simple vapor compression system is shown in FIG. 1. The system is composed of condenser and evaporator units with an expansion valve and a vapor compressor. FIG. 2 provides a schematic for a simple vapor compressor.

In FIG. 1, the pressure of the vapor of one or more refrigerants is increased mechanically by the operation of a compressor. The compressor has moving parts that are lubricated by a lubricant. In this invention, one or more ionic liquids serve as the lubricant. The refrigerant having increased pressure is passed through a conduit to a condenser where it is condensed to liquid form. The action of condensing the refrigerant generates heat, which is transferred or rejected to the surroundings, which may be an object, medium or space to be heated. The condensed refrigerant in liquid from is passed out of the condenser and is received into a pressure reduction device such as an expansion valve, where some of the liquid is converted to refrigerant vapor, creating a mixture of refrigerant in liquid and vapor form. From there, the mixture flows out of the pressure reduction device and is received by an evaporator where the liquid refrigerant is evaporated to vapor form. As heat is absorbed by, and flows into, the evaporater by virtue of the transformation of the refrigerant from liquid to vapor form, the surroundings (such as an object, medium or space) lose heat and are cooled. The refrigerant, now all or essentially all in vapor form, is returned to the compressor where the same cycle commences again. Operation or execution of a vapor compression cycle in this manner can thus be used for temperature adjustment as, by the absorption or expulsion heat an object (for example a conduit or a container), a medium (for example a fluid such as air or water) or a space can be heated or cooled as desired.

In one embodiment, therefore, this invention provides an apparatus for temperature adjustment, to operate or execute a vapor compression cycle as described above, that includes (a) a compressor that increases the pressure of the vapor of at least one refrigerant, wherein the compressor comprises moving parts that are lubricated by at least one ionic liquid; (b) a condenser that receives refrigerant vapor that is passed out of the compressor, and condenses the vapor under pressure to a liquid; (c) a pressure reduction device that receives liquid refrigerant that is passed out of the condenser, and reduces the pressure of the liquid to form a mixture of refrigerant in liquid and vapor form; (d) an evaporator that receives the mixture of liquid and vapor refrigerant that is passed out of the pressure reduction device, and evaporates the remaining liquid in the mixture to form refrigerant vapor; and (e) a conduit that returns to the compressor refrigerant vapor that is passed out of the evaporator.

In another embodiment, this invention provides an apparatus for temperature adjustment that includes (a) a compressor that increases the pressure of the vapor of at least one refrigerant; (b) a condenser that receives refrigerant vapor that is passed out of the compressor, and condenses the vapor under pressure to a liquid; (c) a pressure reduction device that receives liquid refrigerant that is passed out of the condenser, and reduces the pressure of the liquid to form a mixture of refrigerant in liquid and vapor form; (d) an evaporator that receives the mixture of liquid and vapor refrigerant that is passed out of the pressure reduction device, and evaporates the remaining liquid in the mixture to form refrigerant vapor; and (e) a conduit that returns to the compressor refrigerant vapor that is passed out of the evaporator; wherein a refrigerant is admixed with at least one ionic liquid. In a vapor compression system where an ionic liquid is used as a lubricant for a mechanical compressor, the refrigerant as is circulated through the vapor compression cycle may contain some amount of an ionic liquid lubricant where the lubricant has leaked out of its ordinary location and into other parts of the system where it is conceptually not intended to be.

Either of such apparatus may adjust temperature by absorbing heat from, or transferring heat to, an object, medium or space. In such an apparatus, the condenser may for example, be located in proximity to an object, medium or space to be heated; or the evaporator may be located in proximity to an object, medium or space to be cooled.

An apparatus of this invention may be deployed for use in, or fabricated or operated as, a refrigerator, a freezer, an ice machine, an air conditioner, an industrial cooling system, a heater or heat pump. Each of these instruments may be situated in a residential, commercial or industrial setting, or may be incorporated into a mobilized device such as a car, truck, bus, train, airplane, or other device for transportation, or may be incorporated into a piece of equipment such as a medical instrument.

In another embodiment, this invention provides a process for adjusting the temperature of an object, medium or a space by (a) providing a mechanical device to increase the pressure of the vapor of at least one refrigerant where the device has moving parts, and providing at least one ionic liquid to lubricate the moving parts of the device; (b) condensing the refrigerant vapor under pressure to a liquid; (c) reducing the pressure of the liquid refrigerant to form a mixture of refrigerant in liquid and vapor form; (d) evaporating the liquid refrigerant to form refrigerant vapor; (e) repeating step (a) to increase the pressure of the refrigerant vapor formed in steps (c) and (d).

In another embodiment, this invention provides a process for adjusting the temperature of an object, medium or a space by (a) passing the vapor of at least one refrigerant through a compressor that has moving parts to increase the pressure of the refrigerant vapor, and providing at least one ionic liquid to lubricate the moving parts of the compressor; (b) passing the refrigerant vapor out of the compressor and into a condenser to condense the refrigerant vapor under pressure to a liquid; (c) passing the refrigerant in liquid form out of the condenser to a pressure reduction device to reduce the pressure of the liquid refrigerant to form a mixture of refrigerant in liquid and vapor form; (d) passing the mixture to an evaporator to evaporate the liquid refrigerant to form refrigerant vapor; (e) passing the refrigerant vapor throughout a conduit to the compressor to repeat step (a) to increase the pressure of the refrigerant vapor formed in steps (c) and (d).

In yet another embodiment, this invention provides a process for adjusting the temperature of an object, medium or a space by (a) increasing the pressure of the vapor of at least one refrigerant; (b) condensing the refrigerant vapor under pressure to a liquid; (c) reducing the pressure of the liquid refrigerant to form a mixture of refrigerant in liquid and vapor form; (d) evaporating the liquid refrigerant to form refrigerant vapor; (e) separating from the refrigerant vapor any ionic liquid present therein; and (f) repeating step (a) to increase the pressure of the refrigerant vapor formed in steps (c) and (d). In a vapor compression system where an ionic liquid is used as a lubricant for a mechanical compressor, the refrigerant as is circulated through the vapor compression cycle may contain some amount of an ionic liquid lubricant where the lubricant has leaked out of its ordinary location and into other parts of the system where it is conceptually not intended to be. When refrigerant that is thus admixed with an ionic liquid is returned to the compressor for re-pressurizing, the ambient temperature will be at a level at which the refrigerant will be in vapor form but an ionic liquid will be in liquid form. The return conduit may thus be designed to permit the ionic liquid, as a liquid, to be separated from the refrigerant by being drained out through an opening into the lubricant sump while the refrigerant vapor, as a vapor, passes alone on into the compressor for re-pressurization.

In any of such processes, temperature may be adjusted by absorbing heat from, or transferring heat to, an object, medium or space. In such a process, the refrigerant vapor may in step (b) be condensed to a liquid in proximity to an object, medium or space to be heated; or the liquid refrigerant may in step (d) be evaporated to form refrigerant vapor in proximity to an object, medium or space to be cooled.

In one embodiment of the invention, a refrigerant suitable for use in a vapor compression system hereof may be selected from one or more members of the group consisting of $CHClF_2$ (R-22), $CHF_3$ (R-23), $CH_2F_2$ (R-32), $CH_3F$ (R-41), $CHF_2CF_3$ (R-125), $CH_2FCF_3$ (R-134a), $CHF_2OCHF_2$ (E-134), $CH_3CClF_2$ (R-142b), $CH_3CF_3$ (R-143a), $CH_3CHF_2$ (R-152a), $CH_3CH_2F$ (R-161), $CH_3OCH_3$ (E170), $CF_3CF_2CF_3$ (R-218), $CF_3CHFCF_3$ (R-227ea), $CF_3CH_2CF_3$ (R-236fa), $CH_2FCF_2CHF_2$ (R-245ca), $CHF_2CH_2CF_3$ (R-245fa), $CH_3CH_2CH_3$ (R-290), $CH_3CH_2CH_2CH_3$ (R-600), $CH(CH_3)_2CH_3$ (R-600a), $CH_3CH_2CH_2CH_2CH_3$ (R-601), $(CH_3)_2CHCH_2CH_3$ (R-601a), $CH_3CH_2OCH_2CH_3$ (R-610), $NH_3$, $CO_2$, and $CH_3CH=CH_2$, wherein the common name is given in parentheses following the chemical formula. In another embodiment of the invention, the refrigerant useful for the invention can be a blend selected from the group consisting of R-125/R-143a/R-134a (44.0/52.0/4.0) (R-404A), R-32/R-125/R-134a (20.0/40.0/40.0) (R-407A), R-32/R-125/R-134a (10.0/70.0/20.0) (R-407B), R-32/R-125/R-134a (23.0/25.0/52.0) (R-407C), R-32/R-125/R-134a (15.0/15.0/70.0) (R-407D), R-32/R-125/R-134a (25.0/15.0/60.0) (R-407E), R-32/R-125 (50.0/50.0) (R-410A), R-32/R-125 (45.0/55) (R-410B), R-218/R-134a/R-600a (9.0/88.0/3.0) (R-413A), R-125/R-134a/R-600 (46.6/50.0/3 0.4) (417A), R-125/R-134a/E170 (77.0/19.0/4.0) (R-419A), R-134a/R-142b (88.0/12.0) (R-420A), R-134a/R-142b (80.6/19.4), R-125/R-134a (58.0/42.0) (R-421A), R-125/R-134a (85.0/15.0) (R-421B), R-125/R-134a/R-600a (85.1/11.5/3.4) (R-422A), R-125/R-134a/R-600a (55.0/42.0/3.0) (R-422B), R-125/R-134a/R-600a (82.0/15.0/3.0) (R-422C), R-125/R-134a/R-600a (65.1/31.5/3.4) (R-422D), R-134a/R-227ea (52.5/47.5) (R423A), R-125/R-134a/R-600a/R-600/R-601a (50.5/47.0/0.9/1.0/0.6) (R-424A), R-32/R-134a/R-227ea (18.5/69.5/12.0) (R-425A), R-125/R-134a/R-600/R-601a (5.1/93.0/1.3/0.6) (R-426A), R-32/R-125/R-143a/R-134a (15.0/25.0/10.0/50.0) (R-427A), R-32/R-125/R-143a/R-134a (2.0/41.0/50.0/7.0), R-32/R-125/R-143a/R-134a (10.0/33.0/36.0/21.0), R-125/R-143a/R-290/R-600a (77.5/20.0/0.6/1.9) (R-428A), and R-125/R-143a (50.0/50.0) (R-507A), wherein the weight percent of the individual components relative to the other refrigerant components in the blend and the common name are given in parentheses following each blend.

In another embodiment of the invention, the refrigerant can be selected from one or more members of the group consisting of R-22, R-32, R-125, R-134a, R-404A, R-410A, R-413A, R-422A, R-422D, R-423A, R-426A, R-427A and R-507A.

In another embodiment of the invention, a hydrofluorocarbon for use as a refrigerant herein is selected from one or more members of the group consisting of trifluoromethane (HFC-23), difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), R-404A, R-407C, and R-410A.

In another embodiment, a hydrofluorocarbon is selected from one or more members of the group consisting of pentafluoroethane (HFC-125), 1,1,2,2-tetrafluoroethane (HFC-134), 1,1,1,2-tetrafluoroethane (HFC-134a), R-404A, R-407C, and R-410A.

Mixtures of refrigerants or blends may also be used.

In another embodiment, the refrigerant can be at least one fluoroolefin selected from the group consisting of:

(i) fluoroolefins of the formula E- or Z-$R^1CH=CHR^2$, wherein $R^1$ and $R^2$ are, independently, $C_1$ to $C_6$ perfluoroalkyl groups, and wherein the total number of carbons in the compound is at least 5;

(ii) cyclic fluoroolefins of the formula cyclo-[CX=CY(CZW)$_n$-], wherein X, Y, Z, and W, independently, are H or F, and n is an integer from 2 to 5; and (iii) fluoroolefins selected from the group consisting of:
2,3,3-trifluoro-1-propene ($CHF_2CF=CH_2$); 1,1,2-trifluoro-1-propene ($CH_3CF=CF_2$); 1,2,3-trifluoro-1-propene ($CH_2FCF=CF_2$); 1,1,3-trifluoro-1-propene ($CH_2FCH=CF_2$); 1,3,3-trifluoro-1-propene ($CHF_2CH=CHF$); 1,1,1,2,3,4,4,4-octafluoro-2-butene ($CF_3CF=CFCF_3$); 1,1,2,3,3,4,4,4-octafluoro-1-butene ($CF_3CF_2CF=CF_2$); 1,1,1,2,4,4,4-heptafluoro-2-butene ($CF_3CF=CHCF_3$); 1,2,3,3,4,4,4-heptafluoro-1-butene ($CHF=CFCF_2CF_3$); 1,1,1,2,3,4,4-heptafluoro-2-butene ($CHF_2CF=CFCF_3$); 1,3,3,3-tetrafluoro-2-(trifluoromethyl)-1-propene (($CF_3)_2C=CHF$); 1,1,3,3,4,4,4-heptafluoro-1-butene ($CF_2=CHCF_2CF_3$); 1,1,2,3,4,4,4-heptafluoro-1-butene ($CF_2=CFCHFCF_3$); 1,1,2,3,3,4,4-heptafluoro-1-butene ($CF_2=CFCF_2CHF_2$); 2,3,3,4,4-hexafluoro-1-butene ($CF_3CF_2CF=CH_2$); 1,3,3,4,4,4-hexafluoro-1-butene ($CHF=CHCF_2CF_3$); 1,2, 3,4,4,4-hexafluoro-1-butene (CHF=CFCHFCF$_3$); 1,2,3,3,4,4-hexafluoro-1-butene (CHF=CFCF$_2$CHF$_2$); 1,1,2,3,4,4-hexafluoro-2-butene (CHF$_2$CF=CFCHF$_2$); 1,1,1,2,3,4-hexafluoro-2-butene (CH$_2$FCF=CFCF$_3$); 1,1,1,2,4,4-hexafluoro-2-butene (CHF$_2$CH=CFCF$_3$); 1,1,1,3,4,4-hexafluoro-2-butene (CF$_3$CH=CFCHF$_2$); 1,1,2,3,3,4-hexafluoro-1-butene (CF$_2$=CFCF$_2$CH$_2$F); 1,1,2,3,4,4-hexafluoro-1-butene (CF$_2$=CFCHFCHF$_2$); 3,3,3-trifluoro-2-(trifluoromethyl)-1-propene (CH$_2$=C(CF$_3$)$_2$); 1,1,1,2,4-pentafluoro-2-butene (CH$_2$FCH=CFCF$_3$); 1,1,1,3,4-pentafluoro-2-butene (CF$_3$CH=CFCH$_2$F); 3,3,4,4,4-pentafluoro-1-butene (CF$_3$CF$_2$CH=CH$_2$); 1,1,1,4,4-pentafluoro-2-butene (CHF$_2$CH=CHCF$_3$); 1,1,1,2,3-pentafluoro-2-butene (CH$_3$CF=CFCF$_3$); 2,3,3,4,4-pentafluoro-1-butene (CH$_2$=CFCF$_2$CHF$_2$); 1,1,2,4,4-pentafluoro-2-butene (CHF$_2$CF=CHCHF$_2$); 1,1,2,3,3-pentafluoro-1-butene (CH$_3$CF$_2$CF=CF$_2$); 1,1,2,3,4-pentafluoro-2-butene (CH$_2$FCF=CFCHF$_2$); 1,1,3,3,3-pentafluoro-2-methyl-1-propene (CF$_2$=C(CF$_3$)(CH$_3$)); 2-(difluoromethyl)-3,3,3-trifluoro-1-propene (CH$_2$=C(CHF$_2$)(CF$_3$)); 2,3,4,4,4-pentafluoro-1-butene (CH$_2$=CFCHFCF$_3$); 1,2,4,4,4-pentafluoro-1-butene (CHF=CFCH$_2$CF$_3$); 1,3,4,4,4-pentafluoro-1-butene (CHF=CHCHFCF$_3$); 1,3,3,4,4-pentafluoro-1-butene (CHF=CHCF$_2$CHF$_2$); 1,2,3,4,4-pentafluoro-1-butene (CHF=CFCHFCHF$_2$); 3,3,4,4-tetrafluoro-1-butene (CH$_2$=CHCF$_2$CHF$_2$); 1,1-difluoro-2-(difluoromethyl)-1-propene (CF$_2$=C(CHF$_2$)(CH$_3$)); 1,3,3,3-tetrafluoro-2-methyl-1-propene (CHF=C(CF$_3$)(CH$_3$)); 3,3-difluoro-2-(difluoromethyl)-1-propene (CH$_2$=C(CHF$_2$)$_2$); 1,1,1,2-tetrafluoro-2-butene (CF$_3$CF=CHCH$_3$); 1,1,1,3-tetrafluoro-2-butene (CH$_3$CF=CHCF$_3$); 1,1,1,2,3,4,4,5,5,5-decafluoro-2-pentene (CF$_3$CF=CFCF$_2$CF$_3$); 1,1,2,3,3,4,4,5,5,5-decafluoro-1-pentene (CF$_2$=CFCF$_2$CF$_2$CF$_3$); 1,1,1,4,4,4-hexafluoro-2-(trifluoromethyl)-2-butene ((CF$_3$)$_2$C=CHCF$_3$); 1,1,1,2,4,4,5,5,5-nonafluoro-2-pentene (CF$_3$CF=CHCF$_2$CF$_3$); 1,1,1,3,4,4,5,5,5-nonafluoro-2-pentene (CF$_3$CH=CFCF$_2$CF$_3$); 1,2,3,3,4,4,5,5,5-nonafluoro-1-pentene (CHF=CFCF$_2$CF$_2$CF$_3$); 1,1,3,3,4,4,5,5,5-nonafluoro-1-pentene (CF$_2$=CHCF$_2$CF$_2$CF$_3$); 1,1,2,3,3,4,4,5,5-nonafluoro-1-pentene (CF$_2$=CFCF$_2$CF$_2$CHF$_2$); 1,1,2,3,4,4,5,5,5-nonafluoro-2-pentene (CHF$_2$CF=CFCF$_2$CF$_3$); 1,1,1,2,3,4,4,5,5-nonafluoro-2-pentene (CF$_3$CF=CFCF$_2$CHF$_2$); 1,1,1,2,3,4,4,5,5,5-nonafluoro-2-pentene (CF$_3$CF=CFCHFCF$_3$); 1,2,3,4,4,4-hexafluoro-3-(trifluoromethyl)-1-butene (CHF=CFCF(CF$_3$)$_2$); 1,1,2,4,4,4-hexafluoro-3-(trifluoromethyl)-1-butene (CF$_2$=CFCH(CF$_3$)$_2$); 1,1,1,4,4,4-hexafluoro-2-(trifluoromethyl)-2-butene (CF$_3$CH=C(CF$_3$)$_2$); 1,1,3,4,4,4-hexafluoro-3-(trifluoromethyl)-1-butene (CF$_2$=CHCF(CF$_3$)$_2$); 2,3,3,4,4,5,5-octafluoro-1-pentene (CH$_2$=CFCF$_2$CF$_2$CF$_3$); 1,2,3,3,4,4,5,5-octafluoro-1-pentene (CHF=CFCF$_2$CF$_2$CHF$_2$); 3,3,4,4,4-pentafluoro-2-(trifluoromethyl)-1-butene (CH$_2$=C(CF$_3$)CF$_2$CF$_3$); 1,1,4,4,4-pentafluoro-3-(trifluoromethyl)-1-butene (CF$_2$=CHCH(CF$_3$)$_2$); 1,3,4,4,4-pentafluoro-3-(trifluoromethyl)-1-butene (CHF=CHCF(CF$_3$)$_2$); 1,1,4,4,4-pentafluoro-2-(trifluoromethyl)-1-butene (CF$_2$=C(CF$_3$)CH$_2$CF$_3$); 3,4,4,4-tetrafluoro-3-(trifluoromethyl)-1-butene ((CF$_3$)$_2$CFCH=CH$_2$); 3,3,4,4,5,5,5-heptafluoro-1-pentene (CF$_3$CF$_2$CF$_2$CH=CH$_2$); 2,3,3,4,4,5,5-heptafluoro-1-pentene (CH$_2$=CFCF$_2$CF$_2$CHF$_2$); 1,1,3,3,5,5,5-heptafluoro-1-butene (CF$_2$=CHCF$_2$CH$_2$CF$_3$); 1,1,1,2,4,4,4-heptafluoro-3-methyl-2-butene (CF$_3$CF=C(CF$_3$)(CH$_3$)); 2,4,4,4-tetrafluoro-3-(trifluoromethyl)-1-butene (CH$_2$=CFCH(CF$_3$)$_2$); 1,4,4,4-tetrafluoro-3-(trifluoromethyl)-1-butene (CHF=CHCH(CF$_3$)$_2$); 1,1,1,4-tetrafluoro-2-(trifluoromethyl)-2-butene (CH$_2$FCH=C(CF$_3$)$_2$); 1,1,1,3-tetrafluoro-2-(trifluoromethyl)-2-butene (CH$_3$CF=C(CF$_3$)$_2$); 1,1,1-trifluoro-2-(trifluoromethyl)-2-butene ((CF$_3$)$_2$C=CHCH$_3$); 3,4,4,5,5,5-hexafluoro-2-pentene (CF$_3$CF$_2$CF=CHCH$_3$); 1,1,1,4,4,4-hexafluoro-2-methyl-2-butene (CF$_3$C(CH$_3$)=CHCF$_3$); 3,3,4,5,5,5-hexafluoro-1-pentene (CH$_2$=CHCF$_2$CHFCF$_3$); 4,4,4-trifluoro-3-(trifluoromethyl)-1-butene (CH$_2$=C(CF$_3$)CH$_2$CF$_3$); 1,1,2,3,3,4,4,5,5,6,6,6-dodecafluoro-1-hexene (CF$_3$(CF$_2$)$_3$CF=CF$_2$); 1,1,1,2,2,3,4,5,5,6,6,6-dodecafluoro-3-hexene (CF$_3$CF$_2$CF=CFCF$_2$CF$_3$); 1,1,1,4,4,4-hexafluoro-2,3-bis(trifluoromethyl)-2-butene ((CF$_3$)$_2$C=C(CF$_3$)$_2$); 1,1,1,2,3,4,5,5,5-nonafluoro-4-(trifluoromethyl)-2-pentene ((CF$_3$)$_2$CFCF=CFCF$_3$); 1,1,1,4,4,5,5,5-octafluoro-2-(trifluoromethyl)-2-pentene ((CF$_3$)$_2$C=CHC$_2$F$_5$); 1,1,1,3,4,5,5,5-octafluoro-4-(trifluoromethyl)-2-pentene ((CF$_3$)$_2$CFCF=CHCF$_3$); 3,3,4,4,5,5,6,6,6-nonafluoro-1-hexene (CF$_3$CF$_2$CF$_2$CF$_2$CH=CH$_2$); 4,4,4-trifluoro-3,3-bis(trifluoromethyl)-1-butene (CH$_2$=CHC(CF$_3$)$_3$); 1,1,1,4,4,4-hexafluoro-2-(trifluoromethyl)-3-methyl-2-butene ((CF$_3$)$_2$C=C(CH$_3$)(CF$_3$)); 2,3,3,5,5,5-hexafluoro-4-(trifluoromethyl)-1-pentene (CH$_2$=CFCF$_2$CH(CF$_3$)$_2$); 1,1,1,2,4,4,5,5,5-nonafluoro-3-methyl-2-pentene (CF$_3$CF=C(CH$_3$)CF$_2$CF$_3$); 1,1,1,5,5,5-hexafluoro-4-(trifluoromethyl)-2-pentene (CF$_3$CH=CHCH(CF$_3$)$_2$); 3,4,4,5,5,6,6,6-octafluoro-2-hexene (CF$_3$CF$_2$CF$_2$CF=CHCH$_3$); 3,3,4,4,5,5,6,6-octafluoro 1-hexene (CH$_2$=CHCF$_2$CF$_2$CF$_2$CHF$_2$); 1,1,1,4,4-pentafluoro-2-(trifluoromethyl)-2-pentene ((CF$_3$)$_2$C=CHCF$_2$CH$_3$); 4,4,5,5,5-pentafluoro-2-(trifluoromethyl)-1-pentene (CH$_2$=C(CF$_3$)CH$_2$C$_2$F$_5$); 3,3,4,4,5,5,5-heptafluoro-2-methyl-1-pentene (CF$_3$CF$_2$CF$_2$C(CH$_3$)=CH$_2$); 4,4,5,5,6,6,6-heptafluoro-2-hexene (CF$_3$CF$_2$CF$_2$CH=CHCH$_3$); 4,4,5,5,6,6,6-heptafluoro-1-hexene (CH$_2$=CHCH$_2$CF$_2$C$_2$F$_5$); 1,1,1,2,2,3,4-heptafluoro-3-hexene (CF$_3$CF$_2$CF=CFC$_2$H$_5$); 4,5,5,5-tetrafluoro-4-(trifluoromethyl)-1-pentene (CH$_2$=CHCH$_2$CF(CF$_3$)$_2$); 1,1,1,2,5,5,5-heptafluoro-4-methyl-2-pentene (CF$_3$CF=CHCH(CF$_3$)(CH$_3$)); 1,1,1,3-tetrafluoro-2-(trifluoromethyl)-2-pentene ((CF$_3$)$_2$C=CFC$_2$H$_5$); 1,1,1,2,3,4,4,5,5,6,6,7,7,7-tetradecafluoro-2-heptene (CF$_3$CF=CFCF$_2$CF$_2$C$_2$F$_5$); 1,1,1,2,2,3,4,5,5,6,6,7,7,7-tetradecafluoro-3-heptene (CF$_3$CF$_2$CF=CFCF$_2$C$_2$F$_5$); 1,1,1,3,4,4,5,5,6,6,7,7,7-tridecafluoro-2-heptene (CF$_3$CH=CFCF$_2$CF$_2$C$_2$F$_5$); 1,1,1,2,4,4,5,5,6,6,7,7,7-tridecafluoro-2-heptene (CF$_3$CF=CHCF$_2$CF$_2$C$_2$F$_5$); 1,1,1,2,2,4,5,5,6,6,7,7,7-tridecafluoro-3-heptene (CF$_3$CF$_2$CH=CFCF$_2$C$_2$F$_5$); 1,1,1,2,2,3,5,5,6,6,7,7,7-tridecafluoro-3-heptene (CF$_3$CF$_2$CF=CHCF$_2$C$_2$F$_5$); CF$_2$=CFOCF$_2$CF$_3$ (PEVE) and CF$_2$=CFOCF$_3$ (PMVE).

In yet another embodiment, the refrigerant can be a composition comprising the fluoroolefin as defined above with a flammable refrigerant as described in U.S. Provisional Application No. 60/732,581, which is incorporated in its entirety as a part hereof for all purposes. Flammable refrigerants comprise any compound, which may be demonstrated to propagate a flame under specified conditions of temperature, pressure and composition when mixed with air. Flammable refrigerants may be identified by testing under conditions specified by ASHRAE (American Society of Heating, Refrigerating and Air-Conditioning Engineers, Inc.) Standard 34-2001, under ASTM (American Society of Testing and Materials) E681-01, with an electronic ignition source. Such tests of flammability are conducted with the refrigerant at 101 kPa (14.7 psia) and a specified temperature (typically 100° C. (212° F.), or room temperature, that being about 23° C. (73° F.) at various concentrations in air in order to determine the lower flammability limit (LFL) and upper flammability limit (UFL) of the test compound in air. Flammable refrigerants include hydrofluorocarbons, such as difluoromethane (HFC-32), fluoroolefins, such as 1,2,3,3-tetrafluoro-1-propene (HFC-1234ye), fluoroethers, such as $C_4F_9OC_2H_5$, hydrocarbon ethers, such as dimethyl ether, hydrocarbons, such as propane, ammonia, and combinations thereof. One example of a refrigerant composition comprising a fluoroolefin refrigerant with a flammable refrigerant is a refrigerant composition comprising about 99.0 weight percent to about 63.0 weight percent $C_3HF_5$ (HFC-1225ye) and about 1.0 weight percent to about 37.0 weight percent HFC-32.

Refrigerants useful for the invention also include compositions comprising pentafluoroethane (R-125), 1,1,1,2-tetrafluoroethane (R-134a), and at least two hydrocarbons each having eight or fewer carbon atoms, as described in U.S. Provisional Application No. 60/876,406, which is incorporated in its entirety as a part hereof for all purposes. In some embodiments, the hydrocarbon is $C_4$ to $C_8$ hydrocarbon, such as butanes, pentanes, hexanes, heptanes, octanes, $C_4$ to $C_8$ alkenes, $C_4$ to $C_8$ cycloalkanes, or mixtures thereof. In certain embodiments, the hydrocarbon components consist of n-butane (R-600) and n-pentane (R-601). In some embodiments, the pentafluoroethane is used at from about 13% to about 20% by weight of the composition, and in some embodiments, the 1,1,1,2-tetrafluoroethane is used at from about 70% to about 80% by weight of the composition. In some embodiments, the hydrocarbon component is used at from about 1% to about 6% by weight.

Refrigerants useful in this invention can be obtained commercially, or can be synthesized by the methods described in U.S. Provisional Application No. 60/732,581.

An ionic liquid useful as a lubricant herein can in principle be any ionic liquid that absorbs a refrigerant such as a hydrofluorocarbon or $CO_2$. Ideally, for maximum oil return to the compressor, the ionic liquid-based lubricant should have high solubility for the refrigerant and good friction/wear characteristics.

Ionic liquids are organic compounds that are liquid at room temperature (approximately 25° C.). They differ from most salts in that they have very low melting points, they tend to be liquid over a wide temperature range, and have been shown to have high heat capacities. Ionic liquids have essentially no vapor pressure, and they can either be neutral, acidic or basic. The properties of an ionic liquid can be tailored by varying the cation and anion. A cation or anion of an ionic liquid useful for the present invention can in principle be any cation or anion such that the cation and anion together form an organic salt that is liquid at or below about 100° C.

Many ionic liquids are formed by reacting a nitrogen-containing heterocyclic ring, preferably a heteroaromatic ring, with an alkylating agent (for example, an alkyl halide) to form a quaternary ammonium salt, and performing ion exchange or other suitable reactions with various Lewis acids or their conjugate bases to form the ionic liquid. Examples of suitable heteroaromatic rings include substituted pyridines, imidazole, substituted imidazole, pyrrole and substituted pyrroles. These rings can be alkylated with virtually any straight, branched or cyclic $C_{1-20}$ alkyl group, but preferably, the alkyl groups are $C_{1-16}$ groups, since groups larger than this may produce low melting solids rather than ionic liquids. Various triarylphosphines, thioethers and cyclic and non-cyclic quaternary ammonium salts may also been used for this purpose. Counterions that may be used include chloroaluminate, bromoaluminate, gallium chloride, tetrafluoroborate, tetrachloroborate, hexafluorophosphate, nitrate, trifluoromethane sulfonate, methylsulfonate, p-toluenesulfonate, hexafluoroantimonate, hexafluoroarsenate, tetrachloroaluminate, tetrabromoaluminate, perchlorate, hydroxide anion, copper dichloride anion, iron trichloride anion, zinc trichloride anion, as well as various lanthanum, potassium, lithium, nickel, cobalt, manganese, and other metal-containing anions.

Ionic liquids may also be synthesized by salt metathesis, by an acid-base neutralization reaction or by quaternizing a selected nitrogen-containing compound; or they may be obtained commercially from several companies such as Merck (Darmstadt, Germany) or BASF (Mount Olive, N.J.).

Representative examples of ionic liquids useful herein included among those that are described in sources such as *J. Chem. Tech. Biotechnol.*, 68:351-356 (1997); *Chem. Ind.*, 68:249-263 (1996); *J. Phys. Condensed Matter*, 5: (supp 34B):B99-B106 (1993); *Chemical and Engineering News*, Mar. 30, 1998, 32-37; *J. Mater. Chem.*, 8:2627-2636 (1998); *Chem. Rev.*, 99:2071-2084 (1999); and WO 05/113,702 (and references therein cited). In one embodiment, a library, i.e. a combinatorial library, of ionic liquids may be prepared, for example, by preparing various alkyl derivatives of a quaternary ammonium cation, and varying the associated anions. The acidity of the ionic liquids can be adjusted by varying the molar equivalents and type and combinations of Lewis acids.

In another embodiment of the invention, ionic liquids suitable for use herein may have cations selected from the following Formulae:

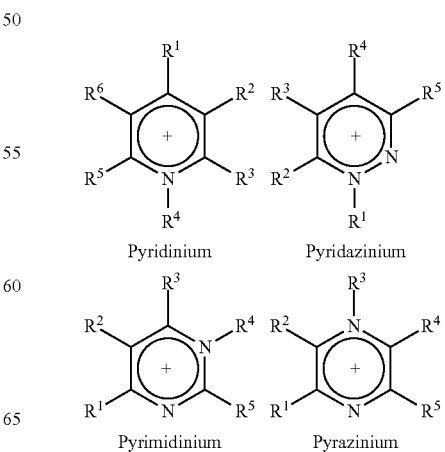

Pyridinium    Pyridazinium

Pyrimidinium    Pyrazinium

-continued

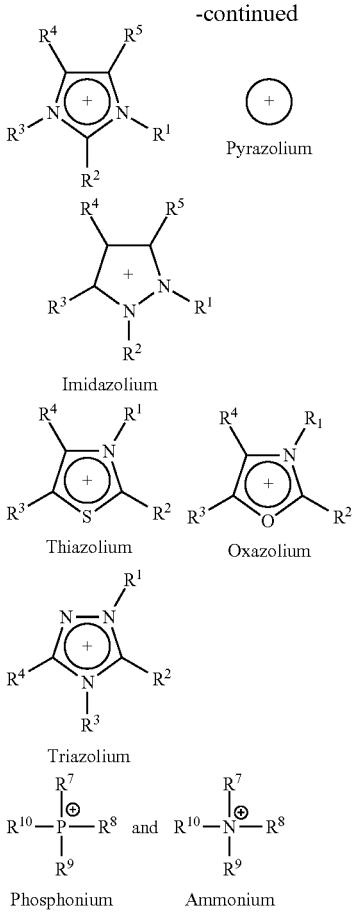

wherein $R^1$, $R^2$, $R^3$, $R^4 R^5$ and $R^6$ are independently selected from the group consisting of:

(i) H (ii) halogen (iii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;

(iv) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;

(v) $C_6$ to $C_{20}$ unsubstituted aryl, or $C_3$ to $C_{25}$ unsubstituted heteroaryl having one to three heteroatoms independently selected from the group consisting of O, N, Si and S; and (vi) $C_6$ to $C_{25}$ substituted aryl, or $C_3$ to $C_{25}$ substituted heteroaryl having one to three heteroatoms independently selected from the group consisting of O, N, Si and S; and wherein said substituted aryl or substituted heteroaryl has one to three substituents independently selected from the group consisting of:

(1) —$CH_3$, —$C_2H_5$, or $C_3$ to $C_{25}$ straight-chain, branched or cyclic alkane or alkene, optionally substituted with at least one member selected from the group consisting of Cl, Br, F I, OH, $NH_2$ and SH, (2) OH, (3) $NH_2$, and (4) SH;

$R^7$, $R^8$, $R^9$, and $R^{10}$ are independently selected from the group consisting of:

(vii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;

(viii) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;

(ix) $C_6$ to $C_{25}$ unsubstituted aryl, or $C_3$ to $C_{25}$ unsubstituted heteroaryl having one to three heteroatoms independently selected from the group consisting of O, N, Si and S; and (x) $C_6$ to $C_{25}$ substituted aryl, or $C_3$ to $C_{25}$ substituted heteroaryl having one to three heteroatoms independently selected from the group consisting of O, N, Si and S; and wherein said substituted aryl or substituted heteroaryl has one to three substituents independently selected from the group consisting of:

(1) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH, (2) OH, (3) $NH_2$, and (4) SH; and wherein optionally at least two of $R^1$, $R^2$, $R^3$, $R^4$, $R^5$, $R^6$, $R^7$, $R^8$, $R^9$, and $R^{10}$ can together form a cyclic or bicyclic alkanyl or alkenyl group.

In another embodiment, ionic liquids useful for the invention comprise fluorinated cations wherein at least one member selected from $R^1$, $R^2$, $R^3$, $R^4$, $R^5$, $R^6$, $R^7$, $R^8$, $R^9$ and $R^{10}$ comprises $F^-$.

In another embodiment, ionic liquids have anions selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]3-$, $[HPO_4]^{2-}$, $[H_2PO_4]^-$, $[HSO_3]^-$, $[CuCl_2]^-$, $Cl^-$, $Br^-$, $I^-$, $SCN^-$; and preferably any fluorinated anion. Fluorinated anions of the invention include $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_{21}CF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$; and $F^-$. In another embodiment, ionic liquids comprise a cation selected from the group consisting of pyridinium, pyridazinium, pyrimidinium, pyrazinium, imidazolium, pyrazolium, thiazolium, oxazolium, triazolium, phosphonium, and ammonium as defined above; and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$; and any fluorinated anion. In yet another embodiment, ionic liquids comprise a cation selected from the group consisting of pyridinium, pyridazinium, pyrimidinium, pyrazinium, imidazolium, pyrazolium, thiazolium, oxazolium, triazolium, phosphonium, and ammonium as defined above; and an anion selected from the group consisting of $[BF_4]^-$, $[PF_6]^-$, $[SbF_6]^-$,

[CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_2$ICF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, [(CF$_3$CFHCF$_2$SO$_2$)$_2$N]$^-$, and F$^-$.

In another embodiment, ionic liquids comprise a cation selected from the group consisting of pyridinium, pyridazinium, pyrimidinium, pyrazinium, imidazolium, pyrazolium, thiazolium, oxazolium, triazolium, phosphonium, and ammonium as defined above, wherein at least one member selected from R$^1$, R$^2$, R$^3$, R$^4$, R$^5$, R$^6$, R$^7$R$^8$, R$^9$, and R$^{10}$ comprises F; and an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, SCN$^-$; and any fluorinated anion. In still another embodiment, ionic liquids comprise a cation selected from the group consisting of pyridinium, pyridazinium, pyrimidinium, pyrazinium, imidazolium, pyrazolium, thiazolium, oxazolium, triazolium, phosphonium, and ammonium as defined above, wherein at least one member selected from R$^1$, R$^2$, R$^3$, R$^4$, R$^5$, R$^6$, R$^7$, R$^8$, R$^9$, and R$^{10}$ comprises F$^-$; and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_{21}$CF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, [(CF$_3$CFHCF$_2$SO$_2$)$_2$N]$^-$, and F$^-$.

In another embodiment, an ionic liquid comprises 1-butyl-3-methylimidazolium, 1,2-dimethyl-3-propylimidazolium, 1-octyl-3-methylimidazolium, 1,3-dioctylimidazolium, 1-ethyl-3-methylimidazolium, 1-dodecyl-3-methylimidazolium, 1-heptyl-3-methylimidazolium, 3-methyl-1-propylpyridinium, 1-butyl-3-methylpyridinium, tetradecyl(trihexyl)phosphonium, or tributyl(tetradecyl)phosphonium as the cation and an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, SCN$^-$, [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_2$ICF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, and [(CF$_3$CFHCF$_2$SO$_2$)$_2$N]$^-$.

In an even more specific embodiment, the at least one ionic liquid is selected from the group consisting of 1-butyl-3-methylimidazolium hexafluorophosphate [bmim][PF$_6$], 1-butyl-3-methylimidazolium tetrafluoroborate [bmim][BF$_4$], 1,2-dimethyl-3-propylimidazolium tris(trifluoromethylsulfonyl)methide [dmpim][TMeM], 1-octyl-3-methylimidazolium iodide [omim][I], 1,3-dioctylimidazolium iodide [doim][I], 1-ethyl-3-methylimidazolium bis(pentafluoroethylsulfonyl)imide [emim][BEI], 1,2-dimethyl-propylimidazolium bis(trifluoromethylsulfonyl)imide [dmpim][BMeI], 3-methyl-1-propylpyridinium bis(trifluoromethylsulfonyl)imide [pmpy][BMeI], 1-ethyl-3-methylimidazolium hexafluorophosphate [emim][PF$_6$], 1-ethyl-3-methylimidazolium bis(trifluoroethylsulfonyl)imide [emim][BMeI], 1-butyl-3-methylpyridinium bis(trifluoromethylsulfonyl)imide [bmpy][BMeI], 1-ethyl-3-methylimidazolium 1,1,2,2-tetrafluoroethanesulfonate [emim][TFES], 1-butyl-3-methylimidazolium 1,1,2,2-tetrafluoroethanesulfonate [bmim][TFES], 1-dodecyl-3-methylimidazolium 1,1,2,2-tetrafluoroethanesulfonate [dmim][TFES], 1-heptyl-3-methylimidazolium 1,1,2,2-tetrafluoroethanesulfonate [hmim][TFES], 1-butyl-3-methylimidazolium acetate [bmim][Ac], 1-butyl-3-methylimidazolium 2-(1,2,2,2-tetrafluoroethoxy)-1,1,2,2-tetrafluoroethanesulfonate [bmim][FS], 1-butyl-3-methylimidazolium 1,1,2,3,3,3-hexafluoropropanesulfonate [bmim][HFPS], 1-butyl-3-methylimidazolium methyl sulfonate [bmim][MeSO$_4$], 1-butyl-3-methylimidazolium thiocyanate [bmim][SCN], 1-butyl-3-methylimidazolium 1,1,2-trifluoro-2-(perfluoroethoxy)ethanesulfonate [bmim][TPES], 1-butyl-3-methylimidazolium 1,1,2-trifluoro-2-(trifluoromethoxy)ethanesulfonate [bmim][TTES], 1-butyl-3-methylimidazolium 1,1,2-trifluoro-2-(trifluoromethoxy)ethanesulfonate [bmim][TTES], 1-butyl-3-methylimidazolium 1,1,2-trifluoro-2-(perfluoroethoxy)ethanesulfonate [bmim][TPES], 1-ethyl-3-methylimidazolium bis(pentafluoroethylsulfonyl)imide [emim][BEI], 1-butyl-3-methylimidazolium 1,1,2,3,3,3-hexafluoropropanesulfonate [bmim][HFPS], tetradecyl(trihexyl)phosphonium 1,1,2-trifluoro-2-(perfluoroethoxy)ethanesulfonate [6,6,6,14-P][TPES], tributyl(tetradecyl)phosphonium 1,1,2,3,3,3-hexafluoropropanesulfonate [4,4,4,14-P][HFPS].

Mixtures of ionic liquids may also be useful as lubricants.

In another embodiment, vapor compression systems herein may utilize at least one refrigerant selected from the group consisting of CHClF$_2$ (R-22), CHF$_3$ (R-23), CH$_2$F$_2$ (R-32), CH$_3$F (R-41), CHF$_2$CF$_3$ (R-125), CH$_2$FCF$_3$ (R-134a), CHF$_2$OCHF$_2$ (E-134), CH$_3$CClF$_2$ (R-142b), CH$_3$CF$_3$ (R-143a), CH$_3$CHF$_2$ (R-152a), CH$_3$CH$_2$F (R-161), CH$_3$OCH$_3$ (E170), CF$_3$CF$_2$CF$_3$ (R-218), CF$_3$CHFCF$_3$ (R-227ea), CF$_3$CH$_2$CF$_3$ (R-236fa), CH$_2$FCF$_2$CHF$_2$ (R-245ca), CHF$_2$CH$_2$CF$_3$ (R-245fa), CH$_3$CH$_2$CH$_3$ (R-290), CH$_3$CH$_2$CH$_2$CH$_3$ (R-600), CH(CH$_3$)$_2$CH$_3$ (R-600a), CH$_3$CH$_2$CH$_2$CH$_2$CH$_3$ (R-601), (CH$_3$)$_2$CHCH$_2$CH$_3$ (R-601a), CH$_3$CH$_2$OCH$_2$CH$_3$ (R-610), NH$_3$, CO$_2$, and CH$_3$CH=CH$_2$; and at least one ionic liquid comprising pyridinium, pyridazinium, pyrimidinium, pyrazinium, imidazolium, pyrazolium, thiazolium, oxazolium, triazolium, phosphonium, or ammonium as the cation and an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, SCN$^-$, [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_2$ICF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, and [(CF$_3$CFHCF$_2$SO$_2$)$_2$N]$^-$.

Vapor compression systems may also utilize at least one refrigerant blend selected from the group consisting of R-404A; R-407A; R-407B; R-407C; R-407D; R-407E; R-410A; R-410B; R-413A; 417A; R-419A; R-420A; 80.6% R-134a and 19.4% R-142b (by weight); R-421A; R-421B; R-422A; R-422B; R-422C; R-422D; R423A; R-424A; R-425A; R-426A; R-427A; 2.0% R-32, 41.0% R-125, 50.0% R-143a and 7.0% R-134a (by weight); 10.0% R-32, 33.0% R-125, 36.0% R-143a and 21.0% R-134a (by weight); R-428A; and R-507A; and at least one ionic liquid comprising pyridinium, pyridazinium, pyrimidinium, pyrazinium, imidazolium, pyrazolium, thiazolium, oxazolium, triazolium, phosphonium, or ammonium as the cation and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$, $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, and $[(CF_3CFHCF_2SO_2)_2N]^-$.

Vapor compression systems may also utilize at least one refrigerant selected from the group consisting of trifluoromethane (HFC-23), difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), R-404A, R-407C, R-410A, and $CO_2$; and at least one ionic liquid comprising pyridinium, pyridazinium, pyrimidinium, pyrazinium, imidazolium, pyrazolium, thiazolium, oxazolium, triazolium, phosphonium, or ammonium as the cation and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$, $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, and $[(CF_3CFHCF_2SO_2)_2N]^-$.

Vapor compression systems may also utilize at least one fluoroolefin refrigerant selected from the group consisting of:

(i) fluoroolefins of the formula E- or Z-$R^1CH=CHR^2$, wherein $R^1$ and $R^2$ are, independently, $C_1$ to $C_6$ perfluoroalkyl groups, and wherein the total number of carbons in the compound is at least 5;

(ii) cyclic fluoroolefins of the formula cyclo-$[CX=CY(CZW)_n$-$]$, wherein X, Y, Z, and W, independently, are H or F, and n is an integer from 2 to 5; and (iii) fluoroolefins selected from the group consisting of:
2,3,3-trifluoro-1-propene ($CHF_2CF=CH_2$); 1,1,2-trifluoro-1-propene ($CH_3CF=CF_2$); 1,2,3-trifluoro-1-propene ($CH_2FCF=CF_2$); 1,1,3-trifluoro-1-propene ($CH_2FCH=CF_2$); 1,3,3-trifluoro-1-propene ($CHF_2CH=CHF$); 1,1,1,2,3,4,4,4-octafluoro-2-butene ($CF_3CF=CFCF_3$); 1,1,2,3,3,4,4,4-octafluoro-1-butene ($CF_3CF_2CF=CF_2$); 1,1,1,2,4,4,4-heptafluoro-2-butene ($CF_3CF=CHCF_3$); 1,2,3,3,4,4,4-heptafluoro-1-butene ($CHF=CFCF_2CF_3$); 1,1,1,2,3,4,4-heptafluoro-2-butene ($CHF_2CF=CFCF_3$); 1,3,3,3-tetrafluoro-2-(trifluoromethyl)-1-propene (($CF_3)_2C=CHF$); 1,1,3,3,4,4,4-heptafluoro-1-butene ($CF_2=CHCF_2CF_3$); 1,1,2,3,4,4,4-heptafluoro-1-butene ($CF_2=CFCHFCF_3$); 1,1,2,3,3,4,4-heptafluoro-1-butene ($CF_2=CFCF_2CHF_2$); 2,3,3,4,4,4-hexafluoro-1-butene ($CF_3CF_2CF=CH_2$); 1,3,3,4,4,4-hexafluoro-1-butene ($CHF=CHCF_2CF_3$); 1,2,3,4,4,4-hexafluoro-1-butene ($CHF=CFCHFCF_3$); 1,2,3,3,4,4-hexafluoro-1-butene ($CHF=CFCF_2CHF_2$); 1,1,2,3,4,4-hexafluoro-1-butene ($CF_2=CFCHFCHF_2$); 1,1,1,2,3,4-hexafluoro-2-butene ($CF_3CF=CFCHF_2$); 1,1,1,2,4,4-hexafluoro-2-butene ($CHF_2CH=CFCF_3$); 1,1,3,3,4,4-hexafluoro-2-butene ($CF_3CH=CFCHF_2$); 1,1,2,3,3,4-hexafluoro-1-butene ($CF_2=CFCF_2CH_2F$); 1,1,2,3,4,4-hexafluoro-1-butene ($CF_2=CFCHFCHF_2$); 3,3,3-trifluoro-2-(trifluoromethyl)-1-propene ($CH_2=C(CF_3)_2$); 1,1,1,2,4-pentafluoro-2-butene ($CH_2FCH=CFCF_3$); 1,1,1,3,4-pentafluoro-2-butene ($CF_3CH=CFCH_2F$); 3,3,4,4,4-pentafluoro-1-butene ($CF_3CF_2CH=CH_2$); 1,1,1,4,4-pentafluoro-2-butene ($CHF_2CH=CHCF_3$); 1,1,1,2,3-pentafluoro-2-butene ($CH_3CF=CFCF_3$); 2,3,3,4,4-pentafluoro-1-butene ($CH_2=CFCF_2CHF_2$); 1,1,2,4,4-pentafluoro-2-butene ($CHF_2CF=CHCHF_2$); 1,1,2,3,3-pentafluoro-1-butene ($CH_3CF_2CF=CF_2$); 1,1,2,3,4-pentafluoro-2-butene ($CH_2FCF=CFCHF_2$); 1,1,3,3,3-pentafluoro-2-methyl-1-propene ($CF_2=C(CF_3)(CH_3)$); 2-(difluoromethyl)-3,3,3-trifluoro-1-propene ($CH_2=C(CHF_2)(CF_3)$); 2,3,4,4,4-pentafluoro-1-butene ($CH_2=CFCHFCF_3$); 1,2,4,4,4-pentafluoro-1-butene ($CHF=CFCH_2CF_3$); 1,3,4,4,4-pentafluoro-1-butene ($CHF=CHCHFCF_3$); 1,3,3,4,4-pentafluoro-1-butene ($CHF=CHCF_2CHF_2$); 1,2,3,4,4-pentafluoro-1-butene ($CHF=CFCHFCHF_2$); 3,3,4,4-tetrafluoro-1-butene ($CH_2=CHCF_2CHF_2$); 1,1-difluoro-2-(difluoromethyl)-1-propene ($CF_2=C(CHF_2)(CH_3)$); 1,3,3,3-tetrafluoro-2-methyl-1-propene ($CHF=C(CF_3)(CH_3)$); 3,3-difluoro-2-(difluoromethyl)-1-propene ($CH_2=C(CHF_2)_2$); 1,1,1,2-tetrafluoro-2-butene ($CF_3CF=CHCH_3$); 1,1,1,3-tetrafluoro-2-butene ($CH_3CF=CHCF_3$); 1,1,1,2,3,4,4,5,5,5-decafluoro-2-pentene ($CF_3CF=CFCF_2CF_3$); 1,1,2,3,3,4,4,5,5,5-decafluoro-1-pentene ($CF_2=CFCF_2CF_2CF_3$); 1,1,1,4,4,4-hexafluoro-2-(trifluoromethyl)-2-butene (($CF_3)_2C=CHCF_3$); 1,1,1,2,4,4,5,5,5-nonafluoro-2-pentene ($CF_3CF=CHCF_2CF_3$); 1,1,1,3,4,4,5,5,5-nonafluoro-2-pentene ($CF_3CH=CFCF_2CF_3$); 1,2,3,3,4,4,5,5,5-nonafluoro-1-pentene ($CHF=CFCF_2CF_2CF_3$); 1,1,3,3,4,4,5,5,5-nonafluoro-1-pentene ($CF_2=CHCF_2CF_2CF_3$); 1,1,2,3,3,4,4,5,5-nonafluoro-1-pentene ($CF_2=CFCF_2CF_2CHF_2$); 1,1,2,3,4,4,5,5,5-nonafluoro-2-pentene ($CHF_2CF=CFCF_2CF_3$); 1,1,1,2,3,4,4,5,5-nonafluoro-2-pentene ($CF_3CF=CFCF_2CHF_2$); 1,1,1,2,3,4,5,5,5-nonafluoro-2-pentene ($CF_3 CF=CFCHFCF_3$); 1,2,3,4,4,4-hexafluoro-3-(trifluoromethyl)-1-butene ($CHF=CFCF(CF_3)_2$); 1,1,2,4,4,4-hexafluoro-3-(trifluoromethyl)-1-butene ($CF_2=CFCH(CF_3)_2$); 1,1,1,4,4,4-hexafluoro-2-(trifluoromethyl)-2-butene ($CF_3 CH=C(CF_3)_2$); 1,1,3,4,4,4-hexafluoro-3-(trifluoromethyl)-1-butene ($CF_2=CHCF(CF_3)_2$); 2,3,3,4,4,5,5,5-octafluoro-1-pentene ($CH_2=CFCF_2CF_2CF_3$); 1,2,3,3,4,4,5,5-octafluoro-1-pentene ($CHF=CFCF_2CF_2CHF_2$); 3,3,4,4,4-pentafluoro-2-(trifluoromethyl)-1-butene ($CH_2=C(CF_3)CF_2CF_3$); 1,1,4,4,4-pentafluoro-3-(trifluoromethyl)-1-butene ($CF_2=CHCH(CF_3)_2$); 1,3,4,4,4-pentafluoro-3-(trifluoromethyl)-1-butene ($CHF=CHCF(CF_3)_2$); 1,1,4,4,4-pentafluoro-2-(trifluoromethyl)-1-butene ($CF_2=C(CF_3)CH_2CF_3$); 3,4,4,4-tetrafluoro-3-(trifluoromethyl)-1-butene (($CF_3)_2CFCH=CH_2$); 3,3,4,4,5,5,5-heptafluoro-1-pentene ($CF_3CF_2CF_2CH=CH_2$); 2,3,3,4,4,5,5-heptafluoro-1-pentene ($CH_2=CFCF_2CF_2CHF_2$); 1,1,3,3,5,5,5-heptafluoro-1-butene ($CF_2=CHCF_2CH_2CF_3$); 1,1,1,2,4,4,4-heptafluoro-3-methyl-2-butene ($CF_3CF=C(CF_3)(CH_3)$); 2,4,4,4-tetrafluoro-3-(trifluoromethyl)-1-butene ($CH_2=CFCH(CF_3)_2$); 1,4,4,4-tetrafluoro-3-(trifluoromethyl)-1-butene ($CHF=CHCH(CF_3)_2$); 1,1,1,4-tetrafluoro-2-(trifluoromethyl)-2-butene ($CH_2FCH=C(CF_3)_2$); 1,1,1,3-tetrafluoro-2-(trifluoromethyl)-2-butene ($CH_3CF=C(CF_3)_2$); 1,1,1-trifluoro-2-(trifluoromethyl)-2-butene (($CF_3)_2C=CHCH_3$); 3,4,4,5,5,5-hexafluoro-2-pentene ($CF_3CF_2CF=CHCH_3$); 1,1,1,4,4,4-hexafluoro-2-methyl-2-butene ($CF_3C(CH_3)=CHCF_3$); 3,3,4,5,5,5-hexafluoro-1-pentene ($CH_2=CHCF_2CHFCF_3$); 4,4,4-trifluoro-3-(trifluoromethyl)-1-butene (CH$_2$═C(CF$_3$)CH$_2$CF$_3$); 1,1,2,3,3,4,4,5,5,6, 6,6-dodecafluoro-1-hexene (CF$_3$(CF$_2$)$_3$CF═CF$_2$); 1,1,1,2,2, 3,4,5,5,6,6,6-dodecafluoro-3-hexene (CF$_3$CF$_2$CF═CFCF$_2$CF$_3$); 1,1,1,4,4,4-hexafluoro-2,3-bis (trifluoromethyl)-2-butene ((CF$_3$)$_2$C═C(CF$_3$)$_2$); 1,1,1,2,3,4, 5,5,5-nonafluoro-4-(trifluoromethyl)-2-pentene ((CF$_3$)$_2$CFCF═CFCF$_3$); 1,1,1,4,4,5,5,5-octafluoro-2-(trifluoromethyl)-2-pentene ((CF$_3$)$_2$C═CHC$_2$F$_5$); 1,1,1,3,4,5,5,5-octafluoro-4-(trifluoromethyl)-2-pentene ((CF$_3$)$_2$CFCF═CHCF$_3$); 3,3,4,4,5,5,6,6-nonafluoro-1-hexene (CF$_3$CF$_2$CF$_2$CF$_2$CH═CH$_2$); 4,4,4-trifluoro-3,3-bis(trifluoromethyl)-1-butene (CH$_2$═CHC(CF$_3$)$_3$); 1,1,1,4,4,4-hexafluoro-2-(trifluoromethyl)-3-methyl-2-butene ((CF$_3$)$_2$C═C(CH$_3$)(CF$_3$)); 2,3,3,5,5,5-hexafluoro-4-(trifluoromethyl)-1-pentene (CH$_2$═CFCF$_2$CH(CF$_3$)$_2$); 1,1,1,2,4,4,5,5, 5-nonafluoro-3-methyl-2-pentene (CF$_3$CF═C(CH$_3$)CF$_2$CF$_3$); 1,1,1,5,5,5-hexafluoro-4-(trifluoromethyl)-2-pentene (CF$_3$CH═CHCH(CF$_3$)$_2$); 3,4,4,5,5,6,6,6-octafluoro-2-hexene (CF$_3$CF$_2$CF$_2$CF═CHCH$_3$); 3,3,4,4,5,5, 5,6,6-octafluoro 1-hexene (CH$_2$═CHCF$_2$CF$_2$CF$_2$CHF$_2$); 1,1,1,4,4-pentafluoro-2-(trifluoromethyl)-2-pentene ((CF$_3$)$_2$C═CHCF$_2$CH$_3$); 4,4,5,5,5-pentafluoro-2-(trifluoromethyl)-1-pentene (CH$_2$═C(CF$_3$)CH$_2$C$_2$F$_5$); 3,3,4,4,5,5,5-heptafluoro-2-methyl-1-pentene (CF$_3$CF$_2$CF$_2$C(CH$_3$)═CH$_2$); 4,4,5,5,6,6,6-heptafluoro-2-hexene (CF$_3$CF$_2$CF$_2$CH═CHCH$_3$); 4,4,5,5,6,6,6-heptafluoro-1-hexene (CH$_2$═CHCH$_2$CF$_2$C$_2$F$_5$); 1,1,1,2,2,3,4-heptafluoro-3-hexene (CF$_3$CF$_2$CF═CFC$_2$H$_5$); 4,5,5,5-tetrafluoro-4-(trifluoromethyl)-1-pentene (CH$_2$═CHCH$_2$CF(CF$_3$)$_2$); 1,1,1,2, 5,5,5-heptafluoro-4-methyl-2-pentene (CF$_3$CF═CHCH(CF$_3$)(CH$_3$)); 1,1,1,3-tetrafluoro-2-(trifluoromethyl)-2-pentene ((CF$_3$)$_2$C═CFC$_2$H$_5$); 1,1,1,2,3,4,4,5,5,6,6,7,7,7-tetradecafluoro-2-heptene (CF$_3$CF═CFCF$_2$CF$_2$C$_2$F$_5$); 1,1, 1,2,2,3,4,5,5,6,6,7,7,7-tetradecafluoro-3-heptene (CF$_3$CF$_2$CF═CFCF$_2$C$_2$F$_5$); 1,1,1,3,4,4,5,5,6,6,7,7,7-tridecafluoro-2-heptene (CF$_3$CH═CFCF$_2$CF$_2$C$_2$F$_5$); 1,1,1,2,4,4, 5,5,6,6,7,7,7-tridecafluoro-2-heptene (CF$_3$CF═CHCF$_2$CF$_2$C$_2$F$_5$); 1,1,1,2,2,4,5,5,6,6,7,7,7-tridecafluoro-3-heptene (CF$_3$CF$_2$CH═CFCF$_2$C$_2$F$_5$); 1,1,1,2,2,3, 5,5,6,6,7,7,7-tridecafluoro-3-heptene (CF$_3$CF$_2$CF═CHCF$_2$C$_2$F$_5$); CF$_2$═CFOCF$_2$CF$_3$ (PEVE) and CF$_2$═CFOCF$_3$ (PMVE); and at least one ionic liquid comprising pyridinium, pyridazinium, pyrimidinium, pyrazinium, imidazolium, pyrazolium, thiazolium, oxazolium, triazolium, phosphonium, or ammonium as the cation and an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, SCN$^-$, [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_2$ICF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, and [(CF$_3$CFHCF$_2$SO$_2$)$_2$N]$^-$.

Vapor compression systems may also utilize at least one refrigerant comprising pentafluoroethane (R-125), 1,1,1,2-tetrafluoroethane (R-134a), and at least two hydrocarbons each having eight or fewer carbon atoms, wherein said at least two hydrocarbons can be C$_4$ to C$_8$ hydrocarbons, and more specifically n-butane and n-pentane; and at least one ionic liquid comprising pyridinium, pyridazinium, pyrimidinium, pyrazinium, imidazolium, pyrazolium, thiazolium, oxazolium, triazolium, phosphonium, or ammonium as the cation and an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, SCN$^-$, [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_2$ICF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, and [(CF$_3$CFHCF$_2$SO$_2$)$_2$N]$^-$.

Vapor compression systems may also utilize at least one refrigerant selected from the group consisting of trifluoromethane (HFC-23), difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), R-404A, R-407C, HFC-410A, and CO$_2$; and at least one ionic liquid selected from the group consisting of 1-butyl-3-methylimidazolium hexafluorophosphate [bmim][PF$_6$], 1-butyl-3-methylimidazolium tetrafluoroborate [bmim][BF$_4$], 1,2-dimethyl-3-propylimidazolium tris(trifluoromethylsulfonyl)methide [dmpim][TMeM], 1-octyl-3-methylimidazolium iodide [omim][I], 1,3-dioctylimidazolium iodide [doim][I], 1-ethyl-3-methylimidazolium bis(pentafluoroethylsulfonyl)imide [emim][BEI], 1,2-dimethyl-3-propylimidazolium bis(trifluoromethylsulfonyl)imide [dmpim][BMeI], 3-methyl-1-propylpyridinium bis(trifluoromethylsulfonyl)imide [pmpy][BMeI], 1-ethyl-3-methylimidazolium hexafluorophosphate [emim][PF$_6$], 1-ethyl-3-methylimidazolium bis(trifluoroethylsulfonyl)imide [emim][BMeI], 1-butyl-3-methylpyridinium bis(trifluoromethylsulfonyl)imide [bmpy][BMeI], 1-ethyl-3-methylimidazolium 1,1,2,2-tetrafluoroethanesulfonate [emim][TFES], 1-butyl-3-methylimidazolium 1,1,2,2-tetrafluoroethanesulfonate [bmim][TFES], 1-dodecyl-3-methylimidazolium 1,1,2,2-tetrafluoroethanesulfonate [dmim][TFES], 1-heptyl-3-methylimidazolium 1,1,2,2-tetrafluoroethanesulfonate [hmim][TFES], 1-butyl-3-methylimidazolium acetate [bmim][Ac], 1-butyl-3-methylimidazolium 2-(1,2,2,2-tetrafluoroethoxy)-1,1,2,2-tetrafluoroethanesulfonate [bmim][FS], 1-butyl-3-methylimidazolium 1,1,2,3,3,3-hexafluoropropanesulfonate [bmim][HFPS], 1-butyl-3-methylimidazolium methyl sulfonate [bmim][MeSO$_4$], 1-butyl-3-methylimidazolium thiocyanate [bmim][SCN], 1-butyl-3-methylimidazolium 1,1,2-trifluoro-2-(perfluoroethoxy)ethanesulfonate [bmim][TPES], 1-butyl-3-methylimidazolium 1,1,2-trifluoro-2-(trifluoromethoxy)ethanesulfonate [bmim][TTES], 1-butyl-3-methylimidazolium 1,1,2-trifluoro-2-(trifluoromethoxy)ethanesulfonate [bmim][TTES], 1-butyl-3-methylimidazolium 1,1,2-trifluoro-2-(perfluoroethoxy)ethanesulfonate [bmim][TPES], 1-ethyl-3-methylimidazolium bis(pentafluoroethylsulfonyl)imide [emim][BEI], 1-butyl-3-methylimidazolium 1,1,2,3,3-hexafluoropropanesulfonate [bmim][HFPS], tetradecyl(trihexyl)phosphonium 1,1,2-trifluoro-2-(perfluoroethoxy) ethanesulfonate [6,6,6,14-P][TPES], and tributyl(tetradecyl)phosphonium 1,1,2,3,3,3-hexafluoropropanesulfonate [4,4, 4,14-P][HFPS].

In another embodiment, combinations of refrigerant and lubricant useful for vapor compression systems may include difluoromethane (HFC-32) and 1-butyl-3-methylimidazolium hexafluorophosphate [bmim][PF$_6$], difluoromethane (HFC-32) and 1-butyl-3-methylimidazolium tetrafluoroborate [bmim][BF$_4$], pentafluoroethane (HFC-125) and 1-butyl-3-methylimidazolium hexafluorophosphate [bmim]

[PF$_6$], 1,1,1,2-tetrafluoroethane (HFC-134a) and 1-butyl-3-methylimidazolium hexafluorophosphate [bmim][PF$_6$], 1,1,1-trifluoroethane (HFC-143a) and 1-butyl-3-methylimidazolium hexafluorophosphate [bmim][PF$_6$], 1,1-difluoroethane (HFC-152a) and 1-butyl-3-methylimidazolium hexafluorophosphate [bmim][PF$_6$], difluoromethane (HFC-32) and 1,2-dimethyl-3-propylimidazolium tris(trifluoromethylsulfonyl)methide [dmpim][TMeM], difluoromethane (HFC-32) and 1-octyl-3-methylimidazolium iodide [omim][I], difluoromethane (HFC-32) and 1,3-dioctylimidazolium iodide [doim][I], difluoromethane (HFC-32) and 1-ethyl-3-methylimidazolium bis(pentafluoroethylsulfonyl)imide [emim][BEI], difluoromethane (HFC-32) and 1,2-dimethyl-3-propylimidazolium bis(trifluoromethylsulfonyl)imide [dmpim][BMeI], difluoromethane (HFC-32) and 3-methyl-1-propylpyridinium bis(trifluoromethylsulfonyl)imide [pmpy][BMeI], trifluoromethane (HFC-23) and 1-butyl-3-methylimidazolium hexafluorophosphate [bmim][PF$_6$], trifluoromethane (HFC-23) and 1-ethyl-3-methylimidazolium hexafluorophosphate [emim][PF$_6$], difluoromethane (HFC-32) and 1-ethyl-3-methylimidazolium bis(trifluoroethylsulfonyl)imide [emim][BMeI], difluoromethane (HFC-32) and 1-butyl-3-methylpyridinium bis(trifluoromethylsulfonyl)imide [bmpy][BMeI], difluoromethane (HFC-32) and 1-ethyl-3-methylimidazolium 1,1,2,2-tetrafluoroethanesulfonate [emim][TFES], difluoromethane (HFC-32) and 1-butyl-3-methylimidazolium 1,1,2,2-tetrafluoroethanesulfonate [bmim][TFES], difluoromethane (HFC-32) and 1-dodecyl-3-methylimidazolium 1,1,2,2-tetrafluoroethanesulfonate [dmim][TFES], difluoromethane (HFC-32) and 1-heptyl-3-methylimidazolium 1,1,2,2-tetrafluoroethanesulfonate [hmim][TFES], difluoromethane (HFC-32) and 1-butyl-3-methylimidazolium acetate [bmim][Ac], (HFC-32) and 1-butyl-3-methylimidazolium 2-(1,2,2,2-tetrafluoroethoxy)-1,1,2,2-tetrafluoroethanesulfonate [bmim][FS], difluoromethane (HFC-32) and 1-butyl-3-methylimidazolium 1,1,2,3,3,3-hexafluoropropanesulfonate [bmim][HFPS], difluoromethane (HFC-32) and 1-butyl-3-methylimidazolium methyl sulfonate [bmim][MeSO$_4$], difluoromethane (HFC-32) and 1-butyl-3-methylimidazolium thiocyanate [bmim][SCN], difluoromethane (HFC-32) and 1-butyl-3-methylimidazolium 1,1,2-trifluoro-2-(perfluoroethoxy)ethanesulfonate [bmim][TPES], difluoromethane (HFC-32) and 1-butyl-3-methylimidazolium 1,1,2-trifluoro-2-(trifluoromethoxy)ethanesulfonate [bmim][TTES], 1,1,1,2-tetrafluoroethane (HFC-134a) and 1-butyl-3-methylimidazolium 1,1,2-trifluoro-2-(trifluoromethoxy)ethanesulfonate [bmim][TTES], 1,1,1,2-tetrafluoroethane (HFC-134a) and 1-butyl-3-methylimidazolium 1,1,2-trifluoro-2-(perfluoroethoxy)ethanesulfonate [bmim][TPES], 1,1,1,2-tetrafluoroethane (HFC-134a) and 1-ethyl-3-methylimidazolium bis(pentafluoroethylsulfonyl)imide [emim][BEI], 1,1,1,2-tetrafluoroethane (HFC-134a) and 1-butyl-3-methylimidazolium 1,1,2,3,3-hexafluoropropanesulfonate [bmim][HFPS], 1,1,1,2-tetrafluoroethane (HFC-134a) and tetradecyl(trihexyl)phosphonium 1,1,2-trifluoro-2-(perfluoroethoxy)ethanesulfonate [6,6,6,14-P][TPES], 1,1,1,2-tetrafluoroethane (HFC-134a) and tributyl(tetradecyl)phosphonium 1,1,2,3,3,3-hexafluoropropanesulfonate [4,4,4,14-P][HFPS], carbon dioxide (CO$_2$) and 1-butyl-3-methylimidazolium hexafluorophosphate [bmim][PF$_6$], carbon dioxide (CO$_2$) and 1-butyl-3-methylimidazolium tetrafluoroborate [bmim][BF$_4$].

In alternative embodiments of this invention, a refrigerant may be any one or more of all of the members of the total group of refrigerants disclosed herein. In those embodiments, the refrigerant may also, however, be any one or more of those members of a subgroup of the total group of refrigerants disclosed herein, where the subgroup is formed by excluding any one or more other members from the total group. As a result, the refrigerant in those embodiments may not only be any one or more of the refrigerants in any subgroup of any size that may be selected from the total group of refrigerants in all the various different combinations of individual members of the total group, but the members in any subgroup may thus be used in the absence of one or more of the members of the total group that have been excluded to form the subgroup. The subgroup formed by excluding various members from the total group of refrigerants may, moreover, be an individual member of the total group such that that refrigerant is used in the absence of all other members of the total group except the selected individual member.

Correspondingly, in further alternative embodiments of this invention, an ionic liquid may be any one or more of all of the members of the total group of ionic liquids disclosed herein. In those embodiments, the liquid may also, however, be any one or more of those members of a subgroup of the total group of ionic liquids disclosed herein, where the subgroup is formed by excluding any one or more other members from the total group. As a result, the ionic liquid in those embodiments may not only be any one or more of the ionic liquids in any subgroup of any size that may be selected from the total group of ionic liquids in all the various different combinations of individual members of the total group, but the members in any subgroup may thus be used in the absence of one or more of the members of the total group that have been excluded to form the subgroup. The subgroup formed by excluding various members from the total group of ionic liquids may, moreover, be an individual member of the total group such that that ionic liquid is used in the absence of all other members of the total group except the selected individual member.

As a result, in yet other alternative embodiments of this invention, pairings of one or more particular refrigerants and one or more particular ionic liquids may be formed from (i) any one or more of all of the members of the total group of refrigerants disclosed herein, selected as described above as a single member or any subgroup of any size taken from the total group of refrigerants in all the various different combinations of individual members of that total group, together with (ii) any one or more of all of the members of the total group of ionic liquids disclosed herein, selected as described above as a single member or any subgroup of any size taken from the total group of ionic liquids in all the various different combinations of individual members of that total group.

The following examples are presented to illustrate the advantages of the present invention and to assist one of ordinary skill in making and using the same. These examples are not intended in any way otherwise to limit the scope of the disclosure or the appended claims. The operation of this invention is illustrated in terms of the extent of solubility of various refrigerants and various ionic liquids in or with each other.

General Methods and Materials

1-Butyl-3-methylimidazolium hexafluorophosphate ([bmim][PF$_6$], C$_8$H$_{15}$N$_2$F$_6$P, molecular weight 284 g mol$^{-1}$), 1-butyl-3-methylimidazolium tetrafluoroborate ([bmim][BF$_4$], C$_8$H$_{15}$N$_2$F$_4$B, molecular weight 226 g mol$^{-1}$), 1,2-dimethyl-3-propylimidazolium tris(trifluoromethylsulfonyl)methide ([dmpim][tTFMSmethide], C$_{12}$H$_{15}$N$_2$F$_9$O$_6$S$_3$, molecular weight 550 g mol$^{-1}$), 1,2-dimethyl-3-propylimidazolium bis(trifluoromethylsulfonyl)imide ([dmpim][bTFM-Simide], $C_{10}H_{15}N_3F_6O_4S_2$, molecular weight 419 g mol$^{-1}$), 1-ethyl-3-methylimidazolium bis(pentafluoroethylsulfonyl) imide ([emim][bPFESimide], $C_{10}H_{11}N_3F_{10}O_4S_2$, molecular weight 491.33 g mol$^{-1}$), 1-propyl-3-methylpyridinium bis (trifluoromethylsulfonyl)imide ([pmpy][bTFMSimide], $C_{11}H_{14}N_2F_6O_4S_2$, molecular weight 416.36 g mol$^{-1}$), 1-ethyl-3-methylimidazolium hexafluorophosphate ([emim] [PF$_6$], $C_6H_{11}F_6N_2P$, molecular weight 265.13 g mol$^{-1}$), 1-ethyl-3-methylimidazolium bis(trifluoromethylsulfonyl) imide ([emim][BMeI], $C_8H_{11}F_6N_3O_4S_2$, molecular weight 197.98 g mol$^{-1}$), 1-butyl-3-methylpyridinium bis(trifluoromethylsulfonyl)imide ([BMPy][bTFMSimide], $C_{12}H_{16}F_6N_2O_4S_2$, molecular weight 430.39 g mol$^{-1}$) were each obtained from Fluka Chemika (may be obtained from Sigma-Aldrich, St. Louis, Mo.) with a purity of >96 to 97% each. Trifluoromethane (HFC-23), difluoromethane (HFC-32, $CH_2F_2$, molecular weight 52.02 g mol$^{-1}$), pentafluoroethane (HFC-125, $C_2HF_5$, molecular weight 120.02 g mol$^{-1}$), 1,1,1,2-tetrafluoroethane (HFC-134a, $C_2H_2F_4$, molecular weight 102.03 g mol$^{-1}$), 1,1,1-trifluoroethane (HFC-143a, $C_2H_3F_3$, molecular weight 82.04 g mol$^{-1}$), and 1,1-difluoroethane (HFC-152a, $C_2H_4F_2$, molecular weight 66.05 g mol$^{-1}$) were obtained from DuPont Fluorochemicals (Wilmington, Del.), with a minimum purity of 99.99%. A molecular sieve trap was installed to remove trace amounts of water from the gases and each of the ionic liquids tested were degassed prior to making solubility measurements.

The following nomenclature and abbreviations are used:
C=concentration (mol·m$^{-3}$)
$C_b$=buoyancy force (N)
$C_f$=correction factor (kg)
$C_0$=initial concentration (mol·m$^{-3}$)
$C_s$=saturation concentration (mol·m$^{-3}$)
C>=space-averaged concentration (mol·m$^{-3}$)
D=diffusion constant (m$^2$·s$^{-1}$)
g=gravitational acceleration (9.80665 m·s$^{-2}$)
L=length (m)
$m_a$=mass absorbed (kg)=
$m_i$=mass of i-th species on sample side of balance (kg)
$m_j$=mass of j-th species on counterweight side of balance (kg)
$m_{IL}$=mass of ionic liquid sample (kg)
$MW_i$=molecular weight of i-th species (kg·mol$^{-1}$)
N=n-th number component
P=pressure (MPa)
$P_0$ initial pressure (MPa)
t=time (s)
$T_{ci}$=critical temperature of i-th species (K)
$T_i$=temperature of i-th species (K)
$T_j$=temperature of j-th species (K)
$T_s$=temperature of sample (K)
$V_i$=volume of i-th species (m$^3$)
$V_{IL}$=volume of ionic liquid (m$^3$)
$\tilde{V}_m$=liquid sample volume (m$^3$)
$\tilde{V}_g$=molar volume of gas (m$^3$·mol$^{-1}$)
$\tilde{V}_i$=molar volume of i-th species (m$^3$·mol$^1$)
$\tilde{V}_{IL}$=molar volume of ionic liquid (m$^3$·mol$^{-1}$)
$\tilde{V}_m$=molar volume of mixture (m$^3$·mol$^{-1}$)
$\tilde{V}_0$=initial molar volume (m$^3$·mol$^{-1}$)
$\Delta \tilde{V}$=change in molar volume (m$^3$·mol$^{-1}$)
$x_i$=mole fraction of i-th species
z=depth (m)
$\lambda_n$=eigenvalue (m$^{-1}$)
$\rho_g$=density of gas (kg·m$^{-3}$)
$\rho_i$=density of i-th component on sample side of balance (kg·m$^{-3}$)
$\rho_j$=density of j-th component on counter weight side of balance (kg·m$^{-3}$)
$\rho_{air}$=density of air (kg·m$^{-3}$)
$\rho_s$=density of sample (kg·m$^3$)

Units
Pa=Pascal
MPa=Mega Pascal
mol=mole
m=meter
cm=centimeter
K=Kelvin
N=Newton
J=Joule
kJ=kilojoule
kg=kilogram
mg=milligram
µg=microgram
T=temperature
P=pressure
mbar=millibar
min=minute
° C. or C=degrees Centigrade
° F.=degrees Fahrenheit
sec=second
kW=kilowatt
kg/s=kilogram/second In the following description, (A)-(D) provide syntheses for anions of ionic liquids that are useful as lubricants for the invention, and (E)-(W) provide syntheses for ionic liquids useful as lubricants for the invention.

Preparation of Anions not Generally Available Commercially (A) Synthesis of Potassium 1,1,2,2-tetrafluoroethanesulfonate (TFES-K) ([$HCF_2CF_2SO_3$]$^-$)

A 1-gallon Hastelloy® C276 reaction vessel was charged with a solution of potassium sulfite hydrate (176 g, 1.0 mol), potassium metabisulfite (610 g, 2.8 mol) and deionized water (2000 ml). The pH of this solution was 5.8. The vessel was cooled to 18 degrees C., evacuated to 0.10 MPa, and purged with nitrogen. The evacuate/purge cycle was repeated two more times. To the vessel was then added tetrafluoroethylene (TFE, 66 g), and it was heated to 100 degrees C. at which time the inside pressure was 1.14 MPa. The reaction temperature was increased to 125 degrees C. and kept there for 3 h. As the TFE pressure decreased due to the reaction, more TFE was added in small aliquots (20-30 g each) to maintain operating pressure roughly between 1.14 and 1.48 MPa. Once 500 g (5.0 mol) of TFE had been fed after the initial 66 g precharge, the vessel was vented and cooled to 25 degrees C. The pH of the clear light yellow reaction solution was 10-11. This solution was buffered to pH 7 through the addition of potassium metabisulfite (16 g).

The water was removed in vacuo on a rotary evaporator to produce a wet solid. The solid was then placed in a freeze dryer (Virtis Freezemobile 35xl; Gardiner, N.Y.) for 72 hr to reduce the water content to approximately 1.5 wt % (1387 g crude material). The theoretical mass of total solids was 1351 g. The mass balance was very close to ideal and the isolated solid had slightly higher mass due to moisture. This added freeze drying step had the advantage of producing a free-flowing white powder whereas treatment in a vacuum oven resulted in a soapy solid cake that was very difficult to remove and had to be chipped and broken out of the flask.

The crude TFES-K can be further purified and isolated by extraction with reagent grade acetone, filtration, and drying.

$^{19}$F NMR (D$_2$O) δ. −122.( (dt, J$_{FH}$=6 Hz, J$_{FF}$=6 Hz, 2F); −136.1 (dt, J$_{FH}$=53 Hz, 2F).
$^{1}$H NMR (D$_2$O) δ. 6.4 (tt, J$_{FH}$=53 Hz, J$_{FH}$=6 Hz, 1H).
% Water by Karl-Fisher titration: 580 ppm.
Analytical calculation for C$_2$HO$_3$F$_4$SK: C, 10.9; H, 0.5; N, 0.0. Experimental results: C, 11.1; H, 0.7; N, 0.2.
Mp (DSC): 242 degrees C.
TGA (air): 10% wt. loss @ 367 degrees C., 50% wt. loss @ 375 degrees C.
TGA (N$_2$): 10% wt. loss @ 363 degrees C., 50% wt. loss @ 375 degrees C.

(B) Synthesis of potassium-1,1,2-trifluoro-2-(perfluoroethoxy)ethanesulfonate (TPES-K)

A 1-gallon Hastelloy® C276 reaction vessel was charged with a solution of potassium sulfite hydrate (88 g, 0.56 mol), potassium metabisulfite (340 g, 1.53 mol) and deionized water (2000 ml). The vessel was cooled to 7 degrees C., evacuated to 0.05 MPa, and purged with nitrogen. The evacuate/purge cycle was repeated two more times. To the vessel was then added perfluoro(ethylvinyl ether) (PEVE, 600 g, 2.78 mol), and it was heated to 125 degrees C. at which time the inside pressure was 2.31 MPa. The reaction temperature was maintained at 125 degrees C. for 10 hr. The pressure dropped to 0.26 MPa at which point the vessel was vented and cooled to 25 degrees C. The crude reaction product was a white crystalline precipitate with a colorless aqueous layer (pH=7) above it.

The $^{19}$F NMR spectrum of the white solid showed pure desired product, while the spectrum of the aqueous layer showed a small but detectable amount of a fluorinated impurity. The desired isomer is less soluble in water so it precipitated in isomerically pure form.

The product slurry was suction filtered through a fritted glass funnel, and the wet cake was dried in a vacuum oven (60 degrees C., 0.01 MPa) for 48 hr. The product was obtained as off-white crystals (904 g, 97% yield).
$^{19}$F NMR (D$_2$O) δ −86.5.( (s, 3F); −89.2, −91.3 (subsplit ABq, J$_{FF}$=147 Hz, 2F); −119.3, −121.2 (subsplit ABq, J$_{FF}$=258 Hz, 2F); −144.3 (dm, J$_{FH}$=53 Hz, 1F).
$^{1}$H NMR (D$_2$O) δ 6.7 (dm, J$_{FH}$=53 Hz, 1H).
Mp (DSC) 263 degrees C.
Analytical calculation for C$_4$HO$_4$F$_8$SK: C, 14.3; H, 0.3. Experimental results: C, 14.1; H, 0.3.
TGA (air): 10% wt. loss @ 359 degrees C., 50% wt. loss @ 367 degrees C.
TGA (N$_2$): 10% wt. loss @ 362 degrees C., 50% wt. loss @ 374 degrees C.

(C) Synthesis of Potassium-1,1,2-trifluoro-2-(trifluoromethoxy)ethanesulfonate (TTES-K)

A 1-gallon Hastelloy® C276 reaction vessel was charged with a solution of potassium sulfite hydrate (114 g, 0.72 mol), potassium metabisulfite (440 g, 1.98 mol) and deionized water (2000 ml). The pH of this solution was 5.8. The vessel was cooled to −35 degrees C., evacuated to 0.08 MPa, and purged with nitrogen. The evacuate/purge cycle was repeated two more times. To the vessel was then added perfluoro (methylvinyl ether) (PMVE, 600 g, 3.61 mol) and it was heated to 125 degrees C. at which time the inside pressure was 3.29 MPa. The reaction temperature was maintained at 125 degrees C. for 6 hr. The pressure dropped to 0.27 MPa at which point the vessel was vented and cooled to 25 degrees C.

Once cooled, a white crystalline precipitate of the desired product formed leaving a colorless clear aqueous solution above it (pH=7).

The $^{19}$F NMR spectrum of the white solid showed pure desired product, while the spectrum of the aqueous layer showed a small but detectable amount of a fluorinated impurity.

The solution was suction filtered through a fritted glass funnel for 6 hr to remove most of the water. The wet cake was then dried in a vacuum oven at 0.01 MPa and 50 degrees C. for 48 h. This gave 854 g (83% yield) of a white powder. The final product was isomerically pure (by $^{19}$F and $^{1}$H NMR) since the undesired isomer remained in the water during filtration.
$^{19}$F NMR (D$_2$O) δ. −59.9.( (d, J$_{FH}$=4 Hz, 3F); −119.6, −120.2 (subsplit ABq, J=260 Hz, 2F); −144.9 (dm, J$_{FH}$=53 Hz, 1F).
$^{1}$H NMR (D$_2$O) δ 6.6 (dm, J$_{FH}$=53 Hz, 1H).
% Water by Karl-Fisher titration: 71 ppm.
Analytical calculation for C$_3$HF$_6$SO$_4$K: C, 12.6; H, 0.4; N, 0.0. Experimental results: C, 12.6; H, 0.0; N, 0.1.
Mp (DSC) 257 degrees C.
TGA (air): 10% wt. loss @ 343 degrees C., 50% wt. loss @ 358 degrees C.
TGA (N$_2$): 10% wt. loss @ 341 degrees C., 50% wt. loss @ 357 degrees C.

(D) Synthesis of Sodium 1,1,2,3,3,3-hexafluoropropanesulfonate (HFPS—Na)

A 1-gallon Hastelloy® C reaction vessel was charged with a solution of anhydrous sodium sulfite (25 g, 0.20 mol), sodium bisulfite 73 g, (0.70 mol) and of deionized water (400 ml). The pH of this solution was 5.7. The vessel was cooled to 4 degrees C., evacuated to 0.08 MPa, and then charged with hexafluoropropene (HFP, 120 g, 0.8 mol, 0.43 MPa). The vessel was heated with agitation to 120 degrees C. and kept there for 3 hr. The pressure rose to a maximum of 1.83 MPa and then dropped down to 0.27 MPa within 30 minutes. At the end, the vessel was cooled and the remaining HFP was vented, and the reactor was purged with nitrogen. The final solution had a pH of 7.3.

The water was removed in vacuo on a rotary evaporator to produce a wet solid. The solid was then placed in a vacuum oven (0.02 MPa, 140 degrees C., 48 hr) to produce 219 g of white solid, which contained approximately 1 wt % water. The theoretical mass of total solids was 217 g.

The crude HFPS—Na can be further purified and isolated by extraction with reagent grade acetone, filtration, and drying.
$^{19}$F NMR (D$_2$O) δ. −74.5 (m, 3F); −113.1, −120.4 (ABq, J=264 Hz, 2F); −211.6 (dm, 1F).
$^{1}$H NMR (D$_2$O) δ. 5.8 (dm, J$_{FH}$=43 Hz, 1H).
Mp (DSC) 126 degrees C.
TGA (air): 10% wt. loss @ 326 degrees C., 50% wt. loss @ 446 degrees C.
TGA (N$_2$): 10% wt. loss @ 322 degrees C., 50% wt. loss @ 449 degrees C.

Preparation of Ionic Liquids

E) Synthesis of 1-butyl-2,3-dimethylimidazolium 1,1,2,2-tetrafluoroethanesulfonate 1-Butyl-2,3-dimethylimidazolium chloride (22.8 g, 0.121 moles) was mixed with reagent-grade acetone (250 ml) in a large round-bottomed flask and stirred vigorously. Potassium 1,1,2,2-tetrafluoroethanesulfonate (TFES-K, 26.6 g, 0.121 moles), was added to reagent grade acetone (250 ml) in a separate round-bottomed flask, and this solution was carefully added to the 1-butyl-2,3-dimethylimidazolium chloride solution. The large flask was lowered into an oil bath and heated at 60 degrees C. under reflux for 10 hours. The reaction mixture was then filtered using a large frit glass funnel to remove the white KCl precipitate formed, and the filtrate was placed on a rotary evaporator for 4 hours to remove the acetone.

The reaction scheme is shown below:

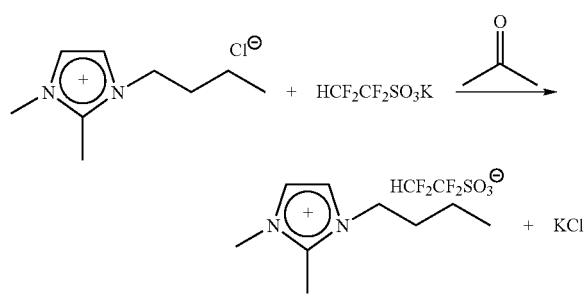

F) Synthesis of 1-butyl-methylimidazolium 1,1,2,2-tetrafluoroethanesulfonate 1-Butyl-3-methylimidazolium chloride (60.0 g) and high purity dry acetone (>99.5%, Aldrich, 300 ml) were combined in a 1 l flask and warmed to reflux with magnetic stirring until the solid completely dissolved. At room temperature in a separate 1 l flask, potassium-1,1,2,2-tetrafluoroethane-sulfonte (TFES-K, 75.6 g) was dissolved in high purity dry acetone (500 ml). These two solutions were combined at room temperature and allowed to stir magnetically for 2 hr under positive nitrogen pressure. The stirring was stopped and the KCl precipitate was allowed to settle, then removed by suction filtration through a fritted glass funnel with a celite pad. The acetone was removed in vacuo to give a yellow oil. The oil was further purified by diluting with high purity acetone (100 ml) and stirring with decolorizing carbon (5 g). The mixture was again suction filtered and the acetone removed in vacuo to give a colorless oil. This was further dried at 4 Pa and 25 degrees C. for 6 hr to provide 83.6 g of product.

$^{19}$F NMR (DMSO-d$_6$) δ −124. ( (dt, J=6 Hz, J=8 Hz, 2F); −136.8 (dt, J=53 Hz, 2F).

$^1$H NMR (DMSO-d$_6$) δ 0.9 (t, J=7.4 Hz, 3H); 1.3 (m, 2H); 1.8 (m, 2H); 3.9 (s, 3H); 4.2 (t, J=7 Hz, 2H); 6.3 (dt, J=53 Hz, J=6 Hz, 1H); 7.4 (s, 1H); 7.5 (s, 1H); 8.7 (s, 1H).

% Water by Karl-Fisher titration: 0.14%.

Analytical calculation for $C_9H_{12}F_6N_2O_3S$: C, 37.6; H, 4.7; N, 8.8. Experimental Results: C, 37.6; H, 4.6; N, 8.7.

TGA (air): 10% wt. loss @ 380 degrees C., 50% wt. loss @ 420 degrees C.

TGA (N$_2$): 10% wt. loss @ 375 degrees C., 50% wt. loss @ 422 degrees C.

G) Synthesis of 1-ethyl-3-methylimidazolium 1,1,2,2-tetrafluoroethane Sulfonate To a 500 ml round bottom flask was added 1-ethyl-3methylimidazolium chloride (Emim-Cl, 98%, 61.0 g) and reagent grade acetone (500 ml). The mixture was gently warmed (50 degrees C.) until almost all of the Emim-Cl dissolved. To a separate 500 ml flask was added potassium 1,1,2,2-tetrafluoroethanesulfonate (TFES-K, 90.2 g) along with reagent grade acetone (350 ml). This second mixture was stirred magnetically at 24 degrees C. until all of the TFES-K dissolved.

These solutions were combined in a 1 l flask producing a milky white suspension. The mixture was stirred at 24 degrees C. for 24 hrs. The KCl precipitate was then allowed to settle leaving a clear green solution above it.

The reaction mixture was filtered once through a celite/acetone pad and again through a fritted glass funnel to remove the KCl. The acetone was removed in vacuo first on a rotovap and then on a high vacuum line (4 Pa, 25 degrees C.) 25 for 2 hr. The product was a viscous light yellow oil (76.0 g, 64% yield).

The reaction scheme is shown below:

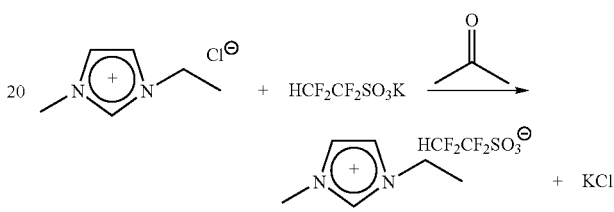

$^{19}$F NMR (DMSO-d$_6$) δ −124.7 . ( (dt, J$_{FH}$=6 Hz, J$_{FF}$=6 Hz, 2F); −138.4 (dt, J$_{FH}$=53 Hz, 2F).

$^1$H NMR (DMSO-d$_6$) δ 1.3 (t, J=7.3 Hz, 3H); 3.7 (s, 3H); 4.0 (q, J=7.3 Hz, 2H);

6.1 (tt, J$_{FH}$=53 Hz, J$_{FH}$=6 Hz, 1H); 7.2 (s, 1H); 7.3 (s, 1H); 8.5 (s, 1H).

% Water by Karl-Fisher titration: 0.18%.

Analytical calculation for $C_8H_{12}N_2O_3F_4S$: C, 32.9; H, 4.1; N, 9.6. Found: C, 33.3; H, 3.7; N, 9.6.

Mp 45-46 degrees C.

TGA (air): 10% wt. loss @ 379 degrees C., 50% wt. loss @ 420 degrees C.

TGA (N$_2$): 10% wt. loss @ 378 degrees C., 50% wt. loss @ 418 degrees C.

H) Synthesis of 1-ethyl-3-methylimidazolium 1,1,2,3,3,3-hexafluoropropanesulfonate To a 1 l round bottom flask was added 1-ethyl-3-methylimidazolium chloride (Emim-Cl, 98%, 50.5 g) and reagent grade acetone (400 ml). The mixture was gently warmed (50 degrees C.) until almost all of the Emim-Cl dissolved. To a separate 500 ml flask was added potassium 1,1,2,3,3,3-hexafluoropropanesulfonate (HFPS—K, 92.2 g) along with reagent grade acetone (300 ml). This second mixture was stirred magnetically at room temperature until all of the HFPS—K dissolved.

These solutions were combined and stirred under positive N$_2$ pressure at 26 degrees C. for 12 hr producing a milky white suspension. The KCl precipitate was allowed to settle overnight leaving a clear yellow solution above it.

The reaction mixture was filtered once through a celite/acetone pad and again through a fritted glass funnel. The acetone was removed in vacuo first on a rotovap and then on a high vacuum line (4 Pa, 25 degrees C.) for 2 hr. The product was a viscous light yellow oil (103.8 g, 89% yield).

The reaction scheme is shown below:

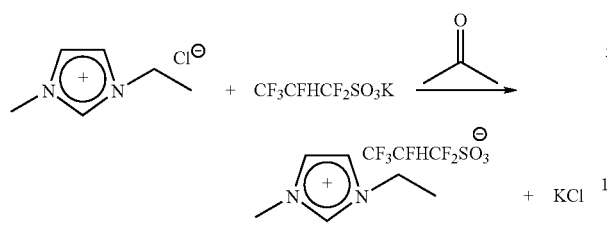

$^{19}$F NMR (DMSO-d$_6$) δ −73.8 (s, 3F); −114.5, −121.0 (ABq, J=258 Hz, 2F); −210.6 (m, 1F, J$_{HF}$=41.5 Hz).
$^1$H NMR (DMSO-d$_6$) δ 1.4 (t, J=7.3 Hz, 3H); 3.9 (s, 3H); 4.2 (q, J=7.3 Hz, 2H,);
5.8 (m, J$_{HF}$=41.5 Hz, 1H,); 7.7 (s, 1H); 7.8 (s, 1H); 9.1 (s, 1H).
% Water by Karl-Fisher titration: 0.12%.
Analytical calculation for C$_9$H$_{12}$N$_2$O$_3$F$_6$S: C, 31.5; H, 3.5; N, 8.2. Experimental Results: C, 30.9; H, 3.3; N, 7.8.
TGA (air): 10% wt. loss @ 342 degrees C., 50% wt. loss @ 373 degrees C.
TGA (N$_2$): 10% wt. loss @ 341 degrees C., 50% wt. loss @ 374 degrees C.

I) Synthesis of 1-hexyl-3-methylimidazolium 1,1,2,2-tetrafluoroethanesulfonate 1-Hexyl-3-methylimidazolium chloride (10 g, 0.0493 moles) was mixed with reagent-grade acetone (100 ml) in a large round-bottomed flask and stirred vigorously under a nitrogen blanket. Potassium 1,1,2,2-tetrafluoroethane sulfonate (TFES-K, 10 g, 0.0455 moles) was added to reagent grade acetone (100 ml) in a separate round-bottomed flask, and this solution was carefully added to the 1-hexyl-3-methylimidazolium chloride/acetone mixture. The mixture was left to stir overnight. The reaction mixture was then filtered using a large frit glass funnel to remove the white KCl precipitate formed, and the filtrate was placed on a rotary evaporator for 4 hours to remove the acetone.
The reaction scheme is shown below:

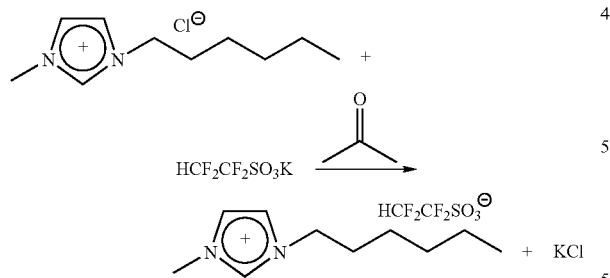

J) Synthesis of 1-dodecyl-3-methylimidazolium 1,1,2,2-tetrafluoroethanesulfonate 1-Dodecyl-3-methylimidazolium chloride (34.16 g, 0.119 moles) was partially dissolved in reagent-grade acetone (400 ml) in a large round-bottomed flask and stirred vigorously. Potassium 1,1,2,2-tetrafluoroethanesulfonate (TFES-K, 26.24 g, 0.119 moles) was added to reagent grade acetone (400 ml) in a separate round-bottomed flask, and this solution was carefully added to the 1-dodecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.
The reaction scheme is shown below:

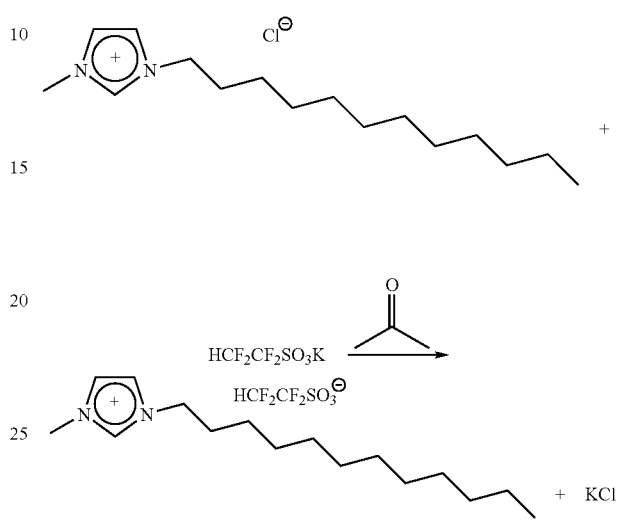

K) Synthesis of 1-hexadecyl-3-methylimidazolium 1,1,2,2-tetrafluoroethanesulfonate 1-Hexadecyl-3-methylimidazolium chloride (17.0 g, 0.0496 moles) was partially dissolved in reagent-grade acetone (100 ml) in a large round-bottomed flask and stirred vigorously. Potassium 1,1,2,2-tetrafluoroethanesulfonate (TFES-K, 10.9 g, 0.0495 moles) was added to reagent grade acetone (100 ml) in a separate round-bottomed flask, and this solution was carefully added to the 1-hexadecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.
The reaction scheme is shown below:

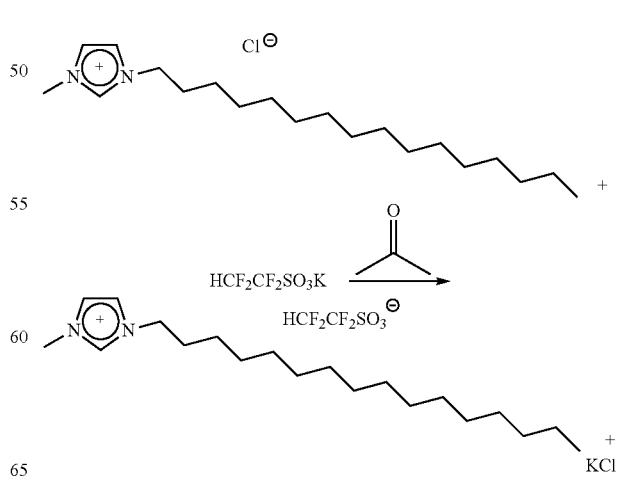

L) Synthesis of 1-octadecyl-3-methylimidazolium 1,1,2,2-tetrafluoroethaneulfonate 1-Octadecyl-3-methylimidazolium chloride (17.0 g, 0.0458 moles) was partially dissolved in reagent-grade acetone (200 ml) in a large round-bottomed flask and stirred vigorously. Potassium 1,1,2,2-tetrafluoroethanesulfonate (TFES-K, 10.1 g, 0.0459 moles), was added to reagent grade acetone (200 ml) in a separate round-bottomed flask, and this solution was carefully added to the 1-octadecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.

The reaction scheme is shown below:

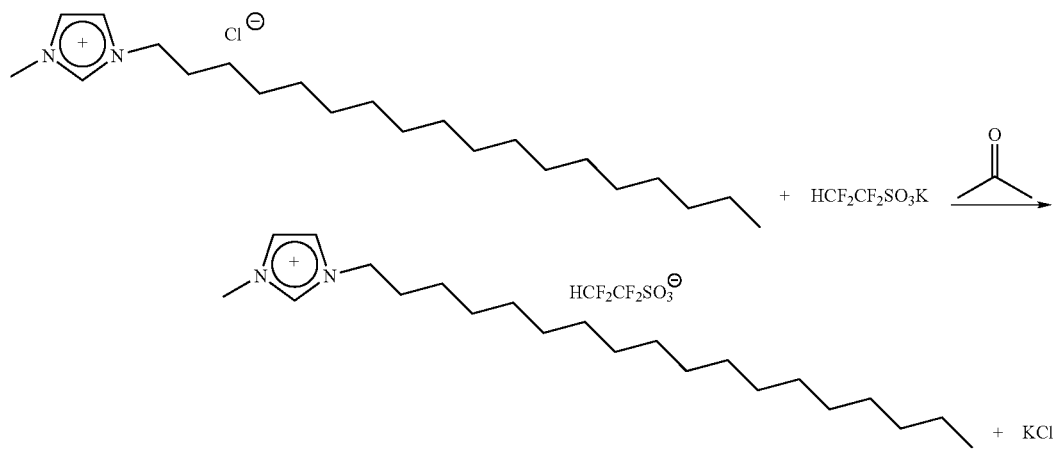

M) Synthesis of 1-propyl-3-(1,1,2,2-TFES) Imidazolium 1,1,2,2-tetrafluoroethanesulfonate Imidazole (19.2 g) was added to of tetrahydrofuran (80 mls). A glass shaker tube reaction vessel was filled with the THF-containing imidazole solution. The vessel was cooled to 18° C., evacuated to 0.08 MPa, and purged with nitrogen. The evacuate/purge cycle was repeated two more times. Tetrafluoroethylene (TFE, 5 g) was then added to the vessel, and it was heated to 100 degrees C., at which time the inside pressure was about 0.72 MPa. As the TFE pressure decreased due to the reaction, more TFE was added in small aliquots (5 g each) to maintain operating pressure roughly between 0.34 MPa and 0.86 MPa. Once 40 g of TFE had been fed, the vessel was vented and cooled to 25 degrees C. The THF was then removed under vacuum and the product was vacuum distilled at 40 degrees C. to yield pure product as shown by $^1$H and $^{19}$F NMR (yield 44 g). Iodopropane (16.99 g) was mixed with 1-(1,1,2,2-tetrafluoroethyl)imidazole (16.8 g) in dry acetonitrile (100 ml), and the mixture was refluxed for 3 days. The solvent was removed in vacuo, yielding a yellow waxy solid (yield 29 g). The product, 1-propyl-3-(1,1,2,2-tetrafluoroethyl)imidazolium iodide was confirmed by $^1$H NMR (in CD$_3$CN) [0.96 (t, 3H); 1.99 (m, 2H); 4.27 (t, 2H); 6.75 (t, 1H); 7.72 (d, 2H); 9.95 (s, 1H)].

Iodide (24 g) was then added to 60 ml of dry acetone, followed by 15.4 g of potassium 1,1,2,2-tetrafluoroethanesulfonate in 75 ml of dry acetone. The mixture was heated at 60 degrees C. overnight and a dense white precipitate was formed (potassium iodide). The mixture was cooled, filtered, and the solvent from the filtrate was removed using a rotary evaporator. Some further potassium iodide was removed under filtration. The product was further purified by adding 50 g of acetone, 1 g of charcoal, 1 g of celite and 1 g of silica gel. The mixture was stirred for 2 hours, filtered and the solvent removed. This yielded 15 g of a liquid, shown by NMR to be the desired product.

N) Synthesis of 1-butyl-3-methylimidazolium 1,1,2,3,3,3-hexafluoropropanesulfonate (Bmim-HFPS)

1-Butyl-3-methylimidazolium chloride (Bmim-Cl, 50.0 g) and high purity dry acetone (>99.5%, 500 ml) were combined in a 1l flask and warmed to reflux with magnetic stirring until the solid all dissolved. At room temperature in a separate 1l flask, potassium-1,1,2,3,3,3-hexafluoropropanesulfonte (HFPS—K) was dissolved in high purity dry acetone (550 ml). These two solutions were combined at room temperature and allowed to stir magnetically for 12 hr under positive nitrogen pressure. The stirring was stopped, and the KCl precipitate was allowed to settle. This solid was removed by suction filtration through a fritted glass funnel with a celite pad. The acetone was removed in vacuo to give a yellow oil. The oil was further purified by diluting with high purity acetone (100 ml) and stirring with decolorizing carbon (5 g). The mixture was suction filtered and the acetone removed in vacuo to give a colorless oil. This was further dried at 4 Pa and 25 degrees C. for 2 hr to provide 68.6 g of product.

$^{19}$F NMR (DMSO-d$_6$) δ −73.( (s, 3F); −114.5, −121.0 (ABq, J=258 Hz, 2F); −210.6 (m, J=42 Hz, 1F).

$^1$H NMR (DMSO-d$_6$) δ 0.9 (t, J=7.4 Hz, 3H); 1.3 (m, 2H); 1.8 (m, 2H); 3.9 (s, 3H); 4.2 (t, J=7 Hz, 2H); 5.8 (dm, J=42 Hz, 1H); 7.7 (s, 1H); 7.8 (s, 1H); 9.1 (s, 1H).

% Water by Karl-Fisher titration: 0.12%.

Analytical calculation for C$_9$H$_{12}$F$_6$N$_2$O$_3$S: C, 35.7; H, 4.4; N, 7.6. Experimental Results: C, 34.7; H, 3.8; N, 7.2.

TGA (air): 10% wt. loss @ 340 degrees C., 50% wt. loss @ 367 degrees C.

TGA (N$_2$): 10% wt. loss @ 335 degrees C., 50% wt. loss @ 361 degrees C.

Extractable chloride by ion chromatography: 27 ppm.

O) Synthesis of 1-butyl-3-methylimidazolium 1,1,2-trifluoro-2-(trifluoromethoxy)ethanesulfonate (Bmim-TTES)

1-Butyl-3-methylimidazolium chloride (Bmim-Cl, 10.0 g) and deionized water (15 ml) were combined at room temperature in a 200 ml flask. At room temperature in a separate 200 ml flask, potassium 1,1,2-trifluoro-2-(trifluoromethoxy)ethanesulfonate (TTES-K, 16.4 g) was dissolved in deionized water (90 ml). These two solutions were combined at room temperature and allowed to stir magnetically for 30 min. under positive nitrogen pressure to give a biphasic mixture with the desired ionic liquid as the bottom phase. The layers were separated, and the aqueous phase was extracted with 2×50 ml portions of methylene chloride. The combined organic layers were dried over magnesium sulfate and concentrated in vacuo. The colorless oil product was dried at for 4 hr at 5 Pa and 25 degrees C. to afford 15.0 g of product.

$^{19}$F NMR (DMSO-d$_6$) δ −56.8 (d, $J_{FH}$=4 Hz, 3F); −119.5, −119.9 (subsplit ABq, J=260 Hz, 2F); −142.2 (dm, $J_{FH}$=53 Hz, 1F).

$^1$H NMR (DMSO-d$_6$) δ 0.9 (t, J=7.4 Hz, 3H); 1.3 (m, 2H); 1.8 (m, 2H); 3.9 (s, 3H); 4.2 (t, J=7.0 Hz, 2H); 6.5 (dt, J=53 Hz, J=7 Hz, 1H); 7.7 (s, 1H); 7.8 (s, 1H); 9.1 (s, 1H).

% Water by Karl-Fisher titration: 613 ppm.

Analytical calculation for C11H16F6N2O4S: C, 34.2; H, 4.2; N, 7.3. Experimental Results: C, 34.0; H, 4.0; N, 7.1.

TGA (air): 10% wt. loss @ 328 degrees C., 50% wt. loss @ 354 degrees C.

TGA (N$_2$): 10% wt. loss @ 324 degrees C., 50% wt. loss @ 351 degrees C.

Extractable chloride by ion chromatography: <2 ppm.

P) Synthesis of 1-butyl-3-methylimidazolium 1,1,2-trifluoro-2-(perfluoroethoxy)ethanesulfonate (Bmim-TPES)

1-Butyl-3-methylimidazolium chloride (Bmim-Cl, 7.8 g) and dry acetone (150 ml) were combined at room temperature in a 500 ml flask. At room temperature in a separate 200 ml flask, potassium 1,1,2-trifluoro-2-(perfluoroethoxy)ethanesulfonate (TPES-K, 15.0 g) was dissolved in dry acetone (300 ml). These two solutions were combined and allowed to stir magnetically for 12 hr under positive nitrogen pressure. The KCl precipitate was then allowed to settle leaving a colorless solution above it. The reaction mixture was filtered once through a celite/acetone pad and again through a fritted glass funnel to remove the KCl. The acetone was removed in vacuo first on a rotovap and then on a high vacuum line (4 Pa, 25 degrees C.) for 2 hr. Residual KCl was still precipitating out of the solution, so methylene chloride (50 ml) was added to the crude product, which was then washed with deionized water (2×50 ml). The solution was dried over magnesium sulfate, and the solvent was removed in vacuo to give the product as a viscous light yellow oil (12.0 g, 62% yield).

$^{19}$F NMR (CD$_3$CN) δ −85.8 (s, 3F); −87.9, −90.1 (subsplit ABq, $J_{FF}$=147 Hz, 2F); −120.6, −122.4 (subsplit ABq, $J_{FF}$=258 Hz, 2F); −142.2 (dm, $J_{FH}$=53 Hz, 1F).

$^1$H NMR (CD$_3$CN) δ 1.0 (t, J=7.4 Hz, 3H); 1.4 (m, 2H); 1.8 (m, 2H); 3.9 (s, 3H); 4.2 (t, J=7.0 Hz, 2H); 6.5 (dm, J=53 Hz, 1H); 7.4 (s, 1H); 7.5 (s, 1H); 8.6 (s, 1H).

% Water by Karl-Fisher titration: 0.461.

Analytical calculation for C12H16F8N2O4S: C, 33.0; H, 3.7. Experimental Results: C, 32.0; H, 3.6.

TGA (air): 10% wt. loss @ 334 degrees C., 50% wt. loss @ 353 degrees C.

TGA (N$_2$): 10% wt. loss @ 330 degrees C., 50% wt. loss @ 365 degrees C.

Q) Synthesis of Tetradecyl(tri-n-butyl)phosphonium 1,1,2,3,3,3-hexafluoropropanesulfonate ([4.4.4.14]P—HFPS)

To a 4 l round bottomed flask was added the ionic liquid tetradecyl(tri-n-butyl)phosphonium chloride (Cyphos® IL 167, 345 g) and deionized water (1000 ml). The mixture was magnetically stirred until it was one phase. In a separate 2 l flask, potassium 1,1,2,3,3,3-hexafluoropropanesulfonate (HFPS—K, 214.2 g) was dissolved in deionized water (1100 ml). These solutions were combined and stirred under positive N$_2$ pressure at 26 degrees C. for 1 hr producing a milky white oil. The oil slowly solidified (439 g) and was removed by suction filtration and then dissolved in chloroform (300 ml). The remaining aqueous layer (pH=2) was extracted once with chloroform (100 ml). The chloroform layers were combined and washed with an aqueous sodium carbonate solution (50 ml) to remove any acidic impurity. They were then dried over magnesium sulfate, suction filtered, and reduced in vacuo first on a rotovap and then on a high vacuum line (4 Pa, 100 degrees C.) for 16 hr to yield the final product as a white solid (380 g, 76% yield).

$^{19}$F NMR (DMSO-d$_6$) δ −73.7 (s, 3F); −114.6, −120.9 (ABq, J=258 Hz, 2F); −210.5 (m, $J_{HF}$=41.5 Hz, 1F).

$^1$H NMR (DMSO-d$_6$) δ 0.8 (t, J=7.0 Hz, 3H); 0.9 (t, J=7.0 Hz, 9H); 1.3 (br s, 20H); 1.4 (m, 16H); 2.2 (m, 8H); 5.9 (m, $J_{HF}$=42 Hz, 1H).

% Water by Karl-Fisher titration: 895 ppm.

Analytical calculation for C29H57F6O3PS: C, 55.2; H, 9.1; N, 0.0. Experimental Results: C, 55.1; H, 8.8; N, 0.0.

TGA (air): 10% wt. loss @ 373 degrees C., 50% wt. loss @ 421 degrees C.

TGA (N$_2$): 10% wt. loss @ 383 degrees C., 50% wt. loss @ 436 degrees C.

R) Synthesis of Tetradecyl(tri-n-hexyl)phosphonium 1,1,2-trifluoro-2-(perfluoroethoxy)ethanesulfonate ([6.6.6.14]P-TPES)

To a 500 ml round bottomed flask was added acetone (Spectroscopic grade, 50 ml) and ionic liquid tetradecyl(tri-n-hexyl)phosphonium chloride (Cyphos® IL 101, 33.7 g). The mixture was magnetically stirred until it was one phase. In a separate 1 l flask, potassium 1,1,2-trifluoro-2-(perfluoroethoxy)ethanesulfonate (TPES-K, 21.6 g) was dissolved in acetone (400 ml). These solutions were combined and stirred under positive N$_2$ pressure at 26 degrees C. for 12 hr producing a white precipitate of KCl. The precipitate was removed by suction filtration, and the acetone was removed in vacuo on a rotovap to produce the crude product as a cloudy oil (48 g). Chloroform (100 ml) was added, and the solution was washed once with deionized water (50 ml). It was then dried over magnesium sulfate and reduced in vacuo first on a rotovap and then on a high vacuum line (8 Pa, 24 degrees C.) for 8 hr to yield the final product as a slightly yellow oil (28 g, 56% yield).

$^{19}$F NMR (DMSO-d$_6$) δ −86.1 (s, 3F); −88.4, −90.3 (subsplit ABq, $J_{FF}$=147 Hz, 2F); −121.4, −122.4 (subsplit ABq, $J_{FF}$=258 Hz, 2F); −143.0 (dm, $J_{FH}$=53 Hz, 1F).

$^1$H NMR (DMSO-d$_6$) δ 0.9 (m, 12H); 1.2 (m, 16H); 1.3 (m, 16H); 1.4 (m, 8H); 1.5 (m, 8H); 2.2 (m, 8H); 6.3 (dm, J$_{FH}$=54 Hz, 1H).
% Water by Karl-Fisher titration: 0.11.
Analytical calculation for C36H69F8O4PS: C, 55.4; H, 8.9; N, 0.0. Experimental Results: C, 55.2; H, 8.2; N, 0.1.
TGA (air): 10% wt. loss @ 311 degrees C., 50% wt. loss @ 339 degrees C.
TGA (N$_2$): 10% wt. loss @ 315 degrees C., 50% wt. loss @ 343 degrees C.

S) Synthesis of Tetradecyl(tri-n-hexyl)phosphonium 1,1,2-trifluoro-2-(trifluoromethoxy)ethanesulfonate ([6.6.6.14]P-TTES)

To a 100 ml round bottomed flask was added acetone (Spectroscopic grade, 50 ml) and ionic liquid tetradecyl(tri-n-hexyl)phosphonium chloride (Cyphos® IL 101, 20.2 g). The mixture was magnetically stirred until it was one phase. In a separate 100 ml flask, potassium 1,1,2-trifluoro-2-(trifluoromethoxy)ethanesulfonate (TTES-K, 11.2 g) was dissolved in acetone (100 ml). These solutions were combined and stirred under positive N$_2$ pressure at 26 degrees C. for 12 hr producing a white precipitate of KCl.

The precipitate was removed by suction filtration, and the acetone was removed in vacuo on a rotovap to produce the crude product as a cloudy oil. The product was diluted with ethyl ether (100 ml) and then washed once with deionized water (50 ml), twice with an aqueous sodium carbonate solution (50 ml) to remove any acidic impurity, and twice more with deionized water (50 ml). The ether solution was then dried over magnesium sulfate and reduced in vacuo first on a rotovap and then on a high vacuum line (4 Pa, 24 degrees C.) for 8 hr to yield the final product as an oil (19.0 g, 69% yield).
$^{19}$F NMR (CD$_2$Cl$_2$) δ −60.2 (d, J$_{FH}$=4 Hz, 3F); −120.8, −125.1 (subsplit ABq, J=260 Hz, 2F); −143.7 (dm, J$_{FH}$=53 Hz, 1F).
$^1$H NMR (CD$_2$Cl$_2$) δ 0.9 (m, 12H); 1.2 (m, 16H); 1.3 (m, 16H); 1.4 (m, 8H); 1.5 (m, 8H); 2.2 (m, 8H); 6.3 (dm, J$_{FH}$=54 Hz, 1H).
% Water by Karl-Fisher titration: 412 ppm.
Analytical calculation for C35H69F6O4PS: C, 57.5; H, 9.5; N, 0.0. Experimental results: C, 57.8; H, 9.3; N, 0.0.
TGA (air): 10% wt. loss @ 331 degrees C., 50% wt. loss @ 359 degrees C.
TGA (N$_2$): 10% wt. loss @ 328 degrees C., 50% wt. loss @ 360 degrees C.

T) Synthesis of 1-ethyl-3-methylimidazolium 1,1,2,2-tetrafluoro-2-(pentafluoroethoxy)sulfonate (Emim-TPENTAS)

To a 500 ml round bottomed flask was added 1-ethyl-3-methylimidazolium chloride (Emim-Cl, 98%, 18.0 g) and reagent grade acetone (150 ml). The mixture was gently warmed (50 degrees C.) until all of the Emim-Cl dissolved. In a separate 500 ml flask, potassium 1,1,2,2-tetrafluoro-2-(pentafluoroethoxy)sulfonate (TPENTAS-K, 43.7 g) was dissolved in reagent grade acetone (450 ml).

These solutions were combined in a 1 l flask producing a white precipitate (KCl). The mixture was stirred at 24 degrees C. for 8 hr. The KCl precipitate was then allowed to settle leaving a clear yellow solution above it. The KCl was removed by filtration through a celite/acetone pad. The acetone was removed in vacuo to give a yellow oil, which was then diluted with chloroform (100 ml). The chloroform was washed three times with deionized water (50 ml), dried over magnesium sulfate, filtered, and reduced in vacuo first on a rotovap and then on a high vacuum line (4 Pa, 25 degrees C.) for 8 hr. The product was a light yellow oil (22.5 g).
$^{19}$F NMR (DMSO-d$_6$) δ −82.9 (m, 2F); −87.3 (s, 3F); −89.0 (m, 2F); −118.9 (s, 2F).
$^1$H NMR (DMSO-d$_6$) δ. 1.5 (t, J=7.3 Hz, 3H); 3.9 (s, 3H); 4.2 (q, J=7.3 Hz, 2H);
7.7 (s, 1H); 7.8 (s, 1H); 9.1 (s, 1H).
% Water by Karl-Fisher titration: 0.17%.
Analytical calculation for C10H11N2O4F9S: C, 28.2; H, 2.6; N, 6.6. Experimental results: C, 28.1; H, 2.9; N, 6.6.
TGA (air): 10% wt. loss @ 351 degrees C., 50% wt. loss @ 401 degrees C.
TGA (N$_2$): 10% wt. loss @ 349 degrees C., 50% wt. loss @ 406 degrees C.

U) Synthesis of Tetrabutylphosphonium 1,1,2-trifluoro-2-(perfluoroethoxy)ethanesulfonate (TBP-TPES)

To a 200 ml round bottomed flask was added deionized water (100 ml) and tetra-n-butylphosphonium bromide (Cytec Canada Inc., 20.2 g). The mixture was magnetically stirred until the solid all dissolved. In a separate 300 ml flask, potassium 1,1,2-trifluoro-2-(perfluoroethoxy)ethanesulfonate (TPES-K, 20.0 g) was dissolved in deionized water (400 ml) heated to 70 degrees C. These solutions were combined and stirred under positive N$_2$ pressure at 26 degrees C. for 2 hr producing a lower oily layer. The product oil layer was separated and diluted with chloroform (30 ml), then washed once with an aqueous sodium carbonate solution (4 ml) to remove any acidic impurity, and three times with deionized water (20 ml). It was then dried over magnesium sulfate and reduced in vacuo first on a rotovap and then on a high vacuum line (8 Pa, 24 degrees C.) for 2 hr to yield the final product as a colorless oil (28.1 g, 85% yield).
$^{19}$F NMR (CD$_2$Cl$_2$) δ −86.4 (s, 3F); −89.0, −90.8 (subsplit ABq, J$_{FF}$=147 Hz, 2F); −119.2, −125.8 (subsplit ABq, J$_{FF}$=254 Hz, 2F); −141.7 (dm, J$_{FH}$=53 Hz, 1F).
$^1$H NMR (CD$_2$Cl$_2$) δ 1.0 (t, J=7.3 Hz, 12H); 1.5 (m, 16H); 2.2 (m, 8H); 6.3 (dm, J$_{FH}$=54 Hz, 1H).
% Water by Karl-Fisher titration: 0.29.
Analytical calculation for C20H37F8O4PS: C, 43.2; H, 6.7; N, 0.0. Experimental results: C, 42.0; H, 6.9; N, 0.1.
Extractable bromide by ion chromatography: 21 ppm.

(V) Preparation of 1,3-dioctylimidazolium iodide [doim][I]

1,3-Dioctylimidazolium iodide [ooim][I] was prepared as described by L. Xu, et al., Journal of Organometallic Chemistry, 2000, 598, 409-416:

Imidazole (2.72 g; 0.04 mmol) and octyl bromide (3.1 g; 0.016 mmol) were dissolved in 55 ml of ethyl acetate. The mixture was refluxed under a nitrogen blanket. Initially, the solution was clear and colorless, however upon refluxing approximately 1 hour the mixture became cloudy with a tannish color. The mixture was allowed to reflux overnight. The mixture was then cooled to room temperature (RT) upon which a white precipitate formed. The mixture was extracted with water (2×:30 ml). After drying the solvent with magnesium sulfate, the solvent was removed using a vacuum, yielding a tannish oil.

To the oily residue was added 60 ml of toluene followed by 1-iodoctane (4.8 g; 0.02). The mixture was refluxed overnight under a nitrogen blanket, resulting in a dark yellow mixture.

The yellow oil was collected via a separation funnel rinsed with toluene (2×:20 ml) and dried under vacuum.

(W) Preparation of 1-methyl-3-octylimidazolium iodide [omim][I]

1-Methyl-3-octylimidazolium iodide [omim][I] was prepared as described by L. Xu, et al. (Journal of Organometallic Chemistry, 2000, 598, 409-416):

1-Methylimidazole (1.65 g; 0.02 mmol) and 1-iodoctane (5.31 g; 0.022 mmol) were dissolved in 30 ml of toluene. The reaction was refluxed, whereupon the mixture immediately became yellow in color and cloudy. The mixture was refluxed overnight, during which a yellowish oily precipitate formed. The yellowish oil was collected and dried under vacuum.

Gravimetric Microbalance

The gas solubility and diffusivity measurements were made using a gravimetric microbalance (Hiden Isochema Ltd, IGA 003, Warrington, UK). The IGA design integrates precise computer-control and measurement of weight change, pressure and temperature to enable fully automatic and reproducible determination of gas adsorption-desorption isotherms and isobars. The microbalance consists of an electrobalance with sample and counterweight components inside a stainless steel pressure-vessel as shown in FIG. 18 and described in Example 38, Table 31. The balance has a weigh range of 0-100 mg with a resolution of 0.1 μg. An enhanced pressure stainless steel (SS316LN) reactor capable of operation to 20.0 bar and 100° C. was installed. Approximately 60 mg of ionic liquid sample was added to the sample container and the reactor was sealed. The sample was dried and degassed by first pulling a course vacuum on the sample with a diaphragm pump (Pfeiffer, model MVP055-3, Asslar, Germany) and then fully evacuating the reactor to $10^{-8}$ bar with a turbopump (Pfeiffer, model TSH-071). While under deep vacuum, the sample was heated to 75° C. for 10 hr with an external water jacket connected to a remote-controlled constant-temperature bath (Huber Ministat, model cc-S3, Offenburg, Germany). A 30 percent ethylene glycol and 70 percent water mixture by volume was used as the recirculating fluid with a temperature range of 5 to 90° C. The sample mass slowly decreased as residual water and gases were removed. Once the mass had stabilized for at least 60 min, the sample dry mass was recorded. The percent weight loss for the various ionic liquids tested was in the range of 1 to 3%.

The IGA003 can operate in both dynamic and static mode. Dynamic mode operation provides a continuous flow of gas (max. 500 cm$^3$ min$^{-1}$) past the sample and the exhaust valve controls the set-point pressure. Static mode operation introduces gas into the top of the balance away from the sample and both the admittance and exhaust valves control the set-point pressure. All absorption measurements were performed in static mode. The sample temperature was measured with a type K thermocouple with an accuracy of ±0.1° C. The thermocouple was located inside the reactor next to the sample container. The water jacket maintained the set-point temperature automatically to within a typical regulation accuracy of ±0.1° C. Four isotherms (at 10, 25, 50, and 75° C.) were measured beginning with 10° C. Once the desired temperature was achieved and stable, the admittance and exhaust valves automatically opened and closed to adjust the pressure to the first set-point. Pressures from $10^{-9}$ to $10^{-1}$ bar were measured using a capacitance manometer (Pfeiffer, model PKR251), and pressures from $10^{-1}$ to 20.0 bar were measured using a piezo-resistive strain gauge (Druck, model PDCR4010, New Fairfield, Conn.). Regulation maintained the reactor pressure set-point to within ±4 to 8 mbar. The pressure ramp rate was set at 200 mbar min$^{-1}$ and the temperature ramp rate was set at 1° C. min$^{-1}$. The upper pressure limit of the stainless steel reactor was 20.0 bar, and several isobars up to 10 bar (i.e., 0.1, 0.5, 1, 4, 7, 10 bar) were measured. To ensure sufficient time for gas-liquid equilibrium, the ionic liquid samples were maintained at set-point for a minimum of 3 hr with a maximum time-out of 8 hr.

The IGA method exploits the relaxation behavior following pressure and temperature changes to simultaneously evaluate the time-dependent absorption and asymptotic uptake. The real-time processor was used to determine the end-point for each isotherm. The percent relaxation used as an end point for the real-time analysis was 99 percent. The minimum weight change for real-time analysis was set at 1 μg, the acceptable average deviation of the model from the acquired data was set at 7 μg, and the target interval for weight acquisition was set at a typical value of 1 μg. The temperature variation during an isotherm was maintained less than 0.1° C. min$^{-1}$.

Safety features of the IGA003 included a pressure relief valve and over-temperature control for the reactor. The factory-installed relief valve was replaced with a DuPont guideline relief valve (Circle-Seal, set-point pressure 24.5 bar; DuPont, Wilmington, Del.). To further protect the microbalance system from over-pressure, additional relief valves were installed on the custom gas manifold and on each gas cylinder; these relief valves were set to open if the pressure exceeded 25 bar. The reactor over-temperature interlock controller that comes standard on the IGA003 was set to turn off the water bath if the temperature exceeded 100° C. Due to the fact that some of the gases tested were flammable (i.e. HFC-32, HFC-143a, and HFC-152a), the IGA003 was mounted inside a custom stainless steel cabinet purged with nitrogen that would minimize the possibility of a flame.

Thermogravimetric measurements were corrected for a number of gravitational balance forces introduced at high pressure as described by Pinkerton, E. P., et al (High-pressure gravimetric measurement of hydrogen capacity in vapor-grown carbon nanofibers and related materials. Proceedings of the 11$^{th}$ Canadian Hydrogen Conference, Victoria, BC (2001) pages 633-642). These included:

(1) Changes in the buoyant forces due to changes in pressure and temperature.

(2) Aerodynamic drag forces created by the flow of gases.

(3) Changes in the balance sensitivity due to changes in temperature and pressure.

(4) Volumetric changes in the samples due to expansivity.

The gravitational balance forces previously described are often of the same order of magnitude (0.1 to 5 mg) as the overall weight change in the sample and can lead to inaccurate results if not accounted for precisely. Distinguishing mass changes with an accuracy of 0.01 wt. % on small and sometimes limited sample quantities requires knowledge of the sample weight to within about 5 to 10 μg.

The buoyancy correction follows from Archimedes' principal: there is an upward force exerted on an object equivalent to the mass of fluid displaced. The upward force ($C_b$) due to buoyancy is calculated using eq 1 where the mass of the gas displaced is equivalent to the volume of the submersed object ($V_i$) times the density ($\rho_g$) of the gas at a given (T,P) and the gravitational acceleration (g). If the volume of the object remains constant, $V_i$ can be calculated by knowing the mass ($m_i$) and density ($\rho_i$) of the object.

$$C_b = \text{Buoyancy} = gV_i\rho_g(T, P) = g\frac{m_i}{\rho_i}\rho_g(T, P) \quad (1)$$

Instead of using the gas densities provided in the Hiden Isochema IGA software, the gas density for each gas was calculated using a computer program (REFPROP v.7) developed by the National Institute of Standards and Technology (NIST) (Lemmon E W, et al. [NIST reference fluid thermodynamic and transport properties —REFPROP, version 7.0 user's guide, U.S. Department of Commerce, Technology Administration, National Institute of Standards and Technology, Standard Reference Data Program, Gaithersburg, Md., 2002]).

The buoyancy correction using the IGA003 system involves many additional objects for weighing the sample. Table 31 provides a list of each critical component along with the objects weight, material, density, and temperature. The component arrangement in FIG. 18 leads to a mass balance as shown by eq 2. This expression accounts for the summation of all components as well as the contribution of the absorbed gas mass ($m_a$) and a correction factor ($C_f$) which accounts for the balance sensitivity to T P. The density of air (Pair) at ambient temperature and pressure was subtracted from $\rho_i$ and $\sigma_j$ because the components were initially weighed in air.

$$\sum_{i=1} m_i - \sum_{j=1} m_j - \sum_{i=1} \frac{m_i}{\rho_i}\rho_g(T_i, P) + \sum_{j=1} \frac{m_j}{\rho_j}\rho_g(T_j, P) + \quad (2)$$

$$m_{IL} + m_a - \frac{m_{IL}}{\rho_s(T_s)}\rho_g(T_s, P) - \frac{m_a}{\rho_a(T_s)}\rho_g(T_s, P) -$$

$$C_f(T_s, P) = \text{reading}$$

The largest contributions in eq 2 are typically those of the sample container, sample, and counter weight; the other referenced objects in Table 31 contribute less because of their larger densities (denominators in eq 2). Physical densities of ionic liquids were measured using a Micromeritics Accupyc 1330 helium pycnometer with an accuracy of ±0.001 g cm$^{-3}$ (Micromeritics Instrument Corp., Norcross, Ga.). Initially, the volume ($V_{IL}$) of each sample was calculated from its pycnometric density ($\rho_s$) and dry mass sample weight ($\rho_s$), but volumetric expansion ($\Delta\tilde{V}/\tilde{V}_0$) due to the gas absorption was later taken into account as described below to more accurately determine the buoyancy effect.

The system was operated in static mode that essentially eliminates any aerodynamic drag forces due to flowing gases. Electrobalances are sensitive to temperature and pressure fluctuations on the beam arm and internal electronics. To minimize this effect, the balance electronics are heated externally with a band heater to a temperature of 45±0.1° C. In addition, the component temperatures provided in Table 31 are measured for the sample ($T_s$) and all others are estimated. Therefore, a correction factor ($C_f$) was determined as a function of T, P by measuring the buoyancy effect without a sample and calculating a least-squares fit to tare the balance. The correction factor was on the order of 0.1 to 0.3 mg and increased as expected with decreasing temperature and increasing pressure.

Initially the ionic liquid sample volume was considered to be constant and the mole fraction solubility calculated without taking into account buoyancy effects due to sample expansivity. In order to make a proper buoyancy correction due to the liquid volume change, a simple mole fraction average for the molar volume, $\tilde{V}_m$, was used.

$$\tilde{V}_m(T,P) = \tilde{V}_{IL}(1-x) + \tilde{V}_g x, \quad (3)$$

where $\tilde{V}_i = MW_i/\rho_i$ and x represents the molar fraction of gas in the solution.

$$V_m(T, P) = \tilde{V}_m(T, P)\left[\left(\frac{m_{IL}}{MW_{IL}}\right) + \left(\frac{m_g}{MW_g}\right)\right] \quad (4)$$

$$\frac{m_s}{\rho_s(T_s)}\rho_g(T_s, P) + \frac{m_a}{\rho_a(T_s)}\rho_g(T_s, P) = V_m(T, P)\rho_g(T, P) \quad (5)$$

As a first approximation, eqs 3 and 4 were used to estimate the change in the liquid sample volume, $V_m$, at the measured T, P conditions. Eq 5 can be substituted into eq 2 to account for the buoyancy change with respect to sample expansivity.

Besides the equilibrium solubility, time-dependent absorption data were also gathered using the Hiden gravimetric microbalance for each T, P set-point. In order to understand the time-dependent behavior of gas dissolving in liquid, we applied a mathematical model based on a simplified mass diffusion process. Imagine a flat-bottom sample container filled with ionic liquid at a certain liquid level height (L). The height is determined by knowing the cylindrical geometry of the sample container, dry sample weight after evacuation and heating, and the ionic liquid density at the proper temperature. After evacuation, the gas is introduced into the Pyrex® sample container with a constant pressure at a given temperature. A small amount of gas will start dissolving into the ionic liquid, and after a sufficient time it will reach a thermodynamic equilibrium, that is the solubility limit of the gas in the ionic liquid at the given T and P. This transient behavior with time is modeled as described by Shiflett, M. B. and Yokozeki, A. (*Ind. Eng. Chem. Research*, 2005, 44, 4453-4464) and Yokozeki, A. (*Int. J. Refrigeration*, 2002, 22, 695-704).

Processes of gas dissolving in liquid may be highly complex phenomena because of a possible evolution of heat of mixing, the subsequent liquid convection due to the local temperature difference, as well as the free convection due to the density difference, and the possible change in thermophysical properties of the liquid. The following assumptions were made for the dissolving gas (Shiflett, M. B., and Yokozeki, A. (supra); and Yokozeki, A (Time-dependent behavior of gas absorption in lubricant oil [*Int. J. Refrigeration* (2002), 22, 695-704]):

(1) Gas dissolves through a one-dimensional (vertical) diffusion process, in which there is no convective flow in the liquid.
(2) A thin boundary layer between the gas and liquid phases exists, where the thermodynamic equilibrium is instantly established with the saturation concentration ($C_s$), and where the concentration is constant all the time at a given temperature and pressure.
(3) Temperature and pressure are kept constant.
(4) The gas-dissolved liquid is a highly dilute solution, and so the relevant thermophysical properties of the solution do not change.

The process may then be described by one-dimensional mass diffusion due to the local concentration difference. The governing differential equations are:

$$\frac{\partial C}{\partial t} = D \frac{\partial^2 C}{\partial z^2} \qquad (6)$$

Initial Condition: $C = C_0$ when $t = 0$ and $0 < z < L$ (7)

Boundary Conditions: $C = C_s$ when $t > 0$ and $z = 0$ (8)

$$\frac{\partial C}{\partial z} = 0 \text{ at } z = L \qquad (9)$$

Where C is the concentration of a dissolving substance in ionic liquid as a function of time, t and vertical location, z, where L is the depth of ionic liquid in the container, and z=0 corresponds to the vapor-liquid boundary. $C_0$ is an initial homogeneous concentration of the dissolving gas, and is zero (initially) or a small finite amount at t>0. D is the diffusion coefficient that is assumed to be constant.

Eq 6 can be solved analytically for the initial and boundary conditions eqs 7-9 by a standard method such as separation variables or Laplace transform and yields:

$$C = C_S \left[ 1 - 2\left(1 - \frac{C_0}{C_S}\right) \sum_{n=0}^{\infty} \frac{\exp(-\lambda_n^2 D t) \sin \lambda_n z}{L \lambda_n} \right], \qquad (10)$$

where $\lambda_n = \left(n + \frac{1}{2}\right)\frac{\pi}{L}$.

An experimentally observed quantity at a specified time is the total concentration (or mass) of dissolved gas in ionic liquid, and not the concentration profile in z. This space-averaged concentration at a given time, <C>, can be calculated from eq 11.

$$\langle C \rangle = \int_0^L C \, dz \Big/ L \qquad (11)$$

$$\langle C \rangle = C_S \left[ 1 - 2\left(1 - \frac{C_0}{C_S}\right) \sum_{n=0}^{\infty} \frac{\exp(-\lambda_n^2 D t)}{L^2 \lambda_n^2} \right] \qquad (12)$$

Although eq 12 contains an infinite summation, only the first few terms, except for initial small time periods, are sufficient in practical applications. In this work, the summation was terminated after ten terms when the numerical contribution to the summation in <C> became less than $10^{-12}$. By analyzing experimental data with this equation, we obtained the saturation concentration ($C_s$) and diffusion constant (D) at given T and P, when $C_0$ was known.

Properties of Lubricants and Lubricant/Refrigerant Mixtures

For vapor compression refrigeration and air-conditioning applications, the viscosity, density, and molecular weight of the lubricating oil are important properties. The viscosity of the oil and the solubility of the refrigerant in the oil are the two key factors in good oil return to the compressor. The viscosity of the oil cannot be so high that the oil becomes viscous at lower temperatures or so low that it does not lubricate the compressor properly at high temperatures. A viscosity of about 150 Saybolt universal seconds (SUS) or about 30-35 centipoise (cP) at 37.8° C. (100° F.) is generally used for low and medium temperature refrigeration applications. A viscosity of about 300 SUS or about 50-60 cP at 37.8° C. (100° F.) is generally used for higher temperature air-conditioning applications. The division, however, is not exact and both viscosities can be used for low temperature applications. Even higher viscosity oils such as 500 SUS are used in mobile air-conditioning applications. Examples of mineral oils that were commonly used with chlorofluorocarbon (CFC) refrigerants are Suniso 3GS, 4GS, and 5GS (Sun Oil Company) with viscosities of 150, 300, and 500 SUS, respectively.

The densities of the three Suniso oils are about 0.91 to 0.92 g cm$^{-3}$ at 21.1° C. (70° F.). The molecular weight can vary from about 300 to 330 g gmol$^{-1}$. The properties of these products can vary since they are natural or mineral-based oils (MO) derived from underground petroleum sources which are a complex mixture of chemical compounds; the composition may also vary with drilling location and time (Downing, R. C. Fluorocarbon Refrigerants Handbook, Prentice-Hall, 1988).

Many ionic liquids have the proper viscosity, density, and molecular weight range to be used as lubricants as shown in Example 1, Table 1. For vapor compression heating or cooling systems the lubricant must be soluble in the refrigerant such that the lubricant that escapes the compressor and becomes entrained with the refrigerant is returned to the compressor. In addition, the mixture properties of the refrigerant and lubricant must adequately perform as a lubricant in the compressor.

The viscosity of oil with dissolved refrigerant is the key factor in oil return since the oil is moved by the force of the flowing refrigerant and thin oil moves better than thick or viscous oil. Temperature is also an important factor, but ultimately the mixture viscosity properties of the oil and refrigerant dominate the ability of the oil to return to the compressor.

Several measurements of the viscosity of oil-refrigerant solutions have been reported (Downing, R. C. Fluorocarbon Refrigerants Handbook, Prentice-Hall, 1988). In order to have the proper lubrication in the compressor, the mixture viscosity should be similar to the mixture viscosity of the traditional refrigerant-oil working fluid. For illustration, the viscosity of the mixtures of the refrigerant chlorodifluoromethane (HCFC-22) with several SUNISO lubricants were compared to that of refrigerant-ionic liquid working fluids useful for the invention. (see Example 2, Table 2).

EXAMPLE 1

Viscosity, density, and molecular weight comparison of ionic liquids with SUNISO 3GS, 4GS, and 5GS mineral oils are shown in Table 1 (Downing, R. C., supra).

TABLE 1

| | Ionic Liquid | | |
|---|---|---|---|
| | Viscosity at 40° C. (cP or mPa·s) | Density at 21° C. (g cm$^{-3}$) | Molecular Weight (g mol$^{-1}$) |
| SUNISO 3GS | 27 | 0.91 | 300-330 |
| SUNISO 4GS | 51 | 0.92 | 300-330 |
| SUNISO 5GS | 87 | 0.92 | 300-330 |
| [bmim][PF$_6$] | 147 | 1.37 | 284.2 |
| [bmim][BF$_4$] | 59 | 1.21 | 226.0 |
| [dmpim][TMeM] | 239 | 1.60 | 551.5 |
| [emim][BEI] | 44 | 1.59 | 491.3 |
| [emim][BMeI] | 20 | 1.52 | 391.3 |
| [dmpim][BMeI] | — | — | 419.4 |
| [pmpy][BMeI] | 31 | 1.45 | 416.4 |
| [bmpy][BMeI] | — | 1.42 | 430.4 |
| [emim][TFES] | — | 1.50* | 292.3 |
| [bmim][TFES] | — | 1.32* | 320.3 |
| [dmim][TFES] | — | 1.14* | 432.5 |

TABLE 1-continued

| | Ionic Liquid | | |
|---|---|---|---|
| | Viscosity at 40° C. (cP or mPa·s) | Density at 21° C. (g cm$^{-3}$) | Molecular Weight (g mol$^{-1}$) |
| [hmim][TFES] | — | 1.27* | 362.4 |
| [bmim][Ac] | — | 1.05** | 198.3 |
| [bmim][MeSO$_4$] | — | 1.21** | 250.3 |
| [bmim][SCN] | — | 1.07** | 197.3 |
| [bmim][FS] | — | 1.45 | 436.3 |
| [bmim][HFPS] | 108 | 1.41 | 370.3 |
| [bmim][TPES] | 119 | 1.43 | 436.3 |
| [bmim][TTES] | 93 | 1.40 | 386.3 |
| [6,6,6,14-P][TPES] | 191 | 1.07 | 780.0 |
| [4,4,4,14-P][HFPS] | 289 | 1.07 | 629.4 |

*T = 28.3° C.,
**T = 25-26° C.

EXAMPLE 2

The concentration of the refrigerant in the ionic liquid (or oil) and viscosity of the refrigerant and ionic liquid (or oil) mixtures were calculated and compared with chlorodifluoromethane (HCFC-22) and the three SUNISO lubricants (3GS, 4GS, and 5GS) (see Downing, R. C., (supra)). The temperature in all cases was 40° C. and the lubrication effectiveness was evaluated as excellent, good, average, or poor based on how close the viscosity of the mixture compared with HCFC-22 and the SUNISO lubricants as shown in Table 2. Five mixtures were rated as "excellent": HFC-134a and [bmim][PF$_6$], HFC-152a and [bmim][PF$_6$], HFC-134a and [bmim][TPES], HFC-134a and [bmim][TTES], and HFC-134a and [4,4,4,14-P][HFPS]. Three refrigerant-ionic liquid mixtures were evaluated with a "good" lubrication performance: HFC-143a and [bmim][PF$_6$], HFC-134a and [bmim][HFPS], and HFC-134a and [6,6,6,14-P][TPES]. In addition, four refrigerant-ionic liquid mixtures were evaluated to have "average" lubrication performance: HFC-134a and [emim][BEI], HFC-32 and [bmim][BF$_4$], HFC-125 and [bmim][PF$_6$], and HFC-32 and [bmim]PF$_6$]. Finally, several mixtures were found to have "poor" lubrication performance because the viscosity of the mixture was too low compared with HCFC-22 and the SUNISO lubricants. Those mixtures included HFC-32 with [dmpim][TMeM], [emim][BEI], [pmpy][BMeI], [emim][BMeI], [bmim][HFPS], [bmim][TPES], and [bmim][TTES]. Although HFC-32 has a high solubility in the ionic liquid which reduces the viscosity of the mixture, it also most not decrease the viscosity so much that the mixture viscosity is too low for providing adequate lubrication in the compressor. Therefore, ionic liquids with higher molecular weights may work better with the HFC-32 refrigerant for lubricating the compressor.

TABLE 2

| Refrigerant | Lubricant | Refrigerant in Lubricant (mass %) | Mixture Viscosity (cp) | Lubrication Effectiveness |
|---|---|---|---|---|
| HCFC-22 | SUNISO 3GS | 10 | 10 | Excellent |
| HCFC-22 | SUNISO 4GS | 10 | 16 | Excellent |
| HCFC-22 | SUNISO 5GS | 10 | 23 | Excellent |
| HFC-32 | [bmim][PF$_6$] | 20 | 4 | Average |
| HFC-125 | [bmim][PF$_6$] | 10 | 48 | Average |
| HFC-134a | [bmim][PF$_6$] | 15 | 26 | Excellent |
| HFC-143a | [bmim][PF$_6$] | 10 | 31 | Good |
| HFC-152a | [bmim][PF$_6$] | 15 | 13 | Excellent |
| HFC-32 | [bmim][BF$_4$] | 20 | 4 | Average |
| HFC-32 | [dmpim][TMeM] | 20 | 1 | Poor |
| HFC-32 | [emim][BEI] | 20 | 1 | Poor |
| HFC-32 | [pmpy][BMeI] | 20 | 1 | Poor |
| HFC-32 | [emim][BMeI] | 20 | 1 | Poor |
| HFC-32 | [bmim][HFPS] | 20 | 2 | Poor |
| HFC-32 | [bmim][TPES] | 20 | 2 | Poor |
| HFC-32 | [bmim][TTES] | 20 | 2 | Poor |
| HFC-134a | [emim][BEI] | 15 | 6 | Average |
| HFC-134a | [bmim][HFPS] | 15 | 15 | Good |
| HFC-134a | [bmim][TPES] | 15 | 12 | Excellent |
| HFC-134a | [bmim][TTES] | 15 | 13 | Excellent |
| HFC-134a | [6,6,6,14-P][TPES] | 15 | 6 | Good |
| HFC-134a | [4,4,4,14-P][HFPS] | 15 | 10 | Excellent |

Examples 3-35 provide solubility and diffusivity results for several hydrofluorocarbon refrigerants. These data are used for solubility with lubricant in Examples 1 and 2.

Examples 3-7 and FIGS. 3-7 show solubility and diffusivity results for several hydrofluorocarbons (HFC-32, HFC-125, HFC-134a, HFC-143a, and HFC-152a) in one ionic liquid, [bmim][PF$_6$], at 10, 25, 50, and 75° C. Compositions were prepared that consisted of HFC-32 and [bmim][PF$_6$] from about 0.3 to about 81.2 mole percent of HFC-32 over a temperature range from 10 to 75° C. at a pressure from about 0.1 to 10 bar. Compositions were prepared that consisted of HFC-125 and [bmim][PF$_6$] from about 0.1 to about 65.1 mole percent of HFC-125 over a temperature range from 10 to 75° C. at a pressure from about 0.1 to 10 bar. Compositions were prepared that consisted of HFC-134a and [bmim][PF$_6$] from about 0.1 to about 72.1 mole percent of HFC-134a over a temperature range from 10 to 75° C. at a pressure from about 0.1 to 3.5 bar. Compositions were prepared that consisted of HFC-143a and [bmim][PF$_6$] from about 0.1 to about 26.5 mole percent of HFC-143a over a temperature range from 10 to 75° C. at a pressure from about 0.1 to 7.5 bar. Compositions were prepared that consisted of HFC-152a and [bmim][PF$_6$] from about 0.5 to about 79.7 mole percent of HFC-152a over a temperature range from 10 to 75° C. at a pressure from about 0.1 to 4.5 bar.

Figure 9:
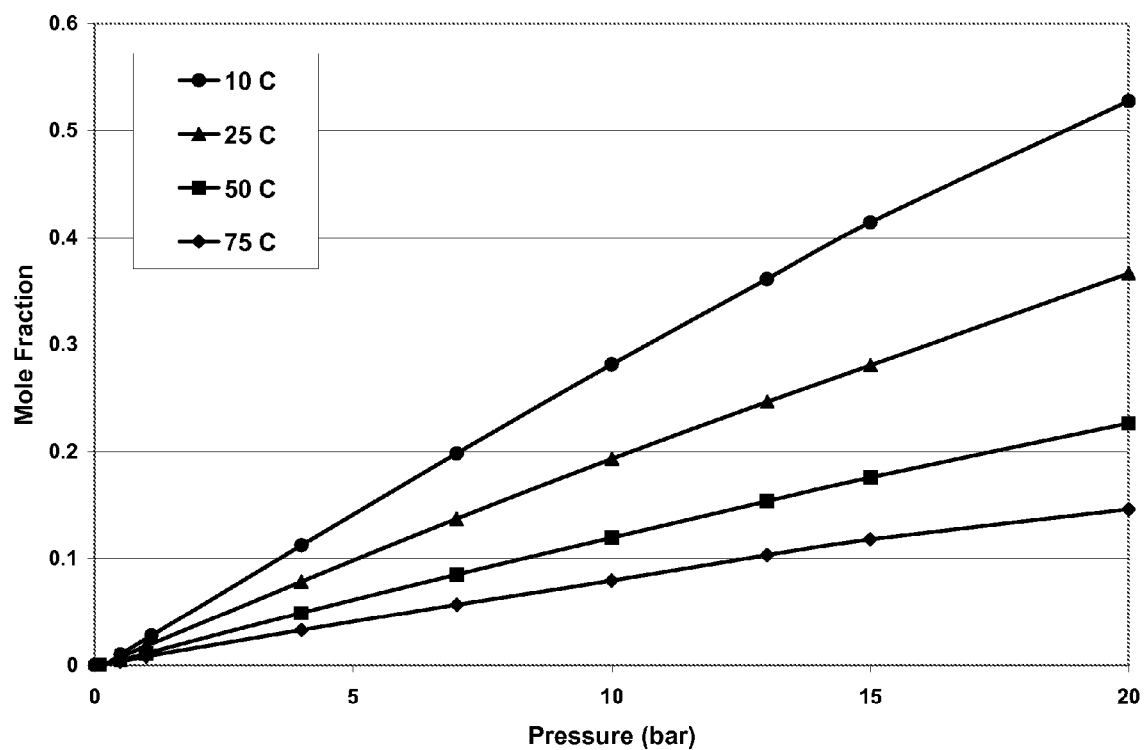
FIG. 9 shows measured isothermal solubility data (in mole fraction) of the system HFC-23+[bmim][PF$_6$] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 10:
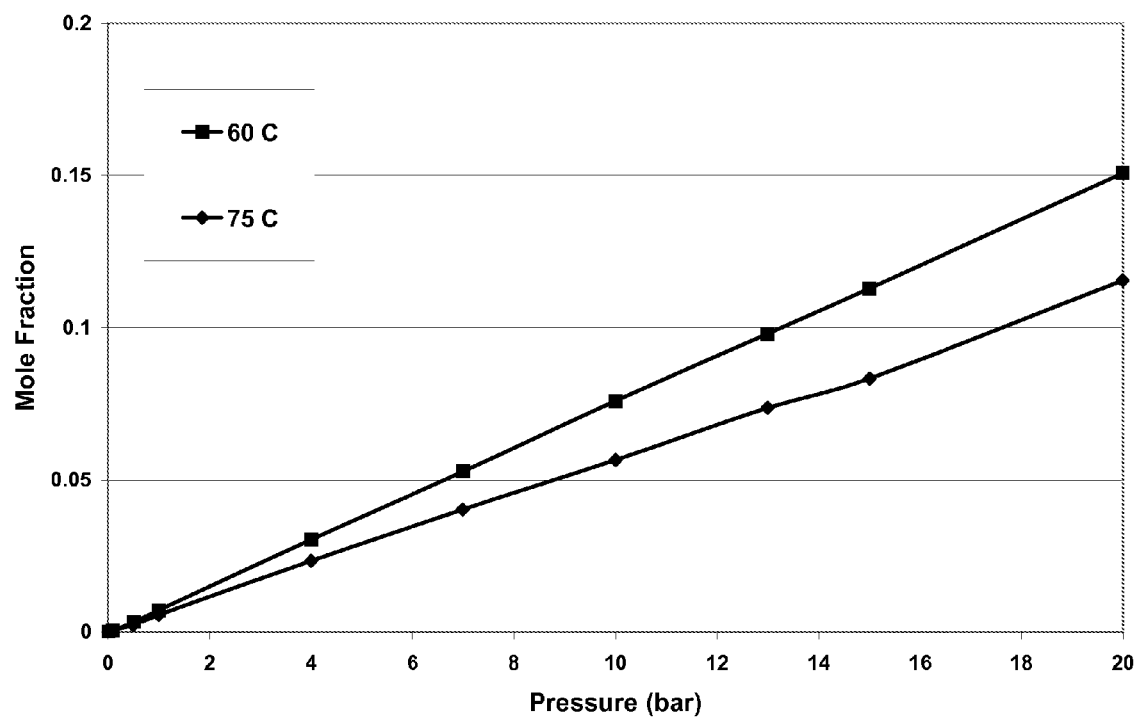
FIG. 10 shows measured isothermal solubility data (in mole fraction) of the system HFC-23+[emim][PF$_6$] as a function of pressure. Filled squares (■) represent measured isothermal data at 60° C., and filled diamonds (♦) represent measured isothermal data at 75° C. Solid lines represent data trends.
Figure 11:
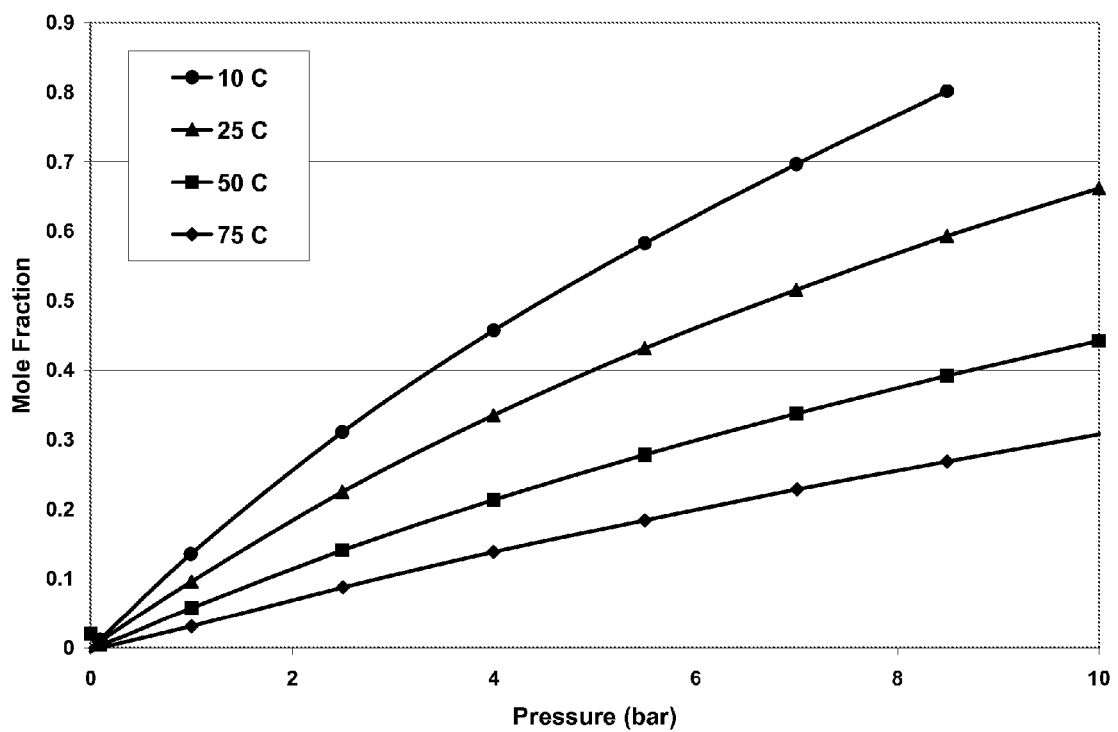
FIG. 11 shows measured isothermal solubility data (in mole fraction) of the system HFC-32+[dmpim][TMeM] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 12:
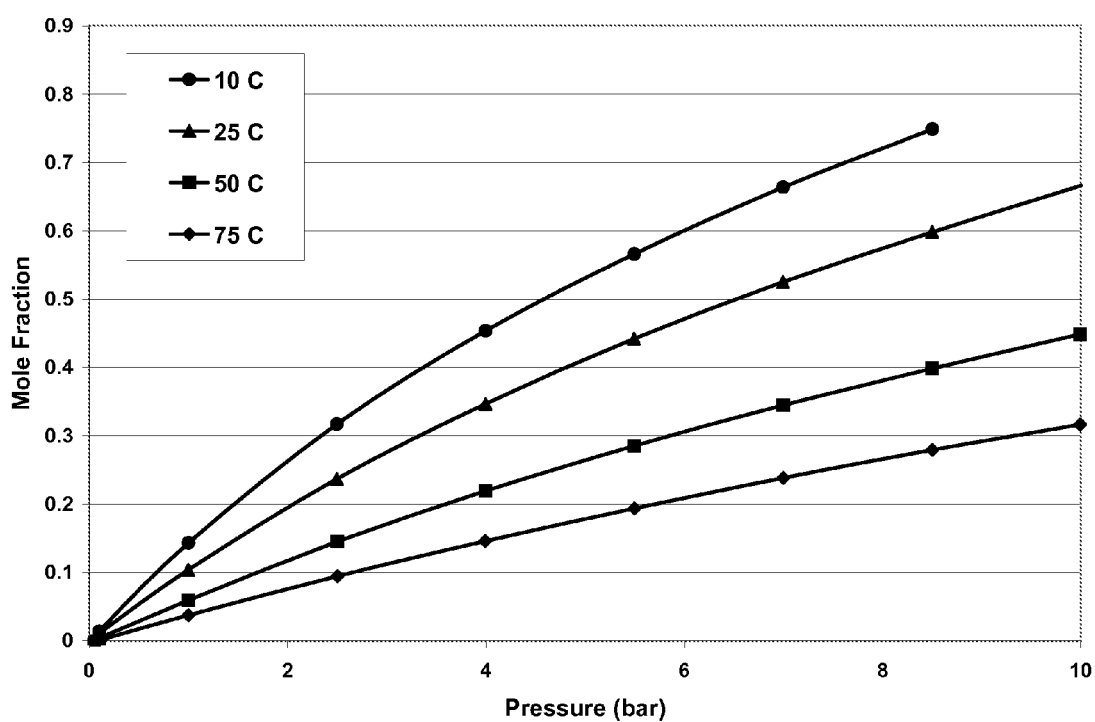
FIG. 12 shows measured isothermal solubility data (in mole fraction) of the system HFC-32+[emim][BEI] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 13:
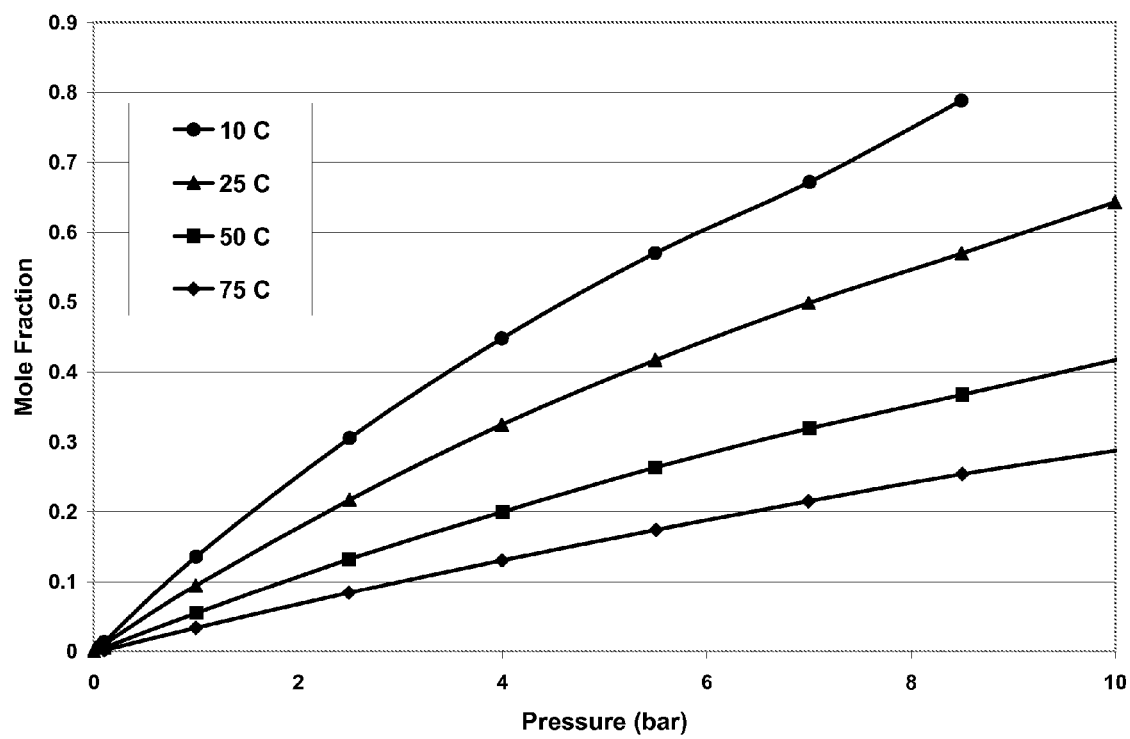
FIG. 13 shows measured isothermal solubility data (in mole fraction) of the system HFC-32+[emim][BMeI] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 14:
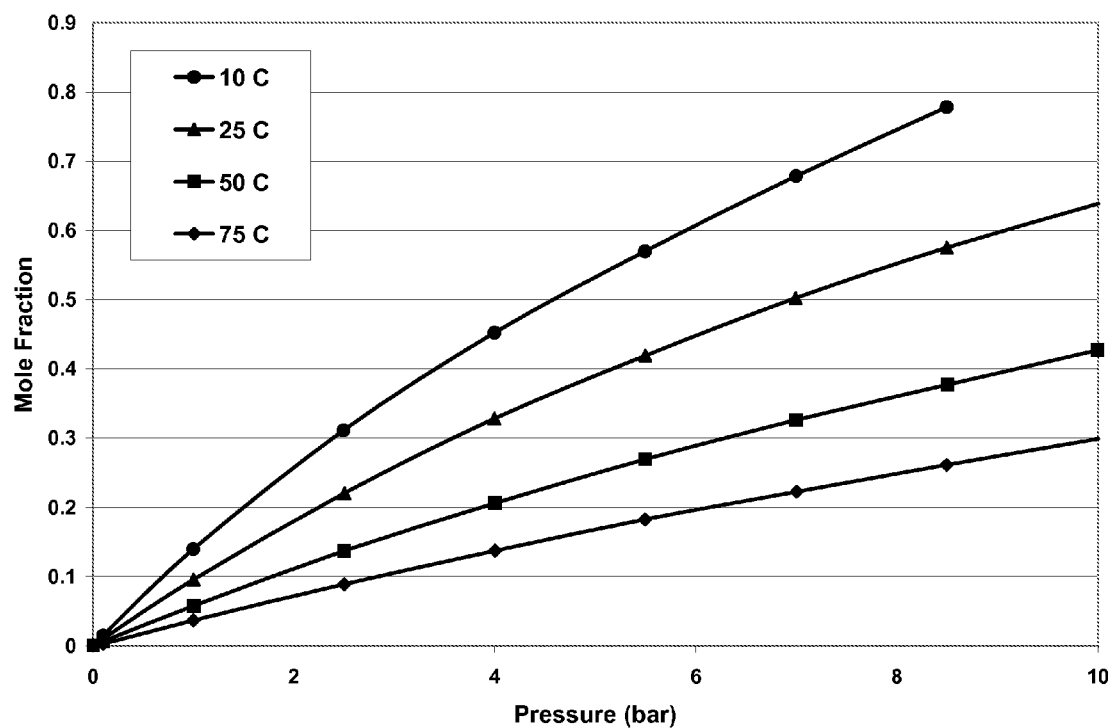
FIG. 14 shows measured isothermal solubility data (in mole fraction) of the system HFC-32+[pmpy][BMeI] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 15:
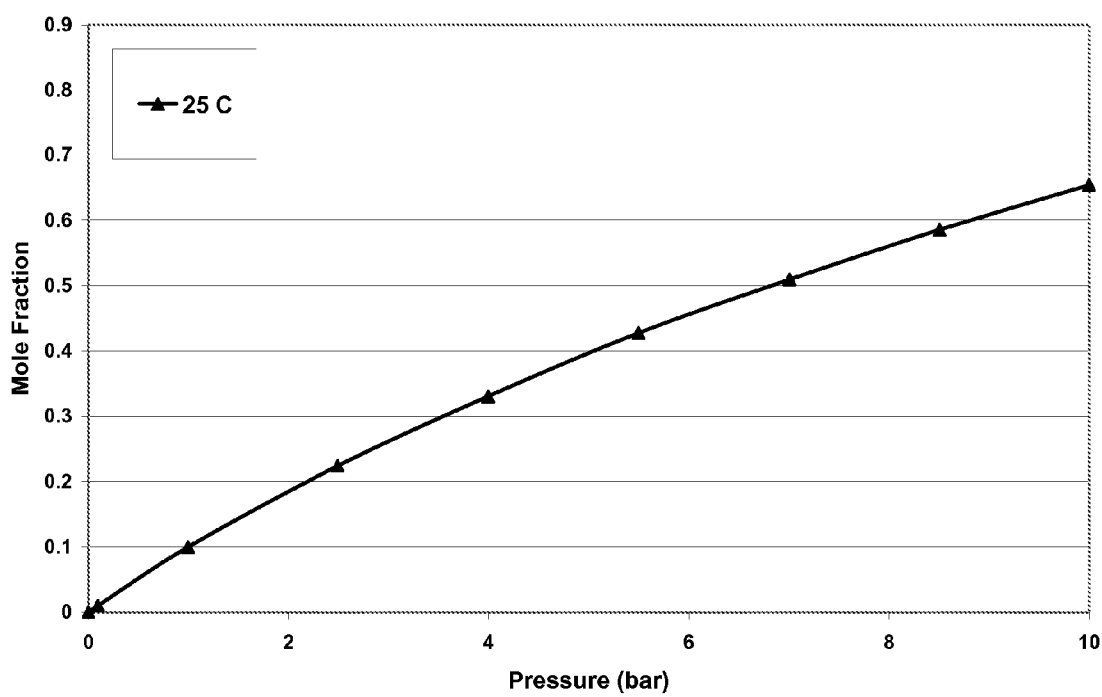
FIG. 15 shows measured isothermal solubility data (in mole fraction) of the system HFC-32+[bmpy][BMeI] as a function of pressure. Filled circles (●) represent measured isothermal data at 10° C., filled triangles (▲) represent measured isothermal data at 25° C., filled squares (■) represent measured isothermal data at 50° C., and filled diamonds (♦) represent measured isothermal data at 75° C. Solid lines represent data trends.
Figure 16:
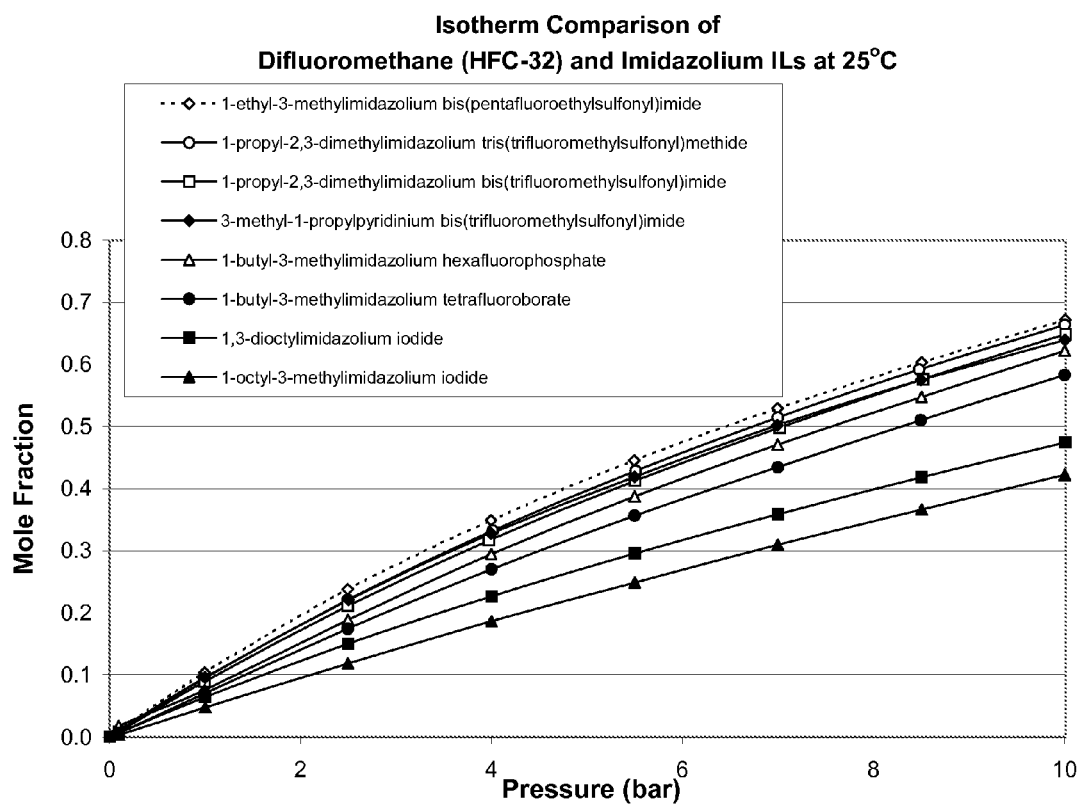
FIG. 16 shows measured isothermal solubility data at 25° C. of the systems HFC-32+eight different ionic liquids as a function of pressure for comparison. Open diamonds (◇) represent measured isothermal data for HFC-32+1-ethyl-3-methylimidazolium bis(pentafluoroethylsulfonyl)imide, open circles (○) represent measured isothermal data for HFC-32+1-propyl-2,3-dimethylimidazolium tris(trifluoromethylsulfonyl)methide at 25° C., open squares (□) represent measured isothermal data for HFC-32+1-propyl-2,3-dimethylimidazolium bis(trifluoromethylsulfonyl)imide at 25° C., closed diamonds (♦) represent measured isothermal data for HFC-32+3-methyl-1-propylpyridinium bis(trifluoromethylsulfonyl)imide, open triangles (△) represent measured isothermal data for HFC-32+1-butyl-3-methylimidazolium hexafluorophosphate at 25° C., filled circles (●) represent measured isothermal data for HFC-32+1-butyl-3-methylimidazolium tetrafluoroborate at 25° C., filled squares (■) represent measured isothermal data for HFC-32+1,3-dioctylimidazolium iodide at 25° C., and filled triangles (▲) represent measured isothermal data for HFC-32+1-octyl-3-methylimidazolium iodide at 25° C. Solid lines represent data trends.

Examples 8-14 and 17-29 and FIGS. 8, 11-16 show solubility and diffusivity results for HFC-32 in several additional ionic liquids. Examples 15 and 16 and FIGS. 9 and 10 show solubility and diffusivity results for HFC-23 in the ionic liquids [bmim][PF$_6$] and [emim][PF$_6$].

Examples 30-35 show solubility and diffusivity results for HFC-134a in several ionic liquids.

Compositions were prepared that consisted of HFC-32 and [bmim][BF$_4$] from about 0.1 to about 76.5 mole percent of HFC-32 over a temperature range from 10 to 75° C. at a pressure from about 0.1 to 10 bar. Compositions were prepared that consisted of HFC-32 and [dmpim][TMeM] from about 0.9 to about 66 mole percent of HFC-32 at a temperature of 25° C. and a pressure from about 0.1 to 10 bar. Compositions were prepared that consisted of HFC-32 and [omim][I] from about 0.4 to about 41.6 mole percent of HFC-32 at a temperature of 25° C. and a pressure from about 0.1 to 10 bar. Compositions were prepared that consisted of HFC-32 and [doim][I] from about 0.7 to about 46.8 mole percent of HFC-32 at a temperature of 25° C. and a pressure from about 0.1 to 10 bar. Compositions were prepared that consisted of HFC-32 and [emim][BEI] from about 1.0 to about 66.6 mole percent of HFC-32 at a temperature of 25° C. and a pressure from about 0.1 to 10 bar. Compositions were prepared that consisted of HFC-32 and [dmpim][TMeM] from about 0.8 to about 64.5 mole percent of HFC-32 at a temperature of 25° C. and a pressure from about 0.1 to 10 bar. Compositions were prepared that consisted of HFC-32 and [pmpy][BMeI] from about 1.0 to about 63.9 mole percent of HFC-32 at a temperature of 25° C. and a pressure from about 0.1 to 10 bar. Compositions were prepared that consisted of HFC-32 and [emim][BMeI] from about 0.1 to about 78.5 mole percent of HFC-32 over a temperature range from 10 to 75° C. at a pressure from about 0.1 to 10 bar. Compositions were prepared that consisted of HFC-32 and [bmpy][BMeI] from about 1.0 to about 64.8 mole percent of HFC-32 at a temperature of 25° C. and a pressure from about 0.1 to 10 bar. Compositions were prepared that consisted of HFC-32 and [emim][TFES] from about 1.0 to about 47.1 mole percent of HFC-32 at a temperature of 25° C. and a pressure from about 0.1 to 10 bar. Compositions were prepared that consisted of HFC-32 and [bmim][TFES] from about 1.0 to about 55.0 mole percent of HFC-32 at a temperature of 25° C. and a pressure from about 0.1 to 10 bar. Compositions were prepared that consisted of HFC-32 and [odmim][TFES] from about 1.0 to about 56.2 mole percent of HFC-32 at a temperature of 25° C. and a pressure from about 0.1 to 10 bar. Compositions were prepared that consisted of HFC-32 and [hmim][TFES] from about 1.0 to about 58.6 mole percent of HFC-32 at a temperature of 25° C. and a pressure from about 0.1 to 10 bar. Compositions were prepared that consisted of HFC-23 and [bmim][$PF_6$] from about 0.1 to about 52.8 mole percent of HFC-23 over a temperature range from 10 to 75° C. at a pressure from about 0.1 to 20 bar. Compositions were prepared that consisted of HFC-23 and [emim][$PF_6$] from about 0.1 to about 15.1 mole percent of HFC-23 over a temperature range from 60 to 75° C. at a pressure from about 0.1 to 20 bar.

Figure 17:
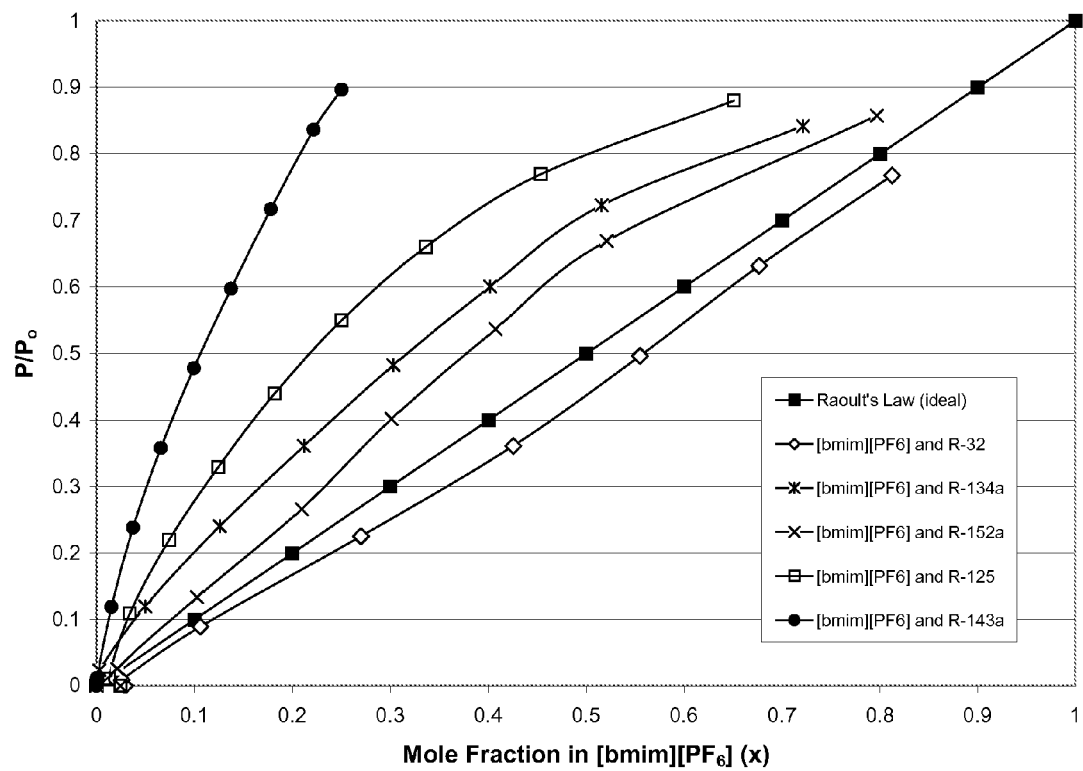
FIG. 17 shows measured isothermal solubility data (in mole fraction) at 10° C. of the systems HFC-32, HFC-152a, HFC-134a, HFC-125, and HFC-143a+[bmim][PF$_6$] in terms of absolute pressure divided by the gas saturation pressure at 10° C. shown by ratio (P/P$_0$). Open diamonds (◇) represent measured isothermal data for HFC-32 at 10° C. with P$_0$=11.069 bar, open cross hatch (X) represents measured isothermal data for HFC-152a at 10° C. with P$_0$=3.7277 bar, filled circles (●) represent measured isothermal data for HFC-134a at 10° C. with P$_0$=4.1461 bar, open squares (□) represent measured isothermal data for HFC-125 at 10° C. with P$_0$=9.0875 bar, filled circles (●) represent measured isothermal data for HFC-143a at 10° C. with P$_0$=8.3628 bar. Solid lines represent data trend and dashed line represents Raoult's Law.

FIG. 17 shows measured isothermal solubility data (in mole fraction) at 10° C. of the systems HFC-32, HFC-152a, HFC-134a, HFC-125, and HFC-143a+[bmim][$PF_6$] in terms of absolute pressure divided by the gas saturation pressure ($P_0$) at 10° C. shown by ratio ($P/P_0$). The saturation pressures for HFC-32, HFC-125, HFC-134a, HFC-143a, and HFC-152a at 10° C. are $P_0$=11.069 bar, $P_0$=3.7277 bar, $P_0$=4.1461 bar, $P_0$=9.0875, and $P_0$=8.3628 bar, respectively. Negative deviations from Raoult's law (i.e. curvature below the dashed line) indicate strong interaction between the refrigerant and the ionic liquid, which indicates high solubility. In particular HFC-32 has negative deviation from Raoult's law as shown in FIG. 17. Compositions comprise HFC-32 and [bmim][$PF_6$] from about 0.1 to 63 mole percent of HFC-32 at 10° C. and $P/P_0$ from about 0.1 to about 0.63. Strong positive deviations from Raoult's law (i.e. curvature above the dashed line) are more typical and indicate refrigerant and ionic liquids are less soluble and eventually may form a liquid-liquid phase separation. Compositions comprise HFC-152a and [bmim][$PF_6$] from about 0.1 to about 80 mole percent of HFC-152a at 10° C. and $P/P_0$ from 0.1 to about 0.86. Compositions comprise HFC-134a and [bmim][$PF_6$] from about 0.1 to about 72 mole percent of HFC-134a at 10° C. and $P/P_0$ from about 0.1 to about 0.84. Compositions comprise HFC-125 and [bmim][$PF_6$] from about 0.1 mole to about 65 mole percent of HFC-125 at 10° C. and $P/P_0$ from about 0.1 to about 0.88. Compositions comprise HFC-143a and [bmim][$PF_6$] from about 0.1 to about 25 mole percent at 10° C. and $P/P_0$ from about 0.1 to about 0.90.

Example 36 provides details about the components of the microbalance.

Examples 37-38 show solubility and diffusivity results for $CO_2$ in two different ionic liquids.

EXAMPLE 3

Solubility of Difluoromethane (HFC-32) in 1-butyl-3-methylimidazolium Hexafluorophosphate [bmim][$PF_6$]

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 4a, 4b, 4c and 4d provide data for $C_o$, $C_s$, D, $X_{calc.}$, and $X_{meas.}$ at temperatures of 10, 25, 50 and 75° C., respectively.

TABLE 4a

| T (° C.) | P (bar) | $C_o$ (mass %) | $C_s$ (mass %) | D ($m^2$/sec) | $X_{calc.}$ (mol. fraction) | $X_{meas.}$ (mol. fraction) |
|---|---|---|---|---|---|---|
| 10.0 | 0.0979 | 0.52 | 0.54 | 1.54E−09 | 0.029 | 0.026 |
| 10.0 | 0.9957 | 0.82 | 2.53 | 1.94E−11 | 0.124 | 0.106 |
| 10.0 | 2.4967 | 3.32 | 7.56 | 1.71E−11 | 0.309 | 0.270 |
| 10.0 | 3.9964 | 8.18 | 12.38 | 3.65E−11 | 0.436 | 0.426 |
| 10.0 | 5.4975 | 14.44 | 18.71 | 6.34E−11 | 0.557 | 0.555 |
| 10.0 | 6.9965 | 22.12 | 27.85 | 7.42E−11 | 0.678 | 0.676 |
| 10.0 | 8.4954 | — | — | — | — | 0.812 |

TABLE 4b

| T (° C.) | P (bar) | $C_o$ (mass %) | $C_s$ (mass %) | D ($m^2$/sec) | $X_{calc.}$ (mol. fraction) | $X_{meas.}$ (mol. fraction) |
|---|---|---|---|---|---|---|
| 24.9 | 0.0965 | 0.16 | 0.21 | 1.84E−10 | 0.012 | 0.018 |
| 25.0 | 0.9952 | 0.49 | 1.69 | 2.45E−11 | 0.086 | 0.076 |
| 25.0 | 2.4965 | 2.22 | 4.53 | 2.44E−11 | 0.206 | 0.189 |
| 25.0 | 3.9979 | 5.05 | 7.37 | 3.51E−11 | 0.303 | 0.295 |
| 24.9 | 5.4969 | 8.23 | 10.47 | 5.41E−11 | 0.390 | 0.387 |
| 24.9 | 6.9950 | 11.82 | 14.09 | 6.75E−11 | 0.473 | 0.471 |
| 25.0 | 8.5012 | 15.75 | 18.26 | 8.33E−11 | 0.550 | 0.548 |
| 24.9 | 9.9994 | 20.38 | 23.31 | 8.84E−11 | 0.624 | 0.622 |

TABLE 4c

| T (° C.) | P (bar) | $C_o$ (mass %) | $C_s$ (mass %) | D ($m^2$/sec) | $X_{calc.}$ (mol. fraction) | $X_{meas.}$ (mol. fraction) |
|---|---|---|---|---|---|---|
| 49.6 | 0.0992 | 0.00 | 0.12 | 4.76E−11 | 0.007 | 0.006 |
| 49.9 | 0.9954 | 0.33 | 0.92 | 5.28E−11 | 0.048 | 0.047 |
| 49.9 | 2.4963 | 1.43 | 2.31 | 5.29E−11 | 0.115 | 0.113 |
| 49.9 | 3.9949 | 2.84 | 3.72 | 5.98E−11 | 0.174 | 0.173 |
| 49.9 | 5.4966 | 4.41 | 5.22 | 5.99E−11 | 0.231 | 0.229 |
| 49.9 | 6.9965 | 5.81 | 6.72 | 7.69E−11 | 0.282 | 0.282 |
| 50.0 | 8.4959 | 7.37 | 8.32 | 8.54E−11 | 0.331 | 0.331 |
| 50.0 | 9.9959 | 9.78 | 10.05 | 4.04E−11 | 0.379 | 0.377 |

TABLE 4d

| T (° C.) | P (bar) | $C_o$ (mass %) | $C_s$ (mass %) | D ($m^2$/sec) | $X_{calc.}$ (mol. fraction) | $X_{meas.}$ (mol. fraction) |
|---|---|---|---|---|---|---|
| 75.0 | 0.0988 | 0.00 | 0.06 | 7.12E−11 | 0.003 | 0.003 |
| 75.0 | 0.9968 | 0.30 | 0.56 | 8.19E−11 | 0.030 | 0.029 |
| 75.0 | 2.4950 | 0.96 | 1.38 | 8.14E−11 | 0.071 | 0.069 |
| 75.0 | 3.9944 | 1.74 | 2.19 | 9.82E−11 | 0.109 | 0.108 |

TABLE 4d-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 5.4983 | 2.60 | 3.03 | 9.70E-11 | 0.146 | 0.145 |
| 74.9 | 6.9966 | 3.42 | 3.89 | 9.58E-11 | 0.181 | 0.180 |
| 75.0 | 8.4958 | 4.28 | 4.77 | 9.56E-11 | 0.215 | 0.212 |
| 75.0 | 9.9989 | 5.12 | 5.62 | 1.18E-10 | 0.245 | 0.244 |

EXAMPLE 4

Solubility of Pentafluoroethane (HFC-125) in 1-butyl-3-methylimidazolium Hexafluorophosphate [bmim][$PF_6$]

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 5a, 5b, 5c and 5d provide data for $C_o$, $C_s$, D, $X_{calc}$, and $X_{meas}$ at temperatures of 10, 25, 50 and 75° C., respectively.

TABLE 5a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.9 | 0.0992 | 0.0 | 0.12 | 2.52E-12 | 0.003 | 0.013 |
| 10.0 | 0.9964 | 0.73 | 1.50 | 1.83E-11 | 0.035 | 0.034 |
| 10.1 | 1.9959 | 1.72 | 3.96 | 6.36E-12 | 0.089 | 0.074 |
| 10.0 | 2.9960 | 3.55 | 6.25 | 9.31E-12 | 0.136 | 0.125 |
| 10.1 | 3.9964 | 6.03 | 8.88 | 1.56E-11 | 0.187 | 0.182 |
| 9.9 | 4.9965 | 9.10 | 12.52 | 2.44E-11 | 0.253 | 0.250 |
| 10.0 | 5.9965 | 13.18 | 17.56 | 4.05E-11 | 0.335 | 0.336 |
| 9.9 | 6.9962 | 19.19 | 26.04 | 6.12E-11 | 0.455 | 0.454 |
| 10.0 | 7.9979 | — | — | — | — | 0.651 |

TABLE 5b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0977 | 0.0 | 0.09 | 3.29E-12 | 0.002 | 0.003 |
| 25.0 | 0.9963 | 0.23 | 0.09 | 1.81E-11 | 0.002 | 0.023 |
| 25.0 | 1.9982 | 1.05 | 2.12 | 1.50E-11 | 0.049 | 0.050 |
| 24.9 | 2.9949 | 2.13 | 3.11 | 2.15E-11 | 0.071 | 0.079 |
| 25.0 | 3.9982 | 3.50 | 4.71 | 2.03E-11 | 0.105 | 0.109 |
| 25.0 | 4.9947 | 4.84 | 6.18 | 2.39E-11 | 0.135 | 0.140 |
| 25.0 | 5.9951 | 6.38 | 7.91 | 2.65E-11 | 0.169 | 0.176 |
| 25.0 | 7.9955 | 8.96 | 12.10 | 4.81E-11 | 0.246 | 0.254 |
| 24.9 | 9.9977 | 14.20 | 18.16 | 7.82E-11 | 0.344 | 0.352 |

TABLE 5c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.1003 | 0.0 | 0.02 | 1.96E-10 | 0.000 | 0.000 |
| 49.9 | 0.9963 | 0.18 | 0.55 | 4.29E-11 | 0.013 | 0.013 |
| 49.9 | 1.9983 | 0.73 | 1.17 | 4.59E-11 | 0.027 | 0.027 |
| 50.0 | 2.9996 | 1.34 | 1.78 | 5.19E-11 | 0.041 | 0.041 |
| 49.9 | 3.9969 | 1.96 | 2.44 | 4.75E-11 | 0.056 | 0.056 |

TABLE 5c-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 4.9993 | 2.60 | 3.10 | 5.38E-11 | 0.070 | 0.070 |
| 49.9 | 5.9961 | 3.29 | 3.80 | 5.14E-11 | 0.086 | 0.085 |
| 49.9 | 7.9970 | 4.38 | 5.25 | 5.55E-11 | 0.116 | 0.116 |
| 49.9 | 9.9958 | 5.85 | 6.82 | 5.87E-11 | 0.148 | 0.148 |

TABLE 5d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.1021 | 0.0 | 0.03 | 6.85E-10 | 0.001 | 0.001 |
| 74.9 | 0.9965 | 0.07 | 0.28 | 7.49E-11 | 0.007 | 0.007 |
| 75.0 | 1.9961 | 0.36 | 0.60 | 9.46E-11 | 0.014 | 0.016 |
| 75.1 | 2.9967 | 0.70 | 0.93 | 7.04E-11 | 0.022 | 0.025 |
| 75.0 | 3.9971 | 1.04 | 1.27 | 7.96E-11 | 0.030 | 0.033 |
| 75.0 | 4.9983 | 1.36 | 1.61 | 9.86E-11 | 0.037 | 0.042 |
| 75.0 | 5.9980 | 1.75 | 1.97 | 7.12E-11 | 0.045 | 0.052 |
| 75.1 | 7.9997 | 2.26 | 2.65 | 1.14E-10 | 0.061 | 0.068 |
| 75.0 | 9.9959 | 3.00 | 3.33 | 8.89E-11 | 0.075 | 0.085 |

EXAMPLE 5

Solubility of 1,1,1,2-tetrafluoroethane (HFC-134a) in 1-butyl-3-methylimidazolium Hexafluorophosphate [bmim][$PF_6$]

A solubility and diffusivity study was made at temperatures of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 6a, 6b, 6c and 6d provide data for $C_o$, $C_s$, D, $X_{calc}$, and $X_{meas}$ at temperatures of 10, 25, 50 and 75° C., respectively.

TABLE 6a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 9.8 | 0.0999 | 0.0 | 0.23 | 4.21E-12 | 0.006 | 0.003 |
| 10.0 | 0.4981 | 0.35 | 2.20 | 6.46E-12 | 0.059 | 0.050 |
| 9.9 | 0.9986 | 2.25 | 5.73 | 5.78E-12 | 0.145 | 0.126 |
| 9.9 | 1.4981 | 5.40 | 9.15 | 1.01E-11 | 0.219 | 0.212 |
| 9.9 | 2.0024 | 9.30 | 13.64 | 1.48E-11 | 0.306 | 0.303 |
| 9.9 | 2.4907 | 14.39 | 19.36 | 2.67E-11 | 0.401 | 0.402 |
| 9.9 | 2.9974 | 20.96 | 27.51 | 5.33E-11 | 0.514 | 0.516 |
| 9.9 | 3.4900 | — | — | — | — | 0.721 |

TABLE 6b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 25.0 | 0.1002 | 0.17 | 0.29 | 4.36E-12 | 0.008 | 0.011 |
| 24.9 | 0.4981 | 0.57 | 1.52 | 1.89E-11 | 0.041 | 0.042 |
| 25.0 | 0.9972 | 1.82 | 3.26 | 1.71E-11 | 0.086 | 0.085 |
| 25.0 | 1.4987 | 3.60 | 5.09 | 2.00E-11 | 0.130 | 0.130 |
| 25.0 | 1.9930 | 5.43 | 7.09 | 2.27E-11 | 0.175 | 0.175 |
| 24.9 | 2.4996 | 7.53 | 9.31 | 2.59E-11 | 0.222 | 0.222 |

TABLE 6b-continued

| T (°C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 25.0 | 2.9952 | 9.78 | 11.82 | 2.82E−11 | 0.272 | 0.273 |
| 24.9 | 3.5000 | 12.51 | 14.62 | 3.99E−11 | 0.323 | 0.323 |

TABLE 6c

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.0992 | 0.07 | 0.13 | 2.44E−11 | 0.004 | 0.004 |
| 50.0 | 0.4984 | 0.25 | 0.75 | 4.39E−11 | 0.021 | 0.021 |
| 49.9 | 0.9971 | 1.00 | 1.57 | 3.94E−11 | 0.043 | 0.043 |
| 49.9 | 1.4989 | 1.79 | 2.42 | 4.48E−11 | 0.064 | 0.065 |
| 50.0 | 1.9895 | 2.65 | 3.28 | 4.38E−11 | 0.086 | 0.086 |
| 50.0 | 2.4900 | 3.75 | 4.23 | 2.33E−11 | 0.110 | 0.108 |
| 50.0 | 2.9897 | 4.43 | 5.10 | 4.90E−11 | 0.130 | 0.130 |
| 50.0 | 3.4933 | 5.39 | 6.06 | 5.00E−11 | 0.152 | 0.152 |

TABLE 6d

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0970 | 0.00 | 0.03 | 6.45E−11 | 0.001 | 0.001 |
| 74.9 | 0.4984 | 0.09 | 0.32 | 7.49E−11 | 0.009 | 0.009 |
| 74.9 | 0.9934 | 0.51 | 0.79 | 7.93E−11 | 0.022 | 0.022 |
| 74.9 | 1.5010 | 0.98 | 1.27 | 7.78E−11 | 0.035 | 0.035 |
| 75.0 | 1.9983 | 1.44 | 1.73 | 8.37E−11 | 0.047 | 0.046 |
| 75.0 | 2.5014 | 1.89 | 2.21 | 8.37E−11 | 0.059 | 0.059 |
| 75.0 | 3.0022 | 2.39 | 2.71 | 8.26E−11 | 0.072 | 0.072 |
| 75.0 | 3.4897 | 2.95 | 3.21 | 5.53E−11 | 0.085 | 0.084 |

EXAMPLE 6

Solubility of 1,1,1-trifluoroethane (HFC-143a) in 1-butyl-3-methylimidazolium Hexafluorophosphate [bmim][PF$_6$]

A solubility and diffusivity study was made at temperatures of 10, 25, 50, and 75° C. over a pressure range from 0 to 7.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 7a, 7b, 7c and 7d provide data for $C_o$, $C_s$, D, $X_{calc}$, and $X_{meas}$ at temperatures of 10, 25, 50 and 75° C., respectively.

TABLE 7a

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 11.7 | 0.0956 | 0.03 | 0.10 | 8.10E−12 | 0.003 | 0.003 |
| 12.0 | 0.9970 | 0.22 | 0.92 | 8.51E−12 | 0.031 | 0.029 |
| 11.9 | 1.9830 | 0.99 | 1.93 | 8.11E−12 | 0.064 | 0.060 |
| 12.0 | 2.9740 | 1.95 | 2.39 | 3.21E−12 | 0.078 | 0.093 |
| 12.3 | 3.9808 | 3.06 | 4.03 | 1.04E−11 | 0.127 | 0.124 |
| 12.0 | 4.9975 | 4.16 | 5.23 | 1.10E−11 | 0.161 | 0.156 |
| 12.0 | 5.9821 | 5.30 | 6.42 | 1.44E−11 | 0.192 | 0.188 |

TABLE 7a-continued

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 12.2 | 6.9975 | 6.54 | 7.63 | 1.94E−11 | 0.223 | 0.219 |
| 12.2 | 7.4832 | 7.80 | 8.31 | 2.03E−11 | 0.239 | 0.235 |

TABLE 7b

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0951 | 0.00 | 0.01 | 1.53E−11 | 0.001 | 0.004 |
| 24.9 | 0.9970 | 0.24 | 0.69 | 2.05E−11 | 0.023 | 0.023 |
| 24.9 | 2.0054 | 0.84 | 1.33 | 2.56E−11 | 0.045 | 0.042 |
| 24.9 | 2.9895 | 1.40 | 2.10 | 1.83E−11 | 0.069 | 0.068 |
| 24.9 | 4.0147 | 2.26 | 2.89 | 1.77E−11 | 0.093 | 0.090 |
| 24.9 | 4.9886 | 2.95 | 3.60 | 2.24E−11 | 0.114 | 0.112 |
| 24.9 | 5.9855 | 3.71 | 4.33 | 2.73E−11 | 0.136 | 0.134 |
| 24.9 | 7.0019 | 4.47 | 5.12 | 2.83E−11 | 0.157 | 0.155 |
| 24.9 | 7.5011 | 5.14 | 5.53 | 3.61E−11 | 0.169 | 0.165 |

TABLE 7c

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.1050 | 0.00 | 0.03 | 1.51E−10 | 0.000 | 0.001 |
| 49.9 | 1.0023 | 0.16 | 0.40 | 4.47E−11 | 0.014 | 0.013 |
| 50.1 | 2.0045 | 0.61 | 0.84 | 3.41E−11 | 0.028 | 0.027 |
| 50.0 | 3.0002 | 1.03 | 1.26 | 2.90E−11 | 0.042 | 0.040 |
| 50.0 | 4.0021 | 1.39 | 1.65 | 5.08E−11 | 0.055 | 0.054 |
| 50.0 | 5.0046 | 1.81 | 2.08 | 4.10E−11 | 0.069 | 0.067 |
| 50.0 | 6.0039 | 2.29 | 2.50 | 3.75E−11 | 0.082 | 0.079 |
| 50.0 | 7.0029 | 2.63 | 2.90 | 5.57E−11 | 0.094 | 0.092 |
| 50.0 | 10.0030 | 3.56 | 4.16 | 5.51E−11 | 0.131 | 0.127 |

TABLE 7d

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0995 | 0.00 | 0.01 | 3.86E−12 | 0.000 | 0.001 |
| 74.9 | 1.0005 | 0.18 | 0.26 | 7.38E−11 | 0.009 | 0.009 |
| 74.8 | 1.9960 | 0.38 | 0.54 | 1.04E−10 | 0.018 | 0.018 |
| 74.9 | 3.0001 | 0.67 | 0.81 | 1.07E−10 | 0.028 | 0.027 |
| 74.9 | 4.0015 | 0.91 | 1.08 | 1.32E−10 | 0.037 | 0.036 |
| 74.9 | 5.0027 | 1.18 | 1.36 | 1.20E−10 | 0.045 | 0.044 |
| 75.0 | 5.9979 | 1.44 | 1.63 | 1.40E−10 | 0.054 | 0.053 |
| 75.0 | 7.0026 | 1.92 | 1.94 | 3.79E−09 | 0.064 | 0.061 |
| 74.9 | 10.0035 | 2.65 | 2.76 | 1.90E−09 | 0.089 | 0.083 |

EXAMPLE 7

Solubility of 1,1-difluoroethane (HFC-152a) in 1-butyl-3-methylimidazolium Hexafluorophosphate [bmim][PF$_6$]

A solubility and diffusivity study was made at temperatures of 10, 25, 50, and 75° C. over a pressure range from 0 to 4.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 8a, 8b, 8c and 8d provide data for $C_o$, $C_s$, D, $X_{calc}$, and $X_{meas}$ at temperatures of 10, 25, 50 and 75° C., respectively.

TABLE 8a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.0973 | 0.10 | 0.73 | 2.13E-12 | 0.031 | 0.021 |
| 10.0 | 0.4994 | 1.23 | 2.90 | 1.14E-11 | 0.114 | 0.103 |
| 10.0 | 0.9933 | 3.58 | 6.11 | 1.56E-11 | 0.219 | 0.210 |
| 10.0 | 1.4985 | 6.91 | 9.60 | 3.09E-11 | 0.314 | 0.301 |
| 9.9 | 2.0011 | 10.40 | 14.00 | 3.60E-11 | 0.412 | 0.407 |
| 9.9 | 2.4952 | 15.52 | 20.42 | 6.44E-11 | 0.525 | 0.521 |
| 9.9 | 3.1963 | — | — | — | — | 0.797 |

TABLE 8b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1002 | 0.16 | 0.66 | 2.00E-11 | 0.028 | 0.030 |
| 25.0 | 0.5006 | 1.02 | 1.92 | 2.01E-11 | 0.078 | 0.077 |
| 24.9 | 0.9982 | 2.34 | 3.55 | 2.64E-11 | 0.137 | 0.136 |
| 25.0 | 1.4924 | 4.20 | 5.35 | 2.89E-11 | 0.196 | 0.194 |
| 25.0 | 2.4969 | 6.74 | 9.52 | 4.96E-11 | 0.312 | 0.311 |
| 25.0 | 3.4818 | 11.59 | 15.05 | 7.73E-11 | 0.433 | 0.432 |
| 25.0 | 4.5051 | 18.83 | 23.81 | 1.04E-10 | 0.573 | 0.574 |

TABLE 8c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.1 | 0.9921 | 0.03 | 0.15 | 5.73E-11 | 0.007 | 0.007 |
| 50.0 | 1.0017 | 0.88 | 1.46 | 5.52E-11 | 0.060 | 0.060 |
| 50.0 | 1.5020 | 1.63 | 2.22 | 5.94E-11 | 0.089 | 0.089 |
| 50.0 | 2.4969 | 2.72 | 3.81 | 6.43E-11 | 0.145 | 0.145 |
| 50.0 | 4.5051 | 6.31 | 7.33 | 7.88E-11 | 0.254 | 0.254 |

TABLE 8d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.1032 | 0.04 | 0.11 | 1.38E-10 | 0.005 | 0.005 |
| 74.9 | 0.5019 | 0.19 | 0.42 | 1.25E-10 | 0.018 | 0.018 |
| 74.9 | 1.0023 | 0.57 | 0.84 | 1.21E-10 | 0.035 | 0.035 |
| 74.9 | 1.5014 | 0.99 | 1.27 | 1.25E-10 | 0.052 | 0.052 |
| 75.0 | 2.4964 | 1.63 | 2.12 | 1.42E-10 | 0.085 | 0.085 |
| 75.0 | 3.4970 | 2.57 | 2.98 | 1.48E-10 | 0.117 | 0.117 |
| 74.8 | 4.5003 | 3.51 | 3.89 | 1.21E-10 | 0.148 | 0.149 |

EXAMPLE 8

Solubility of Difluoromethane (HFC-32) in
1-butyl-3-methylimidazolium Tetrafluoroborate
[bmim][BF₄]

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 9a, 9b, 9c and 9d provide data for $C_o$, $C_s$, D, $X_{calc}$, and $X_{meas}$ at temperatures of 10, 25, 50 and 75° C., respectively.

TABLE 9a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.9 | 0.1002 | 8.35 | 9.20 | 1.76E-11 | 0.008 | 0.009 |
| 9.9 | 0.9985 | 10.08 | 13.74 | 1.72E-11 | 0.100 | 0.108 |
| 10.0 | 2.4995 | 15.10 | 18.94 | 3.29E-11 | 0.239 | 0.254 |
| 10.0 | 3.9954 | 21.28 | 25.08 | 4.53E-11 | 0.376 | 0.396 |
| 9.8 | 5.4992 | 28.16 | 33.17 | 8.48E-11 | 0.499 | 0.519 |
| 9.9 | 6.9988 | 37.79 | 46.86 | 1.08E-10 | 0.625 | 0.636 |
| 9.9 | 8.4966 | 52.61 | 52.61 | 1.01E-10 | 0.766 | 0.765 |

TABLE 9b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0969 | 0.01 | 0.15 | 3.37E-11 | 0.007 | 0.006 |
| 25.0 | 0.9968 | 0.59 | 1.81 | 3.36E-11 | 0.074 | 0.070 |
| 25.0 | 2.4955 | 2.75 | 4.79 | 3.70E-11 | 0.180 | 0.174 |
| 25.0 | 3.9989 | 5.87 | 7.95 | 4.62E-11 | 0.273 | 0.270 |
| 25.0 | 5.4977 | 9.23 | 11.36 | 5.98E-11 | 0.358 | 0.356 |
| 25.0 | 6.9955 | 12.90 | 15.12 | 7.44E-11 | 0.436 | 0.434 |
| 25.0 | 8.4945 | 17.08 | 19.33 | 9.10E-11 | 0.510 | 0.510 |
| 25.0 | 9.9985 | 21.83 | 24.46 | 9.94E-11 | 0.585 | 0.583 |

TABLE 9c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.0977 | 0.01 | 0.07 | 8.71E-11 | 0.003 | 0.003 |
| 49.9 | 0.9961 | 0.37 | 0.95 | 7.56E-11 | 0.040 | 0.039 |
| 50.0 | 2.4967 | 1.67 | 2.47 | 7.40E-11 | 0.099 | 0.099 |
| 50.0 | 3.9964 | 3.16 | 4.01 | 8.23E-11 | 0.154 | 0.153 |
| 49.9 | 5.4956 | 4.75 | 5.59 | 8.95E-11 | 0.205 | 0.204 |
| 49.9 | 6.9953 | 6.38 | 7.22 | 9.88E-11 | 0.253 | 0.253 |
| 49.8 | 8.4986 | 8.05 | 8.91 | 1.06E-10 | 0.298 | 0.298 |
| 50.0 | 9.9963 | 9.75 | 10.64 | 1.11E-10 | 0.341 | 0.341 |

TABLE 9d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0971 | 0.0 | 0.03 | 1.26E-10 | 0.001 | 0.001 |
| 74.9 | 0.9956 | 0.26 | 0.54 | 1.28E-10 | 0.023 | 0.023 |
| 74.9 | 2.4948 | 1.03 | 1.40 | 1.25E-10 | 0.058 | 0.058 |
| 75.0 | 3.9950 | 1.92 | 2.27 | 1.22E-10 | 0.092 | 0.091 |
| 74.9 | 5.4951 | 2.75 | 3.14 | 1.45E-10 | 0.124 | 0.123 |
| 75.0 | 6.9955 | 3.64 | 4.03 | 1.59E-10 | 0.154 | 0.154 |
| 74.9 | 8.4964 | 4.54 | 4.94 | 1.42E-10 | 0.184 | 0.183 |
| 74.9 | 9.9994 | 5.44 | 5.82 | 1.89E-10 | 0.212 | 0.212 |

EXAMPLE 9

Solubility of Difluoromethane (HFC-32) in
1,2-dimethyl-3-propylimidazolium
Tris(trifluoromethylsulfonyl)methide
[dmpim][TMeM]

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 10a, 10b, 10c and 10d provide data for $C_o$, $C_s$, D, $X_{calc.}$, and $X_{meas}$ at temperatures of 10, 25, 50 and 75° C., respectively.

TABLE 10a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.1010 | 0.03 | 0.11 | 1.71E−11 | 0.012 | 0.012 |
| 10.0 | 0.9964 | 0.43 | 1.44 | 1.39E−11 | 0.134 | 0.136 |
| 10.0 | 2.4970 | 2.39 | 4.13 | 2.52E−11 | 0.313 | 0.311 |
| 10.0 | 3.9969 | 5.57 | 7.39 | 5.04E−11 | 0.458 | 0.457 |
| 10.0 | 5.4947 | 9.70 | 11.67 | 8.93E−11 | 0.583 | 0.583 |
| 10.0 | 6.9966 | 15.43 | 17.70 | 1.37E−10 | 0.695 | 0.696 |
| 10.0 | 8.4959 | 24.33 | 28.09 | 1.56E−10 | 0.805 | 0.802 |

TABLE 10b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0998 | 0.01 | 0.09 | 2.71E−11 | 0.010 | 0.010 |
| 24.9 | 0.9997 | 0.42 | 1.01 | 2.52E−11 | 0.098 | 0.096 |
| 24.9 | 2.4956 | — | — | — | — | 0.225 |
| 24.9 | 3.9958 | 3.61 | 4.55 | 5.46E−11 | 0.336 | 0.335 |
| 24.9 | 5.4927 | 5.76 | 6.69 | 7.98E−11 | 0.432 | 0.431 |
| 24.9 | 6.9955 | 8.15 | 9.13 | 1.10E−10 | 0.516 | 0.515 |
| 24.9 | 8.4948 | 11.02 | 12.07 | 1.34E−10 | 0.593 | 0.593 |
| 24.9 | 10.0000 | 14.52 | 15.59 | 1.83E−10 | 0.662 | 0.662 |

TABLE 10c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.0991 | 0.21 | 0.04 | 6.45E−11 | 0.004 | 0.004 |
| 50.0 | 0.9995 | 0.29 | 0.57 | 6.75E−11 | 0.058 | 0.057 |
| 50.0 | 2.4945 | 1.11 | 1.52 | 7.87E−11 | 0.141 | 0.141 |
| 50.0 | 3.9947 | 2.10 | 2.50 | 9.56E−11 | 0.213 | 0.213 |
| 50.0 | 5.4954 | 3.15 | 3.51 | 1.15E−10 | 0.278 | 0.278 |
| 50.0 | 6.9968 | 4.24 | 4.59 | 1.33E−10 | 0.338 | 0.338 |
| 50.0 | 8.4944 | 5.37 | 5.73 | 1.51E−10 | 0.392 | 0.392 |
| 50.0 | 9.9952 | 6.61 | 6.96 | 1.68E−10 | 0.442 | 0.442 |

TABLE 10d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0940 | 0.0 | 0.0 | 5.75E−11 | 0.000 | 0.000 |
| 74.9 | 1.0018 | 0.06 | 0.31 | 6.06E−11 | 0.032 | 0.031 |
| 75.0 | 2.5040 | 0.71 | 0.89 | 1.23E−10 | 0.087 | 0.087 |
| 74.9 | 3.9958 | 1.32 | 1.49 | 1.26E−10 | 0.138 | 0.138 |
| 74.9 | 5.4938 | 1.92 | 2.09 | 1.59E−10 | 0.184 | 0.184 |
| 74.9 | 7.0051 | 2.58 | 2.72 | 1.35E−10 | 0.229 | 0.229 |
| 74.9 | 8.4954 | 3.24 | 3.37 | 1.19E−10 | 0.270 | 0.268 |
| 74.9 | 10.0046 | 3.89 | 4.05 | 2.10E−10 | 0.309 | 0.308 |

EXAMPLE 10

Solubility of Difluoromethane (HFC-32) in 1-octyl-3-methylimidazolium Iodide [omim][I]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Table 11 provides data for $C_o$, $C_s$, D, $X_{calc.}$, and $X_{meas}$ at a temperature of 25° C.

TABLE 11

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1007 | 0.01 | 0.06 | 1.75E−11 | 0.004 | 0.004 |
| 25.2 | 1.0021 | 0.23 | 0.80 | 1.77E−11 | 0.048 | 0.048 |
| 25.0 | 2.4971 | 1.20 | 2.13 | 1.86E−11 | 0.119 | 0.118 |
| 25.0 | 3.9999 | 2.58 | 3.55 | 2.27E−11 | 0.186 | 0.185 |
| 25.0 | 5.5008 | 4.07 | 5.04 | 3.13E−11 | 0.247 | 0.246 |
| 25.0 | 6.9964 | 5.64 | 6.64 | 3.81E−11 | 0.306 | 0.306 |
| 25.0 | 8.5027 | 7.52 | 8.33 | 2.86E−11 | 0.360 | 0.362 |
| 25.0 | 10.0022 | 9.27 | 10.35 | 6.37E−11 | 0.417 | 0.416 |

EXAMPLE 11

Solubility of Difluoromethane (HFC-32) in 1,3-dioctylimidazolium Iodide [doim][I]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Table 12 provides data for $C_o$, $C_s$, D, $X_{calc.}$, and $X_{meas}$ at a temperature of 25° C.

TABLE 12

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1002 | 0.03 | 0.11 | 1.78E−11 | 0.009 | 0.007 |
| 25.0 | 1.0010 | 0.29 | 0.87 | 2.11E−11 | 0.066 | 0.064 |
| 25.0 | 2.5003 | 1.29 | 2.17 | 2.35E−11 | 0.152 | 0.150 |
| 25.0 | 4.0024 | 2.62 | 3.51 | 2.91E−11 | 0.227 | 0.225 |
| 25.0 | 5.5024 | 4.03 | 4.93 | 3.54E−11 | 0.295 | 0.293 |
| 25.0 | 7.0010 | 5.51 | 6.43 | 4.25E−11 | 0.357 | 0.355 |
| 24.9 | 8.4988 | 7.12 | 8.07 | 5.00E−11 | 0.415 | 0.413 |
| 25.0 | 10.0024 | 8.83 | 9.85 | 5.77E−11 | 0.469 | 0.468 |

EXAMPLE 12

Solubility of Difluoromethane (HFC-32) in 1-ethyl-3-methylimidazolium Bis(pentafluoroethylsulfonyl)imide [emim][BEI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 13a, 13b, 13c and 13d provide data for $C_o$, $C_s$, D, $X_{calc}$, and $X_{meas}$ at a temperature of 10° C., 25° C., 50° C., and 75° C., respectively.

TABLE 13a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.101 | 0.06 | 0.15 | 3.79E−11 | 0.014 | 0.014 |
| 10.0 | 1.000 | 1.06 | 1.78 | 4.78E−11 | 0.146 | 0.144 |
| 10.0 | 2.495 | 3.58 | 4.83 | 7.37E−11 | 0.324 | 0.323 |
| 10.0 | 3.995 | 7.14 | 8.52 | 1.17E−10 | 0.468 | 0.467 |
| 10.0 | 5.496 | 11.75 | 13.23 | 1.51E−10 | 0.590 | 0.590 |
| 10.0 | 6.994 | 17.76 | 19.75 | 1.72E−10 | 0.699 | 0.699 |
| 10.0 | 8.505 | 26.95 | 30.37 | 1.67E−10 | 0.805 | 0.799 |

TABLE 13b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.096 | 0.03 | 0.11 | 7.5E−11 | 0.010 | 0.010 |
| 25.0 | 0.997 | 0.71 | 1.22 | 7.9E−11 | 0.104 | 0.104 |
| 25.0 | 2.496 | 2.49 | 3.19 | 1.1E−10 | 0.237 | 0.237 |
| 25.0 | 3.996 | 4.61 | 5.33 | 1.3E−10 | 0.347 | 0.347 |
| 25.0 | 5.493 | 7.03 | 7.75 | 1.6E−10 | 0.443 | 0.442 |
| 25.0 | 6.993 | 9.70 | 10.49 | 1.8E−10 | 0.525 | 0.525 |
| 25.0 | 8.503 | 12.87 | 13.71 | 2.1E−10 | 0.600 | 0.598 |
| 25.0 | 10.005 | 16.49 | 17.56 | 1.7E−10 | 0.668 | 0.666 |

TABLE 13c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.100 | 0.00 | 0.04 | 1.66E−10 | 0.004 | 0.004 |
| 50.0 | 0.997 | 0.49 | 0.65 | 1.34E−10 | 0.058 | 0.059 |
| 50.0 | 2.497 | 1.46 | 1.73 | 1.79E−10 | 0.142 | 0.145 |
| 50.0 | 3.996 | 2.61 | 2.83 | 1.92E−10 | 0.216 | 0.219 |
| 50.0 | 5.495 | 3.82 | 3.98 | 2.19E−10 | 0.281 | 0.285 |
| 50.0 | 6.995 | 4.92 | 5.19 | 2.28E−10 | 0.341 | 0.345 |
| 50.0 | 8.504 | 6.20 | 6.46 | 2.73E−10 | 0.395 | 0.399 |
| 50.0 | 9.993 | 7.54 | 7.81 | 1.62E−10 | 0.444 | 0.449 |

TABLE 13d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.101 | 0.00 | 0.01 | 3.92E−10 | 0.001 | 0.001 |
| 74.9 | 1.000 | 0.32 | 0.41 | 2.60E−10 | 0.038 | 0.038 |
| 74.9 | 2.501 | 0.99 | 1.10 | 3.32E−10 | 0.095 | 0.095 |
| 74.9 | 3.992 | 1.72 | 1.79 | 3.96E−10 | 0.147 | 0.146 |
| 74.9 | 5.496 | 2.39 | 2.49 | 3.53E−10 | 0.194 | 0.194 |
| 74.9 | 6.996 | 3.08 | 3.22 | 3.41E−10 | 0.239 | 0.239 |
| 74.9 | 8.504 | 3.87 | 3.96 | 3.48E−10 | 0.280 | 0.280 |
| 74.9 | 9.994 | 4.55 | 4.70 | 1.92E−10 | 0.318 | 0.317 |

EXAMPLE 13

Solubility of Difluoromethane (HFC-32) in 1,2-dimethyl-3-propylimidazolium Bis(trifluoromethylsulfonyl)imide [dmpim][BMeI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Table 14 provides data for $C_o$, $C_s$, D, $X_{calc}$, and $X_{meas}$ at a temperature of 25° C.

TABLE 14

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0989 | 0.02 | 0.11 | 6.31E−11 | 0.008 | 0.008 |
| 25.0 | 0.9951 | 0.65 | 1.22 | 6.60E−11 | 0.091 | 0.090 |
| 25.0 | 2.4949 | 2.44 | 3.25 | 8.94E−11 | 0.213 | 0.212 |
| 25.0 | 3.9762 | 4.62 | 5.46 | 1.21E−10 | 0.317 | 0.317 |
| 25.0 | 5.5013 | 7.08 | 8.00 | 1.46E−10 | 0.412 | 0.412 |
| 25.0 | 7.0174 | 10.02 | 10.92 | 1.75E−10 | 0.497 | 0.496 |
| 25.0 | 8.5131 | 13.56 | 14.29 | 2.23E−10 | 0.573 | 0.573 |
| 25.0 | 10.0108 | 17.55 | 18.41 | 2.33E−10 | 0.645 | 0.645 |

EXAMPLE 14

Solubility of Difluoromethane (HFC-32) in 3-methyl-1-propylpyridinium Bis(trifluoromethylsulfonyl)imide [pmpy][BMeI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 15a, 15b, 15c, and 15d provide data for $C_o$, $C_s$, D, $X_{calc}$, and $X_{meas}$ at a temperature of 10° C., 25° C., 50° C., and 75° C., respectively.

TABLE 15a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.1021 | 0.08 | 0.02 | 5.76E−11 | 0.002 | 0.015 |
| 10.0 | 1.0001 | 1.03 | 2.01 | 5.72E−11 | 0.141 | 0.140 |
| 10.0 | 2.4942 | 3.95 | 5.31 | 1.05E−10 | 0.310 | 0.311 |
| 10.0 | 3.9963 | 7.78 | 9.35 | 1.28E−10 | 0.452 | 0.452 |
| 10.0 | 5.4935 | 12.68 | 14.05 | 2.89E−10 | 0.567 | 0.570 |
| 10.0 | 6.9960 | 18.73 | 20.79 | 2.01E−10 | 0.678 | 0.679 |
| 10.0 | 8.4951 | 27.80 | 30.88 | 2.71E−10 | 0.781 | 0.778 |

TABLE 15b

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0951 | 0.02 | 0.12 | 9.96E-11 | 0.010 | 0.010 |
| 24.9 | 1.0020 | 0.74 | 1.32 | 1.00E-10 | 0.097 | 0.096 |
| 24.9 | 2.5034 | 2.67 | 3.44 | 1.20E-10 | 0.222 | 0.221 |
| 24.9 | 3.9959 | 4.93 | 5.73 | 1.52E-10 | 0.327 | 0.328 |
| 24.9 | 5.4973 | 7.52 | 8.30 | 1.92E-10 | 0.420 | 0.419 |
| 24.9 | 6.9923 | 10.35 | 11.16 | 2.20E-10 | 0.501 | 0.502 |
| 24.9 | 8.4965 | 13.61 | 14.48 | 2.41E-10 | 0.575 | 0.575 |
| 24.9 | 10.0044 | 17.35 | 18.06 | 6.21E-10 | 0.638 | 0.639 |

TABLE 15c

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.1025 | 0.04 | 0.08 | 2.10E-10 | 0.007 | 0.007 |
| 50.0 | 1.0031 | 0.59 | 0.76 | 1.86E-10 | 0.058 | 0.058 |
| 50.0 | 2.4979 | 1.64 | 1.93 | 2.01E-10 | 0.136 | 0.137 |
| 50.0 | 4.0004 | 2.82 | 3.11 | 2.80E-10 | 0.205 | 0.206 |
| 50.0 | 5.4945 | 4.05 | 4.36 | 2.37E-10 | 0.268 | 0.270 |
| 50.0 | 6.9935 | 5.39 | 5.64 | 3.50E-10 | 0.323 | 0.326 |
| 50.0 | 8.5031 | 6.71 | 6.97 | 3.95E-10 | 0.375 | 0.378 |
| 50.0 | 9.9939 | 8.06 | 8.44 | 2.30E-10 | 0.425 | 0.427 |

TABLE 15d

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.1026 | 0.03 | 0.04 | 3.94E-10 | 0.003 | 0.003 |
| 74.9 | 1.0023 | 0.04 | 0.46 | 3.89E-10 | 0.036 | 0.037 |
| 74.9 | 2.5020 | 1.06 | 1.19 | 3.96E-10 | 0.088 | 0.089 |
| 74.9 | 4.0021 | 1.77 | 1.91 | 4.00E-10 | 0.135 | 0.138 |
| 74.9 | 5.4931 | 2.53 | 2.65 | 3.62E-10 | 0.179 | 0.183 |
| 74.9 | 7.0026 | 3.27 | 3.39 | 4.62E-10 | 0.219 | 0.223 |
| 74.9 | 8.4935 | 4.04 | 4.15 | 4.76E-10 | 0.257 | 0.262 |
| 74.9 | 10.0019 | 4.76 | 4.91 | 5.48E-10 | 0.293 | 0.300 |

EXAMPLE 15

Solubility of Trifluoromethane (HFC-23) in 1-butyl-3-methylimidazolium Hexafluorophosphate [bmim][PF$_6$]

A solubility and diffusivity study was made at a temperature of 10, 25, 50, and 75° C. over a pressure range from 0 to 20 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 16a, 16b, 16c, and 16d provide data for $C_o$, $C_s$, D, $X_{calc}$, and $X_{meas}$ at a temperature of 10° C., 25° C., 50° C., and 75° C., respectively.

TABLE 16a

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.4 | 0.0962 | — | — | — | — | 0.000 |
| 9.4 | 0.5000 | 0.00 | 0.25 | 1.54E-11 | 0.010 | 0.010 |
| 9.6 | 1.0979 | — | — | — | — | 0.028 |

TABLE 16a-continued

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.5 | 4.0003 | 1.56 | 3.05 | 1.54E-11 | 0.113 | 0.113 |
| 9.4 | 7.0000 | 4.14 | 5.76 | 2.17E-11 | 0.199 | 0.198 |
| 9.5 | 9.9934 | 7.15 | 8.81 | 2.89E-11 | 0.282 | 0.281 |
| 9.5 | 12.9972 | 10.59 | 12.22 | 4.26E-11 | 0.361 | 0.361 |
| 9.5 | 14.9964 | 13.48 | 14.81 | 5.68E-11 | 0.414 | 0.414 |
| 10.0 | 20.0017 | — | — | — | — | 0.528 |

TABLE 16b

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0991 | — | — | — | — | 0.000 |
| 24.9 | 0.4972 | 0.03 | 0.19 | 2.56E-11 | 0.008 | 0.008 |
| 24.9 | 0.9994 | 0.24 | 0.44 | 3.22E-11 | 0.018 | 0.018 |
| 24.9 | 3.9934 | 1.17 | 2.08 | 2.37E-11 | 0.080 | 0.079 |
| 24.9 | 6.9953 | 2.86 | 3.79 | 3.01E-11 | 0.138 | 0.137 |
| 24.9 | 10.0041 | 4.68 | 5.59 | 3.95E-11 | 0.194 | 0.193 |
| 24.9 | 13.0056 | 6.66 | 7.52 | 3.89E-11 | 0.248 | 0.247 |
| 25.0 | 15.0000 | 8.09 | 8.80 | 5.73E-11 | 0.281 | 0.281 |
| 24.9 | 19.9990 | 11.36 | 12.49 | 7.12E-11 | 0.367 | 0.367 |

TABLE 16c

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.0981 | 0.00 | 0.01 | 6.34E-11 | 0.000 | 0.000 |
| 50.0 | 0.4984 | 0.03 | 0.11 | 6.26E-11 | 0.005 | 0.005 |
| 50.0 | 0.9961 | 0.17 | 0.27 | 7.35E-11 | 0.011 | 0.011 |
| 50.0 | 3.9965 | 0.89 | 1.27 | 5.88E-11 | 0.049 | 0.049 |
| 50.0 | 7.0036 | 1.90 | 2.25 | 6.74E-11 | 0.085 | 0.085 |
| 50.0 | 10.0041 | 2.92 | 3.27 | 8.02E-11 | 0.121 | 0.120 |
| 50.0 | 12.9931 | 3.95 | 4.29 | 7.47E-11 | 0.154 | 0.154 |
| 50.0 | 15.0015 | 4.69 | 5.01 | 1.16E-10 | 0.176 | 0.176 |
| 50.0 | 19.9932 | 6.41 | 6.78 | 1.08E-10 | 0.228 | 0.227 |

TABLE 16d

| T (°C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0965 | — | — | — | — | 0.001 |
| 74.9 | 0.4973 | 0.03 | 0.08 | 8.13E-11 | 0.003 | 0.003 |
| 74.9 | 0.9975 | 0.12 | 0.21 | 1.22E-10 | 0.008 | 0.008 |
| 74.9 | 3.9971 | 0.63 | 0.84 | 1.04E-10 | 0.033 | 0.033 |
| 74.9 | 7.0016 | 1.45 | 1.42 | 2.86E-12 | 0.055 | 0.057 |
| 75.0 | 9.9993 | 1.92 | 2.08 | 1.08E-10 | 0.079 | 0.080 |
| 74.9 | 13.0031 | 2.55 | 2.72 | 2.23E-10 | 0.102 | 0.103 |
| 74.9 | 14.9943 | 2.98 | 3.17 | 1.09E-10 | 0.117 | 0.118 |
| 74.9 | 19.9998 | 4.00 | 4.22 | 2.31E-10 | 0.152 | 0.146 |

EXAMPLE 16

Solubility of Trifluoromethane (HFC-23) in 1-ethyl-3-methylimidazolium Hexafluorophosphate [emim][PF$_6$]

A solubility and diffusivity study was made at a temperature of 60, and 75° C. over a pressure range from 0 to 20 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 17a, and 17b provide data for $C_o$, $C_s$, D, $X_{calc}$, and $X_{meas}$ at a temperature of 60° C., and 75° C., respectively.

TABLE 17a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 59.9 | 0.0992 | — | — | — | — | 0.000 |
| 59.9 | 0.4997 | 0.03 | 0.09 | 1.23E−10 | 0.003 | 0.003 |
| 59.9 | 0.9973 | 0.13 | 0.20 | 1.28E−10 | 0.007 | 0.007 |
| 59.9 | 4.0026 | 0.76 | 0.86 | 1.21E−10 | 0.031 | 0.030 |
| 59.9 | 6.9974 | 1.30 | 1.50 | 1.58E−10 | 0.053 | 0.053 |
| 59.9 | 10.0001 | 2.02 | 2.18 | 1.12E−10 | 0.075 | 0.076 |
| 60.0 | 12.9920 | 2.71 | 2.86 | 2.55E−10 | 0.097 | 0.098 |
| 59.9 | 15.0002 | 3.20 | 3.35 | 1.68E−10 | 0.113 | 0.113 |
| 59.9 | 19.9990 | 4.39 | 4.54 | 3.12E−10 | 0.148 | 0.151 |

TABLE 17b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0965 | 0.02 | 0.02 | 1.12E−10 | 0.001 | 0.001 |
| 74.9 | 0.4982 | — | — | — | — | 0.002 |
| 74.9 | 0.9998 | 0.12 | 0.16 | 1.94E−10 | 0.006 | 0.006 |
| 74.9 | 4.0035 | 0.56 | 0.65 | 2.18E−10 | 0.023 | 0.024 |
| 74.9 | 6.9933 | 1.06 | 1.14 | 1.17E−10 | 0.040 | 0.040 |
| 74.9 | 10.0041 | 1.56 | 1.65 | 2.73E−10 | 0.058 | 0.057 |
| 75.0 | 12.9969 | 2.00 | 2.16 | 1.02E−10 | 0.075 | 0.074 |
| 74.9 | 15.0041 | 2.47 | 2.49 | 7.22E−10 | 0.085 | 0.083 |
| 75.0 | 19.9939 | — | — | — | — | 0.116 |

EXAMPLE 17

Solubility of Difluoromethane (HFC-32) in 1-ethyl-3-methylimidazolium Bis(trifluoroethylsulfonyl)imide [emim][BMeI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 18a, 18b, 18c, and 18d provide data for $C_o$, $C_s$, D, $X_{calc}$, and $X_{meas}$ at a temperature of 10° C., 25° C., 50° C., and 75° C., respectively.

TABLE 18a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.1015 | 0.11 | 0.19 | 6.94E−11 | 0.014 | 0.014 |
| 10.0 | 1.0012 | 1.12 | 2.06 | 8.72E−11 | 0.137 | 0.136 |
| 10.0 | 2.5030 | 4.25 | 5.55 | 1.18E−10 | 0.306 | 0.305 |
| 10.0 | 3.9929 | 8.20 | 9.58 | 1.50E−10 | 0.444 | 0.446 |
| 10.0 | 5.4925 | 13.38 | 14.83 | 1.78E−10 | 0.567 | 0.567 |
| 10.0 | 7.0043 | 19.75 | 21.63 | 2.36E−10 | 0.675 | 0.668 |
| 10.0 | 8.4935 | 27.92 | 31.92 | 1.24E−10 | 0.779 | 0.785 |

TABLE 18b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0959 | 0.09 | 0.13 | 8.36E−11 | 0.010 | 0.010 |
| 25.0 | 0.9981 | 0.86 | 1.38 | 1.22E−10 | 0.095 | 0.095 |
| 25.0 | 2.5024 | 2.88 | 3.56 | 1.61E−10 | 0.217 | 0.217 |
| 25.0 | 3.9937 | 5.27 | 5.97 | 1.56E−10 | 0.323 | 0.323 |
| 25.0 | 5.4940 | 7.90 | 8.60 | 2.00E−10 | 0.414 | 0.414 |
| 25.0 | 6.9946 | 10.77 | 11.53 | 2.33E−10 | 0.495 | 0.495 |
| 25.0 | 8.4952 | 14.06 | 14.80 | 3.24E−10 | 0.566 | 0.565 |
| 25.0 | 9.9967 | 17.74 | 18.58 | 3.20E−10 | 0.632 | 0.637 |

TABLE 18c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.1022 | 0.04 | 0.07 | 3.03E−10 | 0.005 | 0.005 |
| 50.0 | 1.0029 | 0.55 | 0.77 | 2.18E−10 | 0.055 | 0.055 |
| 50.0 | 2.4972 | 1.71 | 1.98 | 2.19E−10 | 0.132 | 0.132 |
| 50.0 | 4.0011 | 2.95 | 3.21 | 2.86E−10 | 0.199 | 0.199 |
| 50.0 | 5.4949 | 4.22 | 4.50 | 2.47E−10 | 0.261 | 0.262 |
| 50.0 | 7.0033 | 5.52 | 5.80 | 3.97E−10 | 0.316 | 0.316 |
| 50.0 | 8.5044 | 6.93 | 7.20 | 2.90E−10 | 0.368 | 0.364 |
| 50.0 | 10.0038 | 8.22 | 8.51 | 3.43E−10 | 0.411 | 0.412 |

TABLE 18d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.1028 | 0.01 | 0.03 | 6.36E−10 | 0.002 | 0.002 |
| 74.9 | 0.9981 | 0.36 | 0.46 | 3.41E−10 | 0.034 | 0.034 |
| 74.9 | 2.4971 | 1.09 | 1.21 | 4.21E−10 | 0.084 | 0.084 |
| 74.9 | 3.9948 | 1.82 | 1.96 | 5.11E−10 | 0.130 | 0.130 |
| 74.9 | 5.5026 | 2.60 | 2.71 | 5.24E−10 | 0.173 | 0.173 |
| 74.9 | 6.9919 | 3.37 | 3.49 | 3.22E−10 | 0.213 | 0.213 |
| 74.9 | 8.5039 | 4.16 | 4.28 | 4.63E−10 | 0.252 | 0.251 |
| 74.9 | 10.0045 | 5.10 | 5.10 | 4.75E−09 | 0.288 | 0.284 |

EXAMPLE 18

Solubility of Difluoromethane (HFC-32) in 1-butyl-3-methylpyridinium Bis(trifluoromethylsulfonyl)imide [bmpy][BMeI]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 19.

TABLE 19

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0961 | 0.04 | 0.12 | 6.81E−11 | 0.010 | 0.010 |
| 25.0 | 0.9950 | 0.66 | 1.32 | 7.82E−11 | 0.097 | 0.100 |
| 25.0 | 2.4949 | 2.58 | 3.38 | 1.21E−10 | 0.219 | 0.223 |
| 25.0 | 3.9948 | 4.76 | 5.59 | 1.49E−10 | 0.321 | 0.329 |
| 25.0 | 5.4962 | 7.25 | 8.10 | 1.53E−10 | 0.414 | 0.424 |
| 25.0 | 7.0055 | — | — | — | — | 0.505 |

TABLE 19-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 8.5057 | 13.03 | 14.47 | 1.15E−11 | 0.575 | 0.580 |
| 25.0 | 10.0002 | 17.06 | 18.28 | 2.31E−10 | 0.642 | 0.648 |

EXAMPLE 19

Solubility of Difluoromethane (HFC-32) in 1-ethyl-3-methylimidazolium 1,1,2,2-tetrafluoroethanesulfonate [emim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 20.

TABLE 20

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0987 | 0.01 | 0.10 | 4.12E−11 | 0.006 | 0.006 |
| 24.9 | 0.9910 | 0.40 | 1.03 | 3.25E−11 | 0.055 | 0.054 |
| 24.9 | 2.4841 | 2.48 | 2.65 | 2.94E−11 | 0.133 | 0.132 |
| 24.9 | 3.9945 | 3.66 | 4.45 | 4.93E−11 | 0.207 | 0.207 |
| 24.9 | 5.4957 | 5.78 | 6.37 | 5.92E−11 | 0.276 | 0.277 |
| 24.9 | 7.0221 | — | — | — | — | 0.344 |
| 24.9 | 8.4832 | 9.79 | 10.90 | 1.04E−10 | 0.407 | 0.407 |
| 24.9 | 10.0160 | 12.55 | 13.66 | 1.21E−10 | 0.470 | 0.471 |

EXAMPLE 20

Solubility of Difluoromethane (HFC-32) in 1-butyl-3-methylimidazolium 1,1,2,2-tetrafluoroethanesulfonate [bmim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 21.

TABLE 21

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0967 | 0.02 | 0.12 | 2.37E−11 | 0.007 | 0.007 |
| 25.0 | 0.9986 | 0.99 | 1.29 | 1.47E−11 | 0.075 | 0.072 |
| 25.0 | 2.4997 | 2.19 | 3.31 | 2.67E−11 | 0.174 | 0.171 |
| 25.0 | 3.9716 | 4.33 | 5.40 | 3.95E−11 | 0.260 | 0.261 |
| 25.0 | 5.4838 | 6.84 | 7.78 | 4.76E−11 | 0.342 | 0.342 |
| 25.0 | 6.9946 | 8.98 | 10.39 | 7.75E−11 | 0.416 | 0.416 |
| 25.0 | 8.4811 | 11.98 | 13.27 | 8.73E−11 | 0.485 | 0.485 |
| 25.0 | 9.9886 | 15.07 | 16.62 | 1.35E−10 | 0.551 | 0.550 |

EXAMPLE 21

Solubility of Difluoromethane (HFC-32) in 1-dodecyl-3-methylimidazolium 1,1,2,2-tetrafluoroethanesulfonate [dmim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 22.

TABLE 22

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0963 | 0.00 | 0.06 | 5.01E−11 | 0.005 | 0.006 |
| 25.0 | 0.9950 | 0.35 | 0.95 | 4.72E−11 | 0.072 | 0.074 |
| 25.0 | 2.5100 | 1.63 | 2.56 | 5.06E−11 | 0.175 | 0.178 |
| 25.0 | 3.9971 | 4.15 | 4.30 | 3.01E−11 | 0.266 | 0.271 |
| 25.0 | 5.4807 | 6.06 | 6.16 | 4.74E−11 | 0.346 | 0.353 |
| 25.0 | 7.0007 | 7.98 | 8.29 | 6.81E−11 | 0.421 | 0.429 |
| 25.0 | 8.5003 | 10.50 | 10.66 | 8.17E−11 | 0.490 | 0.497 |
| 25.0 | 10.0101 | 12.09 | 13.39 | 1.25E−10 | 0.555 | 0.562 |

EXAMPLE 22

Solubility of Difluoromethane (HFC-32) in 1-heptyl-3-methylimidazolium 1,1,2,2-tetrafluoroethanesulfonate [hmim][TFES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 23.

TABLE 23

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0988 | 0.01 | 0.11 | 3.86E−11 | 0.008 | 0.008 |
| 25.0 | 1.0023 | 0.47 | 1.25 | 3.87E−11 | 0.081 | 0.081 |
| 25.0 | 2.5100 | 2.18 | 3.30 | 4.35E−11 | 0.192 | 0.190 |
| 25.0 | 3.9884 | 4.39 | 5.44 | 5.84E−11 | 0.286 | 0.286 |
| 25.0 | 5.4973 | 7.25 | 7.82 | 6.41E−11 | 0.371 | 0.371 |
| 25.0 | 6.9871 | 9.99 | 10.43 | 9.01E−11 | 0.448 | 0.448 |
| 25.0 | 8.4785 | 12.28 | 13.40 | 1.30E−10 | 0.518 | 0.518 |
| 25.0 | 9.9795 | 15.45 | 16.83 | 1.56E−10 | 0.585 | 0.586 |

EXAMPLE 23

Solubility of Difluoromethane (HFC-32) in 1-butyl-3-methylimidazolium Acetate [bmim][Ac]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc}$) are also provided in Table 24.

TABLE 24

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.1 | 0.0985 | 0.09 | 0.25 | 2.19E−11 | 0.010 | 0.010 |
| 25.0 | 0.9968 | 0.72 | 2.17 | 2.64E−11 | 0.078 | 0.077 |
| 25.0 | 2.4979 | 3.25 | 5.30 | 4.05E−11 | 0.176 | 0.174 |
| 25.0 | 4.0040 | 6.59 | 8.59 | 5.64E−11 | 0.264 | 0.258 |
| 25.0 | 5.4984 | 9.83 | 11.70 | 1.02E−10 | 0.335 | 0.333 |
| 25.0 | 6.9974 | 13.24 | 15.00 | 1.46E−10 | 0.402 | 0.397 |
| 24.9 | 8.5016 | 16.74 | 18.36 | 1.83E−10 | 0.462 | 0.456 |
| 25.0 | 10.0044 | 20.30 | 21.89 | 2.10E−10 | 0.516 | 0.511 |

EXAMPLE 24

Solubility of Difluoromethane (HFC-32) in 1-butyl-3-methylimidazolium 2-(1,2,2,2-tetrafluoroethoxy)-1,1,2,2-tetrafluoroethanesulfonate [bmim][FS]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 25.

TABLE 25

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0999 | 0.02 | 0.11 | 4.30E−11 | 0.009 | 0.009 |
| 25.0 | 0.9966 | 0.82 | 1.20 | 4.29E−11 | 0.092 | 0.092 |
| 25.0 | 2.5009 | 2.29 | 3.17 | 5.44E−11 | 0.215 | 0.213 |
| 25.0 | 4.0040 | 4.16 | 5.26 | 9.11E−11 | 0.318 | 0.317 |
| 25.0 | 5.4999 | 6.53 | 7.68 | 1.04E−10 | 0.411 | 0.411 |
| 25.0 | 6.9963 | 9.19 | 10.36 | 1.49E−10 | 0.492 | 0.493 |
| 25.0 | 8.4944 | 12.24 | 13.24 | 1.26E−09 | 0.561 | 0.565 |
| 25.0 | 10.0048 | 15.74 | 17.00 | 2.78E−10 | 0.632 | 0.632 |

EXAMPLE 25

Solubility of Difluoromethane (HFC-32) in 1-butyl-3-methylimidazolium 1,1,2,3,3,3-hexafluoropropanesulfonate [bmim][HFPS]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 26.

TABLE 26

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0945 | 0.02 | 0.11 | 3.33E−11 | 0.010 | 0.010 |
| 25.0 | 0.9999 | 0.56 | 1.25 | 3.17E−11 | 0.106 | 0.104 |

TABLE 26-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 2.4976 | 2.29 | 3.29 | 3.90E−11 | 0.242 | 0.241 |
| 25.0 | 3.9945 | 4.34 | 5.40 | 6.98E−11 | 0.349 | 0.347 |
| 25.0 | 5.4949 | 6.56 | 7.79 | 6.98E−11 | 0.443 | 0.443 |
| 25.0 | 6.9975 | 9.29 | 10.45 | 1.11E−10 | 0.523 | 0.523 |
| 25.0 | 8.4943 | 12.16 | 13.60 | 1.04E−10 | 0.597 | 0.599 |
| 25.0 | 10.0042 | 15.98 | 17.43 | 1.67E−10 | 0.665 | 0.664 |

EXAMPLE 26

Solubility of Difluoromethane (HFC-32) in 1-butyl-3-methylimidazolium Methyl Sulfonate [bmim][MeSO₄]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 27.

TABLE 27

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0993 | 0.12 | 0.24 | 2.08E−11 | 0.012 | 0.012 |
| 25.0 | 1.0010 | 0.53 | 1.48 | 2.67E−11 | 0.068 | 0.068 |
| 25.0 | 2.4982 | 2.15 | 3.65 | 3.04E−11 | 0.154 | 0.155 |
| 25.0 | 3.9954 | 4.41 | 5.87 | 4.15E−11 | 0.231 | 0.232 |
| 25.1 | 5.5009 | 6.87 | 8.16 | 5.23E−11 | 0.299 | 0.302 |
| 25.0 | 6.9953 | 9.24 | 10.77 | 6.24E−11 | 0.367 | 0.369 |
| 25.0 | 8.5005 | 11.97 | 13.33 | 9.89E−11 | 0.425 | 0.427 |
| 25.0 | 10.0059 | 14.75 | 16.32 | 1.20E−10 | 0.484 | 0.482 |

EXAMPLE 27

Solubility of Difluoromethane (HFC-32) in 1-butyl-3-methylimidazolium Thiocyanate [bmim][SCN]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 28.

TABLE 28

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0947 | 0.02 | 0.10 | 8.08E−11 | 0.004 | 0.004 |
| 25.0 | 1.0031 | 0.45 | 1.11 | 8.57E−11 | 0.041 | 0.041 |
| 25.0 | 2.5033 | 1.90 | 2.84 | 1.03E−10 | 0.100 | 0.099 |
| 25.0 | 3.9958 | 3.66 | 4.68 | 1.11E−10 | 0.157 | 0.156 |
| 25.0 | 5.4999 | — | — | — | — | 0.212 |
| 25.0 | 6.9966 | 7.62 | 8.73 | 1.42E−10 | 0.266 | 0.267 |

TABLE 28-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 8.4947 | 9.93 | 11.01 | 1.83E−10 | 0.319 | 0.320 |
| 25.0 | 9.9919 | 12.30 | 13.55 | 2.05E−10 | 0.373 | 0.373 |

EXAMPLE 28

Solubility of Difluoromethane (HFC-32) in 1-butyl-3-methylimidazolium 1,1,2-trifluoro-2-(perfluoroethoxy)ethanesulfonate [bmim][TPES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 29.

TABLE 29

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0951 | 0.02 | 0.12 | 4.46E−11 | 0.010 | 0.010 |
| 25.0 | 1.0007 | 0.58 | 1.35 | 5.27E−11 | 0.103 | 0.102 |
| 25.0 | 2.4964 | 2.43 | 3.56 | 6.70E−11 | 0.236 | 0.236 |
| 25.0 | 3.9947 | 4.81 | 5.94 | 9.64E−11 | 0.346 | 0.346 |
| 25.0 | 5.4938 | 7.52 | 8.62 | 1.20E−10 | 0.442 | 0.442 |
| 25.0 | 6.9941 | 10.49 | 11.65 | 1.49E−10 | 0.525 | 0.525 |
| 25.0 | 8.4946 | 13.93 | 15.15 | 1.78E−10 | 0.600 | 0.599 |
| 25.0 | 9.9937 | 18.00 | 19.36 | 2.06E−10 | 0.668 | 0.668 |

EXAMPLE 29

Solubility of Difluoromethane (HFC-32) in 1-butyl-3-methylimidazolium 1,1,2-trifluoro-2-(trifluoromethoxy)ethanesulfonate [bmim][TTES]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in Table 30.

TABLE 30

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0947 | 0.02 | 0.13 | 4.26E−11 | 0.010 | 0.010 |
| 25.0 | 1.0031 | 0.57 | 1.42 | 4.51E−11 | 0.097 | 0.096 |
| 25.0 | 2.5033 | 2.40 | 3.71 | 5.83E−11 | 0.222 | 0.222 |
| 25.0 | 3.9958 | 4.92 | 6.28 | 7.11E−11 | 0.332 | 0.332 |
| 25.0 | 5.4999 | 7.79 | 9.04 | 9.96E−11 | 0.425 | 0.424 |
| 25.0 | 6.9966 | 10.71 | 12.12 | 1.23E−10 | 0.506 | 0.506 |
| 25.0 | 8.4947 | 14.21 | 15.63 | 1.59E−10 | 0.579 | 0.578 |
| 25.0 | 9.9919 | 18.20 | 19.62 | 2.51E−10 | 0.644 | 0.644 |

EXAMPLE 30

Solubility of 1,1,1,2-tetrafluoroethane (HFC-134a) in 1-butyl-3-methylimidazolium 1,1,2-trifluoro-2-(trifluoromethoxy)ethanesulfonate [bmim][TTES]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 18a, 18b, 18c, and 18d provide data for $C_o$, $C_s$, D, $X_{calc}$, and $X_{meas}$ at a temperature of 10° C., 25° C., 50° C., and 75° C., respectively.

TABLE 31a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 10.0 | 0.1025 | 0.08 | 0.66 | 1.04E−11 | 0.025 | 0.026 |
| 10.0 | 0.5002 | 0.97 | 3.29 | 1.25E−11 | 0.114 | 0.117 |
| 10.0 | 1.0027 | 4.03 | 7.05 | 1.62E−11 | 0.223 | 0.225 |
| 10.0 | 1.5018 | 7.93 | 11.31 | 2.16E−11 | 0.326 | 0.326 |
| 9.9 | 2.0022 | 12.23 | 16.25 | 3.26E−11 | 0.424 | 0.424 |
| 10.0 | 2.5048 | 17.58 | 22.11 | 5.31E−11 | 0.518 | 0.514 |
| 10.0 | 2.9946 | 23.87 | 30.15 | 5.28E−11 | 0.620 | 0.628 |
| 10.0 | 3.5047 | 36.32 | 44.43 | 7.71E−11 | 0.752 | 0.745 |

TABLE 31b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 24.9 | 0.1018 | 1.51 | 0.35 | 1.19E−11 | 0.013 | 0.017 |
| 24.9 | 0.5032 | 0.77 | 2.07 | 2.17E−11 | 0.074 | 0.075 |
| 25.1 | 1.0024 | 2.52 | 4.22 | 2.60E−11 | 0.143 | 0.143 |
| 24.8 | 1.5015 | 4.77 | 6.52 | 3.00E−11 | 0.209 | 0.208 |
| 25.0 | 2.0032 | 7.17 | 9.00 | 3.27E−11 | 0.272 | 0.271 |
| 25.0 | 2.5035 | 9.59 | 11.56 | 4.43E−11 | 0.331 | 0.331 |
| 24.9 | 3.0013 | 12.31 | 14.44 | 5.05E−11 | 0.390 | 0.389 |
| 24.8 | 3.5010 | 15.87 | 17.69 | 4.50E−11 | 0.449 | 0.450 |

TABLE 31c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1048 | 0.17 | 0.25 | 5.76E−11 | 0.009 | 0.009 |
| 50.0 | 0.5031 | 0.47 | 1.06 | 5.35E−11 | 0.039 | 0.039 |
| 50.0 | 1.0023 | 1.37 | 2.11 | 5.79E−11 | 0.076 | 0.076 |
| 50.0 | 1.5021 | 2.43 | 3.19 | 6.35E−11 | 0.111 | 0.111 |
| 50.0 | 2.0026 | 3.50 | 4.28 | 6.64E−11 | 0.145 | 0.145 |
| 50.0 | 2.5033 | 4.67 | 5.41 | 6.97E−11 | 0.178 | 0.179 |
| 50.0 | 3.0035 | 5.81 | 6.58 | 7.24E−11 | 0.211 | 0.211 |
| 50.0 | 3.5016 | 7.22 | 7.78 | 6.89E−11 | 0.242 | 0.243 |

TABLE 31d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 75.0 | 0.1031 | 0.06 | 0.13 | 1.04E−10 | 0.005 | 0.005 |
| 74.9 | 0.5054 | 0.31 | 0.62 | 1.18E−10 | 0.023 | 0.023 |
| 74.9 | 1.0049 | 0.85 | 1.23 | 1.22E−10 | 0.045 | 0.045 |

TABLE 31d-continued

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 74.9 | 1.5029 | 1.49 | 1.85 | 1.21E−10 | 0.067 | 0.067 |
| 74.9 | 2.0041 | 2.10 | 2.46 | 1.25E−10 | 0.087 | 0.087 |
| 74.9 | 2.5042 | 2.71 | 3.08 | 1.26E−10 | 0.107 | 0.108 |
| 74.9 | 3.0024 | 3.33 | 3.72 | 1.38E−10 | 0.128 | 0.128 |
| 74.9 | 3.5039 | 4.19 | 4.36 | 1.09E−10 | 0.147 | 0.147 |

EXAMPLE 31

Solubility of 1,1,1,2-tetrafluoroethane (HFC-134a) in 1-butyl-3-methylimidazolium 1,1,2-trifluoro-2-(perfluoroethoxy)ethanesulfonate [bmim][TPES]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 32a, 32b, 32c, and 32d provide data for $C_o$, $C_s$, D, $X_{calc}$, and $X_{meas}$ at a temperature of 10° C., 25° C., 50° C., and 75° C., respectively.

TABLE 32a

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 10.0 | 0.1024 | 0.06 | 0.66 | 9.33E−12 | 0.028 | 0.028 |
| 10.0 | 0.5038 | 1.01 | 3.39 | 1.15E−11 | 0.131 | 0.132 |
| 10.0 | 1.0043 | 4.05 | 7.26 | 1.71E−11 | 0.251 | 0.253 |
| 9.9 | 1.5033 | 8.17 | 11.65 | 2.53E−11 | 0.361 | 0.362 |
| 10.0 | 2.0022 | 12.78 | 16.90 | 3.67E−11 | 0.465 | 0.464 |
| 10.0 | 2.5024 | 18.33 | 23.30 | 5.37E−11 | 0.565 | 0.566 |
| 10.0 | 3.0041 | 25.90 | 32.36 | 7.06E−11 | 0.672 | 0.670 |
| 9.9 | 3.5039 | 38.42 | 47.48 | 6.49E−11 | 0.794 | 0.796 |

TABLE 32b

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 24.9 | 0.1026 | 0.11 | 0.45 | 1.80E−11 | 0.019 | 0.018 |
| 24.9 | 0.5031 | 0.72 | 2.09 | 2.32E−11 | 0.084 | 0.084 |
| 24.9 | 1.0018 | 2.62 | 4.33 | 2.59E−11 | 0.162 | 0.162 |
| 24.9 | 1.5015 | 4.92 | 6.70 | 3.23E−11 | 0.235 | 0.235 |
| 24.9 | 2.0029 | 7.33 | 9.23 | 4.14E−11 | 0.303 | 0.303 |
| 24.9 | 2.5038 | 9.92 | 11.93 | 4.99E−11 | 0.367 | 0.366 |
| 24.9 | 3.0034 | 12.73 | 14.93 | 5.74E−11 | 0.429 | 0.428 |
| 24.9 | 3.5012 | 16.44 | 18.40 | 4.94E−11 | 0.491 | 0.490 |

TABLE 32c

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 50.0 | 0.1036 | 0.20 | 0.26 | 8.37E−11 | 0.011 | 0.011 |
| 50.0 | 0.5032 | 0.47 | 1.10 | 5.99E−11 | 0.045 | 0.045 |
| 50.0 | 1.0023 | 1.52 | 2.20 | 5.66E−11 | 0.088 | 0.087 |
| 50.0 | 1.5021 | 2.55 | 3.32 | 6.59E−11 | 0.128 | 0.128 |
| 50.0 | 2.0025 | 3.69 | 4.47 | 6.87E−11 | 0.167 | 0.167 |
| 50.0 | 2.5035 | 4.90 | 5.66 | 7.37E−11 | 0.204 | 0.204 |

TABLE 32c-continued

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 50.0 | 3.0042 | 6.08 | 6.87 | 8.56E−11 | 0.240 | 0.240 |
| 50.0 | 3.5035 | 7.49 | 8.10 | 8.02E−11 | 0.274 | 0.274 |

TABLE 32d

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 74.9 | 0.1051 | 0.11 | 0.15 | 1.09E−10 | 0.006 | 0.006 |
| 74.9 | 0.5052 | 0.34 | 0.65 | 1.19E−10 | 0.027 | 0.027 |
| 74.9 | 1.0054 | 0.92 | 1.29 | 1.22E−10 | 0.053 | 0.053 |
| 75.0 | 1.5046 | 1.90 | 1.93 | 1.93E−09 | 0.078 | 0.078 |
| 74.7 | 2.0056 | 2.25 | 2.59 | 1.05E−10 | 0.102 | 0.102 |
| 74.9 | 2.5053 | 2.88 | 3.22 | 1.50E−10 | 0.124 | 0.125 |
| 74.9 | 3.0041 | 3.56 | 3.90 | 1.30E−10 | 0.148 | 0.148 |
| 74.9 | 3.5051 | 4.34 | 4.56 | 1.42E−10 | 0.170 | 0.170 |

EXAMPLE 32

Solubility of 1,1,1,2-tetrafluoroethane (HFC-134a) in 1-ethyl-3-methylimidazolium bis(pentafluoroethylsulfonyl)imide [emim][BEI]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 33a, 33b, 33c, and 33d provide data for $C_o$, $C_s$, D, $X_{calc}$, and $X_{meas}$ at a temperature of 10° C., 25° C., 50° C., and 75° C., respectively.

TABLE 33a

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 10.0 | 0.1031 | 0.09 | 0.61 | 1.92E−11 | 0.029 | 0.024 |
| 10.0 | 0.5039 | 1.21 | 2.51 | 4.25E−07 | 0.110 | 0.120 |
| 10.0 | 1.0027 | 4.05 | 6.65 | 2.95E−11 | 0.255 | 0.239 |
| 10.0 | 1.5024 | 7.74 | 10.72 | 3.68E−11 | 0.366 | 0.354 |
| 10.0 | 2.0011 | 12.01 | 15.61 | 4.88E−11 | 0.471 | 0.464 |
| 10.0 | 2.5009 | 17.79 | 21.74 | 6.58E−11 | 0.572 | 0.569 |
| 10.0 | 3.0043 | 24.67 | 30.25 | 8.67E−11 | 0.676 | 0.668 |
| 10.0 | 3.5049 | 37.47 | 44.30 | 6.14E−11 | 0.793 | 0.793 |

TABLE 33b

| T (° C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 24.9 | 0.1054 | 0.21 | 0.42 | 2.60E−11 | 0.020 | 0.019 |
| 24.9 | 0.5052 | 0.82 | 1.92 | 3.76E−11 | 0.086 | 0.086 |
| 24.9 | 1.0046 | 2.55 | 3.90 | 4.22E−11 | 0.163 | 0.163 |
| 24.9 | 1.5040 | 4.69 | 6.02 | 4.77E−11 | 0.236 | 0.235 |
| 24.9 | 2.0037 | 6.73 | 8.29 | 5.70E−11 | 0.303 | 0.304 |
| 24.9 | 2.5031 | 9.15 | 10.79 | 6.65E−11 | 0.368 | 0.368 |
| 24.9 | 3.0043 | 11.73 | 13.53 | 7.90E−11 | 0.430 | 0.429 |
| 24.9 | 3.5054 | 15.15 | 16.56 | 7.29E−11 | 0.489 | 0.488 |

TABLE 33c

| T (° C.) | P (bar) | $C_o$ (mass %) | $C_s$ (mass %) | $D_{\it eff.}$ (m²/sec) | $X_{calc.}$ (mol. fraction) | $X_{meas.}$ (mol. fraction) |
|---|---|---|---|---|---|---|
| 50.0 | 0.1046 | 0.14 | 0.23 | 5.84E-11 | 0.011 | 0.011 |
| 50.0 | 0.5050 | 0.58 | 1.00 | 6.72E-11 | 0.046 | 0.046 |
| 50.0 | 1.0043 | 1.42 | 1.99 | 8.15E-11 | 0.089 | 0.089 |
| 50.0 | 1.5046 | 2.48 | 3.00 | 7.67E-11 | 0.130 | 0.130 |
| 50.0 | 2.0037 | 3.46 | 4.04 | 8.44E-11 | 0.168 | 0.168 |
| 50.0 | 2.5033 | 4.51 | 5.10 | 8.82E-11 | 0.205 | 0.205 |
| 50.0 | 3.0034 | 5.57 | 6.19 | 9.36E-11 | 0.241 | 0.241 |
| 50.0 | 3.5040 | 6.98 | 7.32 | 8.24E-11 | 0.275 | 0.276 |

TABLE 33d

| T (° C.) | P (bar) | $C_o$ (mass %) | $C_s$ (mass %) | $D_{\it eff.}$ (m²/sec) | $X_{calc.}$ (mol. fraction) | $X_{meas.}$ (mol. fraction) |
|---|---|---|---|---|---|---|
| 74.9 | 0.1044 | 0.10 | 0.13 | 1.30E-10 | 0.006 | 0.006 |
| 74.9 | 0.5057 | 0.37 | 0.58 | 1.36E-10 | 0.027 | 0.027 |
| 74.9 | 1.0042 | 0.87 | 1.16 | 1.35E-10 | 0.053 | 0.053 |
| 74.9 | 1.5043 | 1.48 | 1.73 | 1.32E-10 | 0.078 | 0.078 |
| 74.9 | 2.0041 | 2.01 | 2.30 | 1.49E-10 | 0.102 | 0.102 |
| 74.9 | 2.4957 | 2.60 | 2.88 | 1.42E-10 | 0.125 | 0.125 |
| 74.9 | 3.0049 | 3.22 | 3.47 | 1.69E-10 | 0.148 | 0.147 |
| 74.9 | 3.5027 | 3.89 | 4.06 | 1.17E-10 | 0.169 | 0.169 |

EXAMPLE 33

Solubility of 1,1,1,2-tetrafluoroethane (HFC-134a) in 1-butyl-3-methylimidazolium 1,1,2,3,3-hexafluoropropanesulfonate [bmim][HFPS]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 34a, 34b, 34c, and 34d provide data for $C_o$, $C_s$, D, $X_{calc}$, and $X_{meas}$ at a temperature of 10° C., 25° C., 50° C., and 75° C., respectively.

TABLE 34a

| T (° C.) | P (bar) | $C_o$ (mass %) | $C_s$ (mass %) | $D_{\it eff.}$ (m²/sec) | $X_{calc.}$ (mol. fraction) | $X_{meas.}$ (mol. fraction) |
|---|---|---|---|---|---|---|
| 10.0 | 0.0993 | 0.00 | 0.41 | 1.09E-11 | 0.015 | 0.015 |
| 9.9 | 0.5012 | 0.62 | 2.43 | 8.91E-12 | 0.083 | 0.082 |
| 10.0 | 1.0001 | 2.78 | 5.36 | 1.13E-11 | 0.170 | 0.172 |
| 10.0 | 1.4989 | 5.94 | 8.89 | 1.38E-11 | 0.261 | 0.264 |
| 9.9 | 1.9997 | 9.63 | 12.82 | 2.42E-11 | 0.348 | 0.350 |
| 10.0 | 2.4950 | 13.70 | 18.23 | 2.42E-11 | 0.447 | 0.447 |
| 10.0 | 3.0010 | 19.60 | 24.78 | 4.81E-11 | 0.545 | 0.550 |
| 10.1 | 3.4937 | 27.72 | 36.37 | 7.13E-11 | 0.675 | 0.677 |

TABLE 34b

| T (° C.) | P (bar) | $C_o$ (mass %) | $C_s$ (mass %) | $D_{\it eff.}$ (m²/sec) | $X_{calc.}$ (mol. fraction) | $X_{meas.}$ (mol. fraction) |
|---|---|---|---|---|---|---|
| 24.9 | 0.1007 | -0.02 | 0.26 | 1.61E-11 | 0.009 | 0.011 |
| 24.9 | 0.5000 | 0.50 | 1.75 | 2.46E-11 | 0.061 | 0.055 |
| 24.9 | 1.0002 | 1.80 | 3.22 | 1.51E-10 | 0.108 | 0.109 |
| 24.9 | 1.4995 | 3.60 | 5.07 | 1.50E-11 | 0.162 | 0.163 |
| 24.9 | 1.9931 | 5.36 | 7.12 | 1.78E-11 | 0.218 | 0.220 |
| 25.0 | 2.5041 | 7.52 | 9.10 | 2.66E-11 | 0.267 | 0.269 |
| 24.9 | 3.0042 | 9.65 | 11.44 | 2.46E-11 | 0.319 | 0.322 |
| 24.9 | 3.5020 | 12.23 | 13.92 | 3.10E-11 | 0.370 | 0.374 |

TABLE 34c

| T (° C.) | P (bar) | $C_o$ (mass %) | $C_s$ (mass %) | $D_{\it eff.}$ (m²/sec) | $X_{calc.}$ (mol. fraction) | $X_{meas.}$ (mol. fraction) |
|---|---|---|---|---|---|---|
| 50.0 | 0.1007 | 0.01 | 0.16 | 3.94E-11 | 0.006 | 0.006 |
| 50.0 | 0.5006 | 0.28 | 0.81 | 3.51E-11 | 0.029 | 0.029 |
| 50.0 | 0.9997 | 1.11 | 1.69 | 2.84E-11 | 0.059 | 0.059 |
| 50.0 | 1.4987 | 1.93 | 2.58 | 3.30E-11 | 0.088 | 0.088 |
| 50.0 | 1.9941 | 2.87 | 3.53 | 2.73E-11 | 0.117 | 0.118 |
| 50.0 | 2.5040 | 3.73 | 4.42 | 4.20E-11 | 0.144 | 0.145 |
| 50.0 | 2.9997 | 4.65 | 5.37 | 4.79E-11 | 0.171 | 0.172 |
| 50.0 | 3.5040 | 5.64 | 6.32 | 4.79E-11 | 0.197 | 0.198 |

TABLE 34d

| T (° C.) | P (bar) | $C_o$ (mass %) | $C_s$ (mass %) | $D_{\it eff.}$ (m²/sec) | $X_{calc.}$ (mol. fraction) | $X_{meas.}$ (mol. fraction) |
|---|---|---|---|---|---|---|
| 74.9 | 0.0989 | 0.04 | 0.10 | 5.08E-11 | 0.003 | 0.004 |
| 74.9 | 0.5015 | 0.21 | 0.46 | 2.62E-10 | 0.016 | 0.018 |
| 74.9 | 1.0009 | 0.69 | 1.01 | 6.65E-11 | 0.036 | 0.036 |
| 74.9 | 1.5002 | 1.17 | 1.51 | 7.55E-11 | 0.053 | 0.053 |
| 74.9 | 2.0006 | 1.67 | 2.03 | 6.73E-11 | 0.070 | 0.070 |
| 74.9 | 2.4996 | 2.18 | 2.53 | 8.11E-11 | 0.086 | 0.087 |
| 74.9 | 3.0020 | 2.70 | 3.06 | 8.14E-11 | 0.103 | 0.104 |

EXAMPLE 34

Solubility of 1,1,1,2-tetrafluoroethane (HFC-134a) in tetradecyl(trihexyl) phosphonium 1,1,2-trifluoro-2-(perfluoroethoxy)ethanesulfonate [6,6,6,14-P] [TPES]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 35a, 35b, 35c, and 35d provide data for $C_o$, $C_s$, D, $X_{calc}$, and $X_{meas}$ at a temperature of 10° C., 25° C., 50° C., and 75° C., respectively.

TABLE 35a

| T (° C.) | P (bar) | $C_o$ (mass %) | $C_s$ (mass %) | $D_{\it eff.}$ (m²/sec) | $X_{calc.}$ (mol. fraction) | $X_{meas.}$ (mol. Fraction) |
|---|---|---|---|---|---|---|
| 10.0 | 0.0993 | 0.10 | 0.52 | 1.65E-11 | 0.038 | 0.038 |
| 9.7 | 0.5001 | 0.87 | 2.99 | 2.04E-11 | 0.190 | 0.190 |
| 9.9 | 1.0005 | 3.55 | 6.26 | 2.72E-11 | 0.338 | 0.338 |
| 9.8 | 1.4988 | 7.01 | 9.95 | 3.28E-11 | 0.458 | 0.452 |
| 10.1 | 1.9940 | 10.46 | 13.72 | 5.63E-11 | 0.549 | 0.551 |
| 9.8 | 2.4956 | 14.69 | 18.30 | 1.01E-10 | 0.631 | 0.634 |

TABLE 35a-continued

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. Fraction) |
|---|---|---|---|---|---|---|
| 9.7 | 2.9998 | 19.78 | 24.52 | 1.23E-10 | 0.713 | 0.718 |
| 9.6 | 3.4947 | 26.93 | 34.29 | 2.24E-10 | 0.800 | 0.799 |

TABLE 35b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. Fraction) |
|---|---|---|---|---|---|---|
| 24.9 | 0.1000 | -0.01 | 0.26 | 2.82E-11 | 0.019 | 0.018 |
| 24.9 | 0.5002 | 0.50 | 1.75 | 4.18E-11 | 0.120 | 0.121 |
| 25.0 | 0.9998 | 2.14 | 3.73 | 4.58E-11 | 0.229 | 0.228 |
| 24.9 | 1.4991 | 4.13 | 5.79 | 5.46E-11 | 0.320 | 0.320 |
| 24.9 | 2.0001 | 6.22 | 7.90 | 6.55E-11 | 0.396 | 0.397 |
| 24.9 | 2.5034 | 8.35 | 10.05 | 8.92E-11 | 0.461 | 0.462 |
| 24.9 | 3.0041 | 10.54 | 12.31 | 9.57E-11 | 0.518 | 0.520 |
| 24.9 | 3.5040 | 12.92 | 14.84 | 1.11E-10 | 0.571 | 0.574 |

TABLE 35c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1013 | 0.21 | 0.09 | 1.08E-11 | 0.007 | 0.011 |
| 50.0 | 0.5011 | 0.34 | 0.94 | 9.52E-11 | 0.068 | 0.068 |
| 50.0 | 1.0012 | 1.24 | 1.97 | 9.91E-11 | 0.133 | 0.134 |
| 50.0 | 1.4996 | 2.29 | 3.01 | 1.07E-10 | 0.192 | 0.193 |
| 50.0 | 2.0006 | 3.37 | 4.07 | 9.79E-11 | 0.245 | 0.246 |
| 50.0 | 2.5005 | 4.37 | 5.10 | 1.22E-10 | 0.291 | 0.294 |
| 50.0 | 2.9997 | 5.44 | 6.19 | 1.19E-10 | 0.335 | 0.339 |
| 50.1 | 3.4970 | 6.68 | 7.33 | 1.14E-10 | 0.377 | 0.381 |

TABLE 35d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 74.9 | 0.1011 | 0.00 | 0.03 | 1.84E-10 | 0.002 | 0.003 |
| 74.9 | 0.5019 | 0.22 | 0.52 | 1.81E-10 | 0.039 | 0.039 |
| 74.9 | 1.0009 | 0.77 | 1.16 | 1.97E-10 | 0.082 | 0.083 |
| 74.9 | 1.4959 | 1.41 | 1.77 | 2.08E-10 | 0.121 | 0.122 |
| 74.9 | 2.0012 | 2.03 | 2.40 | 2.27E-10 | 0.158 | 0.160 |
| 74.9 | 2.5033 | 2.65 | 3.03 | 2.28E-10 | 0.193 | 0.194 |
| 74.9 | 3.0034 | 3.30 | 3.65 | 2.05E-10 | 0.225 | 0.227 |
| 74.9 | 3.5051 | 3.96 | 4.27 | 2.13E-10 | 0.254 | 0.256 |

EXAMPLE 35

Solubility of 1,1,1,2-tetrafluoroethane (HFC-134a) in Tributyl(tetradecyl)phosphonium 1,1,2,3,3,3-hexafluoropropanesulfonate [4,4,4,14-P][HFPS]

A solubility and diffusivity study was made at a temperature of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 36a, 36b, 36c, and 36d provide data for $C_o$, $C_s$, D, $X_{calc}$, and $X_{meas}$ at a temperature of 10° C., 25° C., 50° C., and 75° C., respectively.

TABLE 36a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. Fraction) |
|---|---|---|---|---|---|---|
| 10.2 | 0.0991 | 0.08 | 0.49 | 2.23E-11 | 0.029 | 0.032 |
| 9.9 | 0.5001 | 0.72 | 2.95 | 1.30E-11 | 0.158 | 0.152 |
| 10.2 | 0.9998 | 3.17 | 6.30 | 1.74E-11 | 0.293 | 0.289 |
| 10.0 | 1.4999 | 6.59 | 9.78 | 2.67E-11 | 0.401 | 0.403 |
| 10.0 | 1.9996 | 10.48 | 13.80 | 4.77E-11 | 0.497 | 0.494 |
| 10.0 | 2.5034 | 14.41 | 18.75 | 5.41E-11 | 0.587 | 0.587 |
| 10.0 | 3.0020 | 19.66 | 24.79 | 1.49E-10 | 0.670 | 0.672 |
| 10.1 | 3.4928 | 27.70 | 34.01 | 2.02E-10 | 0.761 | 0.763 |

TABLE 36b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. Fraction) |
|---|---|---|---|---|---|---|
| 25.0 | 0.0998 | 0.05 | 0.34 | 1.70E-11 | 0.021 | 0.019 |
| 24.9 | 0.5001 | 0.50 | 1.83 | 2.56E-11 | 0.103 | 0.104 |
| 24.9 | 0.9994 | 2.11 | 3.76 | 3.19E-11 | 0.194 | 0.194 |
| 25.0 | 1.4988 | 4.06 | 5.79 | 3.71E-11 | 0.275 | 0.273 |
| 24.9 | 2.0017 | 6.03 | 8.06 | 3.60E-11 | 0.351 | 0.350 |
| 25.0 | 2.5003 | 8.43 | 10.48 | 4.88E-11 | 0.419 | 0.418 |
| 25.0 | 2.9990 | 10.82 | 12.84 | 7.38E-11 | 0.476 | 0.478 |
| 25.0 | 3.5021 | 13.55 | 15.47 | 1.01E-10 | 0.530 | 0.530 |

TABLE 36c

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 50.0 | 0.1009 | 0.00 | 0.17 | 6.85E-11 | 0.010 | 0.010 |
| 50.0 | 0.5001 | 0.32 | 0.96 | 6.65E-11 | 0.056 | 0.056 |
| 50.0 | 0.9994 | 1.20 | 1.99 | 6.73E-11 | 0.111 | 0.110 |
| 50.0 | 1.4992 | 2.24 | 3.04 | 6.51E-11 | 0.162 | 0.161 |
| 50.0 | 2.0003 | 3.31 | 4.09 | 7.46E-11 | 0.208 | 0.209 |
| 50.0 | 2.4945 | 4.29 | 5.16 | 8.18E-11 | 0.251 | 0.254 |
| 50.0 | 2.9994 | 5.46 | 6.22 | 1.11E-10 | 0.290 | 0.293 |
| 50.0 | 3.4964 | 7.54 | 8.32 | 7.36E-11 | 0.359 | 0.333 |

TABLE 36d

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 75.0 | 0.1006 | 0.08 | 0.14 | 1.36E-10 | 0.009 | 0.009 |
| 74.9 | 0.5041 | 0.30 | 0.63 | 1.39E-10 | 0.037 | 0.037 |
| 74.9 | 1.0014 | 0.83 | 1.25 | 1.37E-10 | 0.072 | 0.072 |
| 74.9 | 1.5002 | 1.47 | 1.87 | 1.43E-10 | 0.105 | 0.105 |
| 74.9 | 2.0014 | 2.07 | 2.47 | 1.63E-10 | 0.135 | 0.136 |
| 74.9 | 2.5044 | 2.66 | 3.08 | 1.70E-10 | 0.164 | 0.165 |
| 74.9 | 3.0037 | 2.75 | 3.15 | 1.51E-10 | 0.167 | 0.194 |
| 74.9 | 3.5039 | 3.44 | 3.79 | 1.70E-10 | 0.196 | 0.221 |

EXAMPLE 36

The description of the microbalance components, shown in FIG. 18, are provided below.

TABLE 37

Microbalance Components Contributing to Buoyancy Calculation

| Subscript | Item | Weight (g) | Material | Density (g · cm$^{-3}$) | Temperature (° C.) |
|---|---|---|---|---|---|
| s | Dry sample | $m_s$ | [bmim][PF$_6$] [bmim][BF$_4$] | $\rho_s$ | Sample Temp. ($T_s$) |
| a | Interacted gas | $m_a$ | CO$_2$ | $\rho_a$ | ($T_s$) |
| i$_1$ | Sample container | 0.5986 | Pyrex | 2.23 | ($T_s$) |
| i$_2$ | Wire | 0.051 | Tungsten | 21.0 | ($T_s$) |
| i$_3$ | Chain | 0.3205 | Gold | 19.3 | 30 |
| j$_1$ | Counter-weight | 0.8054 | Stainless Steel | 7.9 | 25 |
| j$_2$ | Hook | 0.00582 | Tungsten | 21.0 | 25 |
| j$_3$ | Chain | 0.2407 | Gold | 19.3 | 30 |

EXAMPLE 37

Solubility of Carbon Dioxide (CO$_2$) in 1-butyl-3-methylimidazolium Hexafluorophosphate [bmim][PF$_6$]

A solubility and diffusivity study was made at a temperature of 10, 25, 50, and 75° C. over a pressure range from 0 to 20 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 38a, 38b, 38c, and 38d provide data for $C_o$, $C_s$, D, $X_{calc}$, and $X_{meas}$ at a temperature of 10° C., 25° C., 50° C., and 75° C., respectively.

TABLE 38a

| T (° C.) | P (bar) | C$_o$ (mass %) | C$_s$ (mass %) | D$_{eff.}$ (m$^2$/sec) | X$_{calc.}$ (mol. fraction) | X$_{meas.}$ (mol. Fraction) |
|---|---|---|---|---|---|---|
| 9.9 | 0.097 | 0.00 | 0.07 | 1.5E−11 | 0.006 | 0.004 |
| 9.9 | 0.501 | 0.10 | 0.24 | 2.0E−11 | 0.017 | 0.016 |
| 9.9 | 1.002 | 0.29 | 0.46 | 2.2E−11 | 0.030 | 0.029 |
| 10.4 | 3.996 | 0.85 | 1.72 | 2.6E−11 | 0.101 | 0.102 |
| 10.6 | 6.996 | 2.15 | 2.97 | 3.0E−11 | 0.165 | 0.165 |
| 10.5 | 10.000 | 3.43 | 4.22 | 3.6E−11 | 0.221 | 0.220 |
| 8.9 | 13.003 | 4.95 | 5.69 | — | 0.280 | 0.278 |
| 9.9 | 14.998 | 5.84 | 6.35 | 7.4E−11 | 0.306 | 0.302 |
| 9.9 | 19.998 | 7.51 | 8.35 | 5.2E−11 | 0.375 | 0.367 |

TABLE 38b

| T (° C.) | P (bar) | C$_o$ (mass %) | C$_s$ (mass %) | D$_{eff.}$ (m$^2$/sec) | X$_{calc.}$ (mol. fraction) | X$_{meas.}$ (mol. Fraction) |
|---|---|---|---|---|---|---|
| 24.9 | 0.102 | 0.00 | 0.01 | — | 0.006 | 0.000 |
| 24.9 | 0.502 | 0.03 | 0.14 | 5.1E−11 | 0.011 | 0.009 |
| 24.9 | 1.002 | 0.16 | 0.29 | 4.8E−11 | 0.020 | 0.018 |
| 25.0 | 3.996 | 0.65 | 1.19 | 4.5E−11 | 0.072 | 0.071 |
| 25.0 | 7.000 | 1.55 | 2.07 | 5.4E−11 | 0.122 | 0.120 |
| 24.9 | 9.994 | 2.45 | 2.95 | 5.7E−11 | 0.167 | 0.164 |
| 24.9 | 12.999 | 3.31 | 3.80 | 6.8E−11 | 0.208 | 0.203 |
| 24.9 | 14.994 | 4.05 | 4.41 | 7.7E−11 | 0.238 | 0.227 |
| 24.9 | 19.992 | 5.19 | 5.80 | 8.1E−11 | 0.285 | 0.282 |

TABLE 38c

| T (° C.) | P (bar) | C$_o$ (mass %) | C$_s$ (mass %) | D$_{eff.}$ (m$^2$/sec) | X$_{calc.}$ (mol. fraction) | X$_{meas.}$ (mol. fraction) |
|---|---|---|---|---|---|---|
| 50.1 | 0.102 | 0.01 | 0.03 | 11.3E−11 | 0.002 | 0.002 |
| 50.0 | 0.503 | 0.04 | 0.09 | 10.8E−11 | 0.006 | 0.006 |
| 50.0 | 1.002 | 0.12 | 0.19 | 9.7E−11 | 0.012 | 0.012 |
| 50.1 | 3.996 | 0.50 | 0.76 | 10.1E−11 | 0.047 | 0.047 |
| 50.0 | 7.000 | 1.07 | 1.29 | 10.1E−11 | 0.078 | 0.078 |
| 50.0 | 9.998 | 1.59 | 1.81 | 12.6E−11 | 0.107 | 0.107 |
| 50.0 | 13.002 | 2.13 | 2.34 | 12.7E−11 | 0.134 | 0.133 |
| 50.1 | 15.003 | 2.53 | 2.70 | 13.5E−11 | 0.152 | 0.151 |
| 50.0 | 19.998 | 3.27 | 3.56 | 14.8E−11 | 0.192 | 0.191 |

TABLE 38d

| T (° C.) | P (bar) | C$_o$ (mass %) | C$_s$ (mass %) | D$_{eff.}$ (m$^2$/sec) | X$_{calc.}$ (mol. fraction) | X$_{meas.}$ (mol. fraction) |
|---|---|---|---|---|---|---|
| 75.0 | 0.102 | 0.01 | 0.02 | 9.5E−11 | 0.001 | 0.001 |
| 74.9 | 0.501 | 0.02 | 0.04 | 23.5E−11 | 0.002 | 0.002 |
| 74.9 | 1.000 | 0.07 | 0.11 | 21.3E−11 | 0.007 | 0.007 |
| 74.9 | 3.997 | 0.40 | 0.51 | 27.5E−11 | 0.032 | 0.032 |
| 74.9 | 7.000 | 0.78 | 0.89 | 23.7E−11 | 0.055 | 0.055 |
| 74.8 | 10.002 | 1.18 | 1.28 | 13.2E−11 | 0.077 | 0.077 |
| 75.0 | 13.003 | 1.50 | 1.64 | 69.5E−11 | 0.097 | 0.096 |
| 74.9 | 14.999 | 1.75 | 1.88 | 58.5E−11 | 0.110 | 0.110 |
| 75.1 | 19.995 | 2.36 | 2.45 | 28.4E−11 | 0.140 | 0.144 |

EXAMPLE 38

Solubility of Carbon Dioxide (CO$_2$) in 1-butyl-3-methylimidazolium Tetrafluoroborate [bmim][BF$_4$]

A solubility and diffusivity study was made at a temperature of 10, 25, 50, and 75° C. over a pressure range from 0 to 20 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided.

Tables 39a, 39b, 39c, and 39d provide data for $C_o$, $C_s$, D, $X_{calc}$, and $X_{meas}$ at a temperature of 10° C., 25° C., 50° C., and 75° C., respectively.

TABLE 39a

| T (°C.) | P (bar) | $C_o$ (mass %) | $C_s$ (mass %) | $D_{eff}$ (m²/sec) | Xcalc. (mol. fraction) | Xmeas. (mol. Fraction) |
|---|---|---|---|---|---|---|
| 9.6 | 0.102 | 0.00 | 0.04 | 4.0E−11 | 0.002 | 0.002 |
| 9.8 | 0.502 | 0.07 | 0.24 | 3.4E−11 | 0.013 | 0.013 |
| 9.9 | 1.001 | 0.26 | 0.46 | 4.8E−11 | 0.023 | 0.023 |
| 9.9 | 4.001 | 0.97 | 1.88 | 3.8E−11 | 0.090 | 0.090 |
| 10.1 | 6.996 | 2.40 | 3.25 | 4.5E−11 | 0.147 | 0.147 |
| 9.9 | 9.997 | 3.69 | 4.64 | 5.5E−11 | 0.202 | 0.202 |
| 9.9 | 13.002 | 5.12 | 5.93 | 6.9E−11 | 0.249 | 0.259 |
| 10.0 | 15.001 | 6.28 | 6.79 | 6.7E−11 | 0.278 | 0.288 |
| 9.9 | 20.002 | 7.89 | 8.97 | 8.0E−11 | 0.346 | 0.353 |

TABLE 39b

| T (°C.) | P (bar) | $C_o$ (mass %) | $C_s$ (mass %) | $D_{eff}$ (m²/sec) | $X_{calc.}$ (mol. fraction) | $X_{meas.}$ (mol. Fraction) |
|---|---|---|---|---|---|---|
| 24.8 | 0.097 | — | — | — | — | 0.002 |
| 25.0 | 0.500 | 0.08 | 0.19 | 6.6E−11 | 0.011 | 0.010 |
| 24.9 | 1.001 | 0.23 | 0.36 | 7.3E−11 | 0.020 | 0.018 |
| 25.0 | 3.996 | 0.81 | 1.42 | 6.4E−11 | 0.069 | 0.068 |
| 25.0 | 7.002 | 1.87 | 2.45 | 7.1E−11 | 0.116 | 0.114 |
| 24.8 | 9.997 | 2.88 | 3.46 | 7.7E−11 | 0.158 | 0.156 |
| 25.0 | 13.002 | 3.88 | 4.44 | 9.3E−11 | 0.197 | 0.192 |
| 24.8 | 15.001 | 4.71 | 5.09 | 8.2E−11 | 0.222 | 0.216 |
| 24.9 | 20.002 | 6.03 | 6.66 | 10.0E−11 | 0.277 | 0.268 |

TABLE 39c

| T (°C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 50.1 | 0.102 | 0.02 | 0.06 | 20.7E−11 | 0.003 | 0.003 |
| 50.0 | 0.501 | 0.08 | 0.13 | 24.8E−11 | 0.006 | 0.006 |
| 50.0 | 1.001 | 0.18 | 0.23 | 12.2E−11 | 0.012 | 0.012 |
| 50.0 | 3.997 | 0.62 | 0.88 | 15.5E−11 | 0.043 | 0.043 |
| 50.0 | 6.996 | 1.23 | 1.49 | 17.4E−11 | 0.072 | 0.072 |
| 50.0 | 10.002 | 1.88 | 2.09 | 14.2E−11 | 0.099 | 0.099 |
| 50.0 | 12.997 | 2.48 | 2.69 | 12.9E−11 | 0.124 | 0.124 |
| 50.0 | 15.001 | 2.94 | 3.07 | 17.4E−11 | 0.140 | 0.140 |
| 50.0 | 20.000 | 3.82 | 4.02 | 14.5E−11 | 0.177 | 0.176 |

TABLE 39d

| T (°C.) | P (bar) | $C_o$ (mass %) | $C_s$ (mass %) | $D_{eff}$ (m²/sec) | $X_{calc.}$ (mol. fraction) | $X_{meas.}$ (mol. fraction) |
|---|---|---|---|---|---|---|
| 75.0 | 0.102 | 0.02 | 0.04 | 32.8E−11 | 0.002 | 0.002 |
| 75.0 | 0.501 | 0.04 | 0.07 | 34.2E−11 | 0.003 | 0.003 |
| 74.9 | 1.002 | 0.10 | 0.15 | 32.9E−11 | 0.008 | 0.007 |
| 74.9 | 4.002 | 0.48 | 0.60 | 29.7E−11 | 0.030 | 0.030 |
| 75.0 | 6.996 | 0.91 | 1.01 | 24.0E−11 | 0.050 | 0.050 |
| 74.8 | 10.003 | 1.30 | 1.43 | 32.5E−11 | 0.069 | 0.070 |
| 75.0 | 13.000 | 1.72 | 1.83 | 23.6E−11 | 0.087 | 0.087 |
| 75.0 | 15.002 | 2.01 | 2.11 | 29.2E−11 | 0.100 | 0.101 |
| 74.9 | 19.999 | 2.68 | 2.77 | 46.2E−11 | 0.127 | 0.129 |

Where the indefinite article "a" or "an" is used with respect to a statement or description of the presence of a feature, component or step in a composition, apparatus or process of this invention, it is to be understood, unless the statement or description explicitly provides to the contrary, that the use of such indefinite article does not limit the presence of the feature, component or step in the composition, apparatus or process to one in number.

Where a apparatus or process of this invention is stated or described as comprising, including, containing, having, being composed of or being constituted by certain features, components or steps, it is to be understood, unless the statement or description explicitly provides to the contrary, that one or more features, components or steps in addition to those explicitly stated or described may be present in the apparatus or process. In an alternative embodiment, however, the apparatus or process of this invention may be stated or described as consisting essentially of certain features, components or steps, in which embodiment features, components or steps that would materially alter the principle of operation or the distinguishing characteristics of the composition, apparatus or process are not present therein. In a further alternative embodiment, the apparatus or process of this invention may be stated or described as consisting of certain features, components or steps, in which embodiment features, components or steps other than as named are not present therein.

What is claimed is:

1. An apparatus for temperature adjustment comprising
   (a) a compressor that increases the pressure of the vapor of at least one refrigerant, wherein the compressor comprises moving parts that are lubricated by at least one ionic liquid;
   (b) a condenser that receives refrigerant vapor that is passed out of the compressor, and condenses the vapor under pressure to a liquid;
   (c) a pressure reduction device that receives liquid refrigerant that is passed out of the condenser, and reduces the pressure of the liquid to form a mixture of refrigerant in liquid and vapor form;
   (d) an evaporator that receives the mixture of liquid and vapor refrigerant that is passed out of the pressure reduction device, and evaporates the remaining liquid in the mixture to form refrigerant vapor; and
   (e) a conduit that returns to the compressor refrigerant vapor that is passed out of the evaporator;
   wherein an ionic liquid is selected from one or more members of the group consisting of
   1-butyl-3-methylimidazolium hexafluorophosphate [bmim][PF6],
   1-butyl-3-methylimidazolium tetrafluoroborate [bmim][BF4],
   1,2-dimethyl-3propylimidazolium tris(trifluoromethylsulfonyl)methide [dmpim][TMeM],
   3-methyl-1-propylpyridinium bis(trifluoromethylsulfonyl)imide [pmpy][BMeI],
   1-ethyl-3-methylimidazolium bis(trifluoroethylsulfonyl)imide [emim][BMeI],
   1-ethyl-3-methylimidazolium bis(pentafluoroethylsulfonyl)imide [emim][BEI],
   1-butyl-3-methylimidazolium 1,1,2,3,3,3,-hexafluoropropanesulfonate [bmim][HFPS],
   1-butyl-3-methylimidazolium 1,1,2-trifluoro-2-(perfluoroethoxy) ethanesulfonate [bmim][TPES],
   1-butyl-3-methylimidazolium 1,1,2-trifluoro-2-(trifluoromethoxy) ethanesulfonate [bmim][TTES],
   tetradecyl(trihexyl) phosphonium 1,1,2-trifluoro-2-(perfluoroethoxy) ethanesulfonate [6,6,6,14-P][TPES], and
   tributyl(tetradecyl)phosphonium 1,1,2,3,3,3-hexafluoropropanesulfonate [4,4,4,14-P][HFPS].

2. An apparatus according to claim 1 wherein the condenser is located in proximity to an object, medium or space to be heated.

3. An apparatus according to claim 1 wherein the evaporator is located in proximity to an object, medium or space to be cooled.

4. An apparatus according to claim 1 wherein a refrigerant is selected from the group consisting of $CHClF_2$ (R-22);

CHF$_3$ (R-23); CH$_2$F$_2$ (R-32); CH$_3$F (R-41); CHF$_2$CF$_3$ (R-125); CH$_2$FCF$_3$ (R-134a); CHF$_2$OCHF$_2$ (E-134); CH$_3$CClF$_2$ (R-142b); CH$_3$CF$_3$ (R-143a); CH$_3$CHF$_2$ (R-152a); CH$_3$CH$_2$F (R-161); CH$_3$OCH$_3$ (E170); CF3CF$_2$CF$_3$ (R-218); CF$_3$CHFCF$_3$ (R-227ea); CF$_3$CH$_2$CF$_3$ (R-236fa); CH$_2$FCF$_2$CHF$_2$ (R-245ca); CHF$_2$CH$_2$CF$_3$ (R-245fa); CH$_3$CH$_2$CH$_3$ (R-290); CH$_3$CH$_2$CH$_2$CH3 (R-600); CH(CH$_3$)$_2$CH$_3$ (R-600a); CH$_3$CH$_2$CH$_2$CH$_2$CH$_3$ (R-601); (CH$_3$)2CHCH$_2$CH$_3$ (R-601a); CH$_3$CH$_2$OCH$_2$CH$_3$ (R-610); NH$_3$, CO$_2$; and CH$_3$CH=CH$_2$; and
combinations thereof; or a refrigerant blend selected from the group consisting R-404A; R-407A; R-407B, R-407C; R-407D; R-407E; R-410A; R-410B, R-413A; 417A; R-419A; R-420A; 80.6% R-134a and 19.4% R-142b (by weight); R -421A, R-421B, R-422A; R-422B, R-422C; R-422D; R423A; R-424A; R-425A; R-426A; R-427A; 2.0% R-32, 41.0% R-125, 50.0% R-143a and 7.0% R-134a (by weight); 10.0% R-32, 33.0% R-125, 36.0% R-143a and 21.0% R-134a (by weight); R-428A; and R-507A.

5. An apparatus according to claim 2, wherein a refrigerant is selected from the group consisting of R-22, R-32, R-125, R-134a, R-404A, R-410A, R-413A, R-422A, R-422D, R-423A,R-426A, R-427A R-507A, and combinations thereof.

6. An apparatus according to claim 1 wherein a refrigerant comprises at least one hydrofluorocarbon selected from the group consisting of trifluoromethane (HFC-23), difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), R-404A, R-407C, R-410A, and combinations thereof.

7. An apparatus according to claim 4 wherein a refrigerant comprises at least one hydrofluorocarbon selected from the group consisting of pentafluoroethane (HFC-125), 1,1,2,2-tetrafluoroethane (HFC-134), 1,1,1,2-tetrafluoroethane (HFC-134a), R-404aA, R-407C, R-410A, and combinations thereof.

8. An apparatus according to claim 1 wherein a refrigerant comprises at least one fluoroolefin selected from the group consisting of:
(i) fluoroolefins of the formula E- or Z—R$^1$CH=CHR$^2$, wherein R$^1$ and R$^2$ are, independently, C$_1$ to C$_6$ perfluoroalkyl groups, and wherein the total number of carbons in the compound is at least 5;
(ii) cyclic fluoroolefins of the formula cyclo-[CX=CY (CZW)$_n$—], wherein X, Y, Z, and W, independently, are H or F, and n is an integer from 2 to 5; and
(iii) fluoroolefins selected from the group consisting of:
2,3,3-trifluoro-1-propene (CHF$_2$CF=CH$_2$);
1,1,2-trifluoro-1-propene (CH$_3$CF=CF$_2$);
1,2,3-trifluoro-1-propene (CH$_2$FCF=CF$_2$);
1,1,3-trifluoro-1-propene (CH$_2$FCH=CF$_2$);
1,3,3-trifluoro-1-propene (CHF$_2$CH=CHF);
1,1,1,2,3,4,4-octafluoro-2-butene (CF$_3$CF=CFCF$_3$);
1,1,2,3,3,4,4,4-octafluoro-1-butene (CF$_3$CF$_2$CF=CF$_2$);
1,1,1,2,4,4,4-heptafluoro-2-butene (CF$_3$CF=CHCF$_3$);
1,2,3,3,4,4,4-heptafluoro-1-butene (CHF=CFCF$_2$CF$_3$);
1,1,1,2,3,4,4-heptafluoro-2-butene (CHF$_2$CF=CFCF$_3$);
1,3,3,3-tetrafluoro-2-(trifluoromethyl)-1-propene ((CF$_3$)$_2$C=CHF);
1,1,3,3,4,4,4-heptafluoro-1-butene (CF$_2$=CHCF$_2$CF$_3$);
1,1,2,3,3,4,4-heptafluoro-1-butene (CF$_2$=CFCHFCF$_3$);
1,1,2,3,4,4,4-heptafluoro-1-butene (CF$_2$=CFCF$_2$CHF$_2$);
2,3,3,4,4,4-hexafluoro-1-butene (CF$_3$CF$_2$CF=CH$_2$);
1,3,3,4,4,4-hexafluoro-1-butene (CHF=CHCF$_2$CF$_3$);
1,2,3,4,4,4-hexafluoro-1-butene (CHF=CFCHFCF$_3$);
1,2,3,3,4,4-hexafluoro-1-butene (CHF=CFCF$_2$CHF$_2$);
1,1,2,3,4,4-hexafluoro-2-butene (CHF$_2$CF=CFCHF$_2$);
1,1,1,2,4,4-hexafluoro-2-butene (CHF$_2$FCF=CFCF$_3$);
1,1,1,2,4,4-hexafluoro-2-butene (CHF$_2$CH=CFCF$_3$);
1,1,1,3,4,4-hexafluoro-2-butene (CF$_3$CH=CFCHF$_2$),
1,1,2,3,3,4-hexafluoro-1-butene (CF$_2$=CFCF$_2$CH$_2$F);
1,1,2,3,4,4-hexafluoro-1-butene (CF$_2$=CFCHFCHF$_2$);
3,3,3-trifluoro-2-(trifluoromethyl)-1-propene (CH$_2$=C(CF$_3$)$_2$);
1,1,1,2,4-pentafluoro-2-butene (CH$_2$FCH=CFCF$_3$);
1,1,1,3,4-pentafluoro-2-butene (CF$_3$CH=CFCH$_2$F),
3,3,4,4,4-pentafluoro-1-butene (CF$_3$CF$_2$CH=CH$_2$);
1,1,1,4,4-pentafluoro-2-butene (CHF$_2$CH=CHCF$_3$);
1,1,1,2,3-pentafluoro-2-butene (CH$_3$CF=CFCF$_3$);
2,3,3,4,4-pentafluoro-1-butene (CH$_2$=CFCF$_2$CHF$_2$);
1,1,2,4,4-pentafluoro-2-butene (CHF$_2$CF=CHCHF$_2$);
1,1,2,3,3-pentafluoro-1-butene (CH$_3$CF$_2$CF=CF$_2$);
1,1,2,3,4-pentafluoro-2-butene (CH$_2$FCF=CFCHF$_2$);
1,1,3,3,3-pentafluoro-2-methyl-1-propene (CF$_2$=C(CF$_3$)(CH$_3$));
2-(difluoromethyl)-3,3,3-trifluoro-1-propene (CH$_2$=C(CHF$_2$)(CF$_3$));
2,3,4,4,4-pentafluoro-1-butene (CH$_2$=CFCHFCF$_3$);
1,2,4,4,4-pentafluoro-1-butene (CHF=CFCH$_2$CF$_3$);
1,3,4,4,4-pentafluoro-1-butene (CHF=CHCHFCF$_3$);
1,3,3,4,4-pentafluoro-1-butene (CHF=CHCF$_2$CHF$_2$);
1,2,3,4,4-pentafluoro-1-butene (CHF=CFCHFCHF$_2$);
3,3,4,4-tetrafluoro-1-butene (CH$_2$=CHCF$_2$CHF$_2$);
1,1-difluoro-2-(difluoromethyl)-1-propene (CF$_2$=C(CHF$_2$)(CH$_3$));
1,3,3,3-tetrafluoro-2-methyl-1-propene (CHF=C(CF$_3$)(CH$_3$));
3,3-difluoro-2-(difluoromethyl)- 1-propene (CH$_2$=C(CHF$_2$)$_2$);
1,1,1,2-tetrafluoro-2-butene (CF$_3$CF=CHCH$_3$),
1,1,1,3-tetrafluoro-2-butene (CH$_3$CF=CHCF$_3$);
1,1,1,2,3,4,4,5,5,5-decafluoro-2-pentene (CF$_3$CF=CFCF$_2$CF$_3$),
1,1,2,3,3,4,4,5,5,5-decafluoro-1-pentene (CF$_2$=CFCF$_2$CF$_2$CF$_3$);
1,1,1,4,4,4-hexafluoro-2-(trifluoromethyl)-2-butene ((CF$_3$)$_2$C=CHCF$_3$);
1,1,1,2,4,4,5,5,5-nonafluoro-2-pentene (CF$_3$CF=CHCF$_2$CF$_3$),
1,1,1,4,4,5,5,5-nonafluoro-2-pentene (CF$_3$CH=CFCF$_2$CF$_3$),
1,2,3,3,4,4,5,5,5-nonafluoro-1-pentene (CHF=CFCF$_2$CF$_2$CF$_3$);
1,1,3,3,4 4,5,5,5-nonafluoro-1-pentene (CF$_2$=CHCF$_2$CF$_2$CF$_3$);
1,1,2,3,3 4,4,5,5-nonafluoro-1-pentene (CF$_2$=CFCF$_2$CF$_2$CHF$_2$);
1,1,2,3,4 4,5,5,5-nonafluoro-2-pentene (CHF$_2$CF=CFCF$_2$CF$_3$);
1,1,1,2,3 4,4,5,5-nonafluoro-2-pentene (CF$_3$CF=CFCF$_2$CHF$_2$),
1,1,1,2,3 4,5,5,5-nonafluoro-2-pentene (CF$_3$CF=CFCHFCF$_3$),
1,2,3,4,4,4-hexafluoro-3-(trifluoromethyl)-1-butene (CHF=CFCF(CF$_3$)$_2$);
1,1,2,4,4,4-hexafluoro-3-(trifluoromethyl)-1-butene (CF$_2$=CFCH(CF$_3$)$_2$);
1,1,1,4,4,4-hexafluoro-2-(trifluoromethyl)-2-butene (CF$_3$CH=C(CF$_3$)$_2$),
1,1,3,4,4,4-hexafluoro-3-(trifluoromethyl)-1-butene (CF$_2$=CHCF(CF$_3$)$_2$);

2,3,3,4,4,5,5,5-octafluoro-1-pentene
  ($CH_2$=$CFCF_2CF_2CF_3$);
1,2,3,3,4,4,5,5-octafluoro-1-pentene
  ($CHF$=$CFCF_2CF_2CHF_2$);
3,3,4,4,4-pentafluoro-2-(trifluoromethyl)-1-butene
  ($CH_2$=$C(CF_3)CF_2CF_3$);
1,1,4,4,4-pentafluoro-3-(trifluoromethyl)-1-butene
  ($CF_2$=$CHCH(CF_3)_2$);
1,3,4,4,4-pentafluoro-3-(trifluoromethyl)-1-butene
  ($CHF$=$CHCF(CF_3)_2$);
1,1,4,4,4-pentafluoro-2-(trifluoromethyl)-1-butene
  ($CF_2$=$C(CF_3)CH_2CF_3$);
3,4,4,4-tetrafluoro-3-(trifluoromethyl)-1-butene (($CF_3)_2CFCH$=$CH_2$);
3,3,4,4,5,5,5-heptafluoro-1-pentene
  ($CF_3CF_2CF_2CH$=$CH_2$);
2,3,3,4,4,5,5-heptafluoro-1-pentene
  ($CH_2$=$CFCF_2CF_2CHF_2$);
1,1,3,3,5,5,5-heptafluoro-1-butene
  ($CF_2$=$CHCF_2CH_2CF_3$);
1,1,1,2,4,4,4-heptafluoro-3-methyl-2-butene ($CF_3CF$=$C(CF_3)(CH_3)$);
2,4,4,4-tetrafluoro-3-(trifluoromethyl)-1-butene
  ($CH_2$=$CFCH(CF_3)_2$);
1,4,4,4-tetrafluoro-3-(trifluoromethyl)-1-butene
  ($CHF$=$CHCH(CF_3)_2$);
1,1,1,4-tetrafluoro-2-(trifluoromethyl)-2-butene
  ($CH_2FCH$=$C(CF_3)_2$);
1,1,1,3-tetrafluoro-2-(trifluoromethyl)-2-butene
  ($CH_3CF$=$C(CF_3)_2$);
1,1,1-trifluoro-2-(trifluoromethyl)-2-butene (($CF_3)_2C$=$CHCH_3$);
3,4,4,5,5,5-hexafluoro-2-pentene ($CF_3CF_2CF$=$CHCH_3$);
1,1,1,4,4,4-hexafluoro-2-methyl-2-butene ($CF_3C(CH_3)$=$CHCF_3$);
3,3,4,5,5,5-hexafluoro-1-pentene
  ($CH_2$=$CHCF_2CHFCF_3$);
4,4,4-trifluoro-3-(trifluoromethyl)-1-butene ($CH_2$=$C(CF_3)CH_2CF_3$);
1,1,2,3,3,4,4,5,5,6,6,6-dodecafluoro-1-hexene ($CF_3(CF_2)_3CF$=$CF_2$);
1,1,1,2,2,3,4,5,5,6,6,6-dodecafluoro-3-hexene
  ($CF_3CF_2CF$=$CFCF_2CF_3$);
1,1,1,4,4,4-hexafluoro-2,3-bis(trifluoromethyl)-2-butene
  (($CF_3)_2C$=$C(CF_3)_2$);
1,1,1,2,3,4,5,5,5-nonafluoro-4-(trifluoromethyl)-2-pentene (($CF_3)_2CFCF$=$CFCF_3$);
1,1,1,4,4,5,5,5-octafluoro-2-(trifluoromethyl)-2-pentene
  (($CF_3)_2C$=$CHC_2F_5$);
1,1,1,3,4,5,5,5-octafluoro-4-(trifluoromethyl)-2-pentene
  (($CF_3)_2CFCF$=$CHCF_3$);
3,3,4,4,5,5,6,6,6-nonafluoro-1-hexene
  ($CF_3CF_2CF_2CF_2CH$=$CH_2$);
4,4,4-trifluoro-3,3-bis(trifluoromethyl)-1-butene
  ($CH_2$=$CHC(CF_3)_3$);
1,1,1,4,4,4-hexafluoro-2-(trifluoromethyl)-3-methyl-2-butene (($CF_3)_2C$-$C(CH_3)(CF_3)$));
2,3,3,5,5,5-hexafluoro-4-(trifluoromethyl)-1-pentene
  ($CH_2$=$CFCF_2CH(CF_3)_2$);
1,1,1,2,4,4,5,5,5-nonafluoro-3-methyl-2-pentene
  ($CF_3CF$=$C(CH_3)CF_2CF_3$);
1,1,1,5,5,5-hexafluoro-4-(trifluoromethyl)-2-pentene
  ($CF_3CH$=$CHCH(CF_3)_2$);
3,4,4,5,5,6,6,6-octafluoro-2-hexene
  ($CF_3CF_2CF_2CF$=$CHCH_3$);
3,3,4,4,5,5,6,6-octafluoro1-hexene
  ($CH_2$=$CHCF_2CF_2CF_2CHF_2$);
1,1,1,4,4-pentafluoro-2-(trifluoromethyl)-2-pentene
  (($CF_3)_2C$=$CHCF_2CH_3$);
4,4,5,5,5-pentafluoro-2-(trifluoromethyl)-1-pentene
  ($CH_2$=$C(CF_3)CH_2C_2F_5$);
3,3,4,4,5,5,5-heptafluoro-2-methyl-1-pentene
  ($CF_3CF_2CF_2C(CH_3)$=$CH_2$);
4,4,5,5,6,6,6-heptafluoro-2-hexene
  ($CF_3CF_2CF_2CH$=$CHCH_3$);
4,4,5,5,6,6,6-heptafluoro-1-hexene
  ($CH_2$=$CHCH_2CF_2C_2F_5$);
1,1,1,2,2,3,4-heptafluoro-3-hexene
  ($CF_3CF_2CF$=$CFC_2H_5$);
4,5,5,5-tetrafluoro-4-(trifluoromethyl)-1-pentene
  ($CH_2$=$CHCH_2CF(CF_3)_2$);
1,1,1,2,5,5,5-heptafluoro-4-methyl-2-pentene
  ($CF_3CF$=$CHCH(CF_3)(CH_3)$);
1,1,1,3-tetrafluoro-2-(trifluoromethyl)-2-pentene (($CF_3)_2C$=$CFC_2H_5$);
1,1,1,2,3,4,4,5,5,6,6,7,7,7-tetradecafluoro-2-heptene
  ($CF_3CF$=$CFCF_2CF_2C_2F_5$);
1,1,1,2,2,3,4,5,5,6,6,7,7,7-tetradecafluoro-3-heptene
  ($CF_3CF_2CF$=$CFCF_2C_2F_5$);
1,1,1,3,4,4,5,5,6,6,7,7,7-tridecafluoro-2-heptene
  ($CF_3CH$=$CFCF_2CF_2C_2F_5$);
1,1,1,2,4,4,5,5,6,6,7,7,7-tridecafluoro-2-heptene
  ($CF_3CF$=$CHCF_2CF_2C_2F_5$);
1,1,1,2,2,4,5,5,6,6,7,7,7-tridecafluoro-3-heptene
  ($CF_3CF_2CH$=$CFCF_2C_2F_5$);
1,1,1,2,2,3,5,5,6,6,7,7,7-tridecafluoro-3-heptene
  ($CF_3CF_2CF$=$CHCF_2C_2F_5$);
$CF_2$=$CFOCF_2CF_3$(PEVE) and
$CF_2$=$CFOCF_3$(PMVE).

9. An apparatus according to claim 1 wherein a refrigerant comprises
  (a) pentafluoroethane (R-125), 1,1,1,2-tetrafluoroethane (R-134a), and at least two hydrocarbons each having eight or fewer carbon atoms, or
  (b) pentafluoroethane (R-125), 1,1,1,2-tetrafluoroethane (R-134a), n-butane (R-600) and n-pentane (R-601).

10. An apparatus according to claim 1 wherein a refrigerant is selected from the group consisting of $CHClF_2$ (R-22), $CHF_3$ (R-23), $CH_2F_2$ (R-32), $CH_3F$ (R-41), $CHF_2CF_3$ (R-125), $CH_2FCF_3$ (R-134a), $CHF_2OCHF_2$ (E-134), $CH_3CClF_2$ (R-142b), $CH_3CF_3$(R-143a), $CH_3CHF_2$ (R-152a), $CH_3CH_2F$ (R-161), $CH_3OCH_3$ (E170), $CF_3CF_2CF_3$(R-218), $CF_3CHFCF_3$ (R-227ea), $CF_3CH_2CF_3$ (R-236fa), $CH_2FCF_2CHF_2$ (R-245ca), $CHF_2CH_2CF_3$(R-245fa), $CH_3CH_2CH_3$(R-290), $CH_3CH_2CH_2CH_3$(R-600), $CH(CH_3)_2CH_3$ (R-600a), $CH_3CH_2CH_2CH_2CH_3$ (R-601), $(CH_3)2CHCH_2CH_3$(R-601a), $CH_3CH_2OCH_2CH_3$(R-610), $NH_3$, $CO_2$, $CH_3CH$=$CH_2$.

11. An apparatus according to claim 1 that is fabricated as a refrigerator, a freezer, an ice machine, an air conditioner, an industrial cooling system, heater or heat pump.

12. An apparatus for temperature adjustment comprising
  (a) a mechanical compressor that increases the pressure of the vapor of at least one refrigerant;
  (b) a condenser that receives refrigerant vapor that is passed out of the compressor, and condenses the vapor under pressure to a liquid;
  (c) a pressure reduction device that receives liquid refrigerant that is passed out of the condenser, and reduces the pressure of the liquid to form a mixture of refrigerant in liquid and vapor form;
  (d) an evaporator that receives the mixture of liquid and vapor refrigerant that is passed out of the pressure reduction device, and evaporates the remaining liquid in the mixture to form refrigerant vapor; and (e) a conduit that returns to the compressor refrigerant vapor that is passed out of the evaporator;

wherein a refrigerant is admixed with at least one ionic liquid; and wherein an ionic liquid is selected from one or more members of the group consisting of 1-butyl-3-methylimidazolium hexafluorophosphate [bmim][PF6], 1-butyl-3-methylimidazolium tetrafluoroborate [bmim][BF4], 1,2-dimethyl-3propylimidazolium tris(trifluoromethylsuflonyl)methide [dmpim][TMeM], 3-methyl-1-propylpyridinium bis(trifluoromethylsulfonyl)imide [pmpy][BMeI], 1-ethyl-3-methylimidazolium bis(trifluoroethylsulfonyl)imide [emim][BMeI], 1-ethyl-3-methylimidazolium bis(pentafluoroethylsulfonyl)imide [emim][BEI], 1-butyl-3-methylimidazolium 1,1,2,3,3,3,-hexafluoropropanesulfonate [bmim][HFPS], 1-butyl-3-methylimidazolium 1,1,2-trifluoro-2-(perfluoroethoxy)ethanesulfonate [bmim][TPES], 1-butyl-3-methylimidazolium 1,1,2-trifluoro-2-(trifluoromethoxy)ethanesulfonate [bmim][TTES], tetradecyl(trihexyl) phosphonium 1,1,2-trifluoro-2-(perfluoroethoxy) ethanesulfonate [6,6,6,14-P][TPES], and tributyl(tetradecyl)phosphonium 1,1,2,3,3,3-hexafluoropropanesulfonate [4,4,4,14-P][HFPS].

13. A process for adjusting the temperature of an object, medium or a space comprising (a) providing a mechanical device having moving parts to increase the pressure of the vapor of at least one refrigerant, and providing at least one ionic liquid to lubricate the moving parts of the device;

(b) condensing the refrigerant vapor under pressure to a liquid;

(c) reducing the pressure of the liquid refrigerant to form a mixture of refrigerant in liquid and vapor form;

(d) evaporating the liquid refrigerant to form refrigerant vapor; and (e) repeating step (a) to increase the pressure of the refrigerant vapor formed in steps (c) and (d);

wherein an ionic liquid is selected from one or more members of the group consisting of 1-butyl-3-methylimidazolium hexafluorophosphate [bmim][PF6], 1-butyl-3-methylimidazolium tetrafluoroborate [bmim][BF4], 1,2-dimethyl-3-propylimidazolium tris(trifluoromethyl-suflonyl)methide [dmpim][TMeM], 3-methyl-1-propylpyridinium bis(trifluoromethylsulfonyl)imide [pmpy][BMeI], 1-ethyl-3-methylimidazolium bis(trifluoroethylsulfonyl)imide [emim][BMeI], 1-ethyl-3-methylimidazolium bis(pentafluoroethylsulfonyl)imide [emim][BEI], 1-butyl-3-methylimidazolium 1,1,2,3,3,3-hexafluoropropanesulfonate [bmim][HFPS], 1-butyl-3-methylimidazolium 1,1,2-trifluoro-2-(perfluoroethoxy)ethanesulfonate [bmim][TPES], 1-butyl-3-methylimidazolium 1,1,2-trifluoro-2-(trifluoromethoxy)ethanesulfonate [bmim][TTES], tetradecyl(trihexyl) phosphonium 1,1,2-trifluoro-2-(perfluoroethoxy) ethanesulfonate [6,6,6,14-P][TPES], and tributyl(tetradecyl)phosphonium 1,1,2,3,3,3-hexafluoropropanesulfonate [4,4,4,14-P][HFPS].

14. A process for adjusting the temperature of an object, medium or a space comprising (a) providing a mechanical device having moving parts to increase the pressure of the vapor of at least one refrigerant;

(b) condensing the refrigerant vapor under pressure to a liquid;

(c) reducing the pressure of the liquid refrigerant to form a mixture of refrigerant in liquid and vapor form;

(d) evaporating the liquid refrigerant to form refrigerant vapor;

(e) separating from the refrigerant vapor any ionic liquid present therein; and (f) repeating step (a) to increase the pressure of the refrigerant vapor formed in steps (c) and (d);

wherein an ionic liquid is selected from one or more members of the group consisting of 1-butyl-3-methylimidazolium hexafluorophosphate [bmim][PF6], 1-butyl-3-methylimidazolium tetrafluoroborate [bmim][BF4], 1,2-dimethyl-3-propylimidazolium tris(trifluoromethyl-suflonyl)methide [dmpim][TMeM], 3-methyl-1-propylpyridinium bis(trifluoromethylsulfonyl)imide [pmpy][BMeI], 1-ethyl-3-methylimidazolium bis(trifluoroethylsulfonyl)imide [emim][BMeI], 1-ethyl-3-methylimidazolium bis(pentafluoroethylsulfonyl)imide [emim][BEI], 1-butyl-3-methylimidazolium 1,1,2,3,3,3-hexafluoropropanesulfonate [bmim][HFPS].

1-butyl-3-methylimidazolium 1,1,2-trifluoro-2-(perfluoroethoxy)ethanesulfonate [bmim][TPES], 1-butyl-3-methylimidazolium 1,1,2-trifluoro-2-(trifluoromethoxy)ethanesulfonate [bmim][TTES], tetradecyl(trihexyl) phosphonium 1,1,2-trifluoro-2-(perfluoroethoxy)ethanesulfonate [6,6,6,14-P][TPES], and tributyl(tetradecyl)phosphonium 1,1,2,3,3,3-hexafluoropropanesulfonate [4,4,4,14-P][HFPS].

15. An apparatus according to claim 1 wherein an ionic liquid is selected from one or more members of the group consisting of 1-butyl-3-methylimidazolium hexafluorophosphate [bmim][PF6], 1-ethyl-3-methylimidazolium bis(pentafluoroethylsulfonyl)imide [emim][BEI], 1-butyl-3-methylimidazolium 1,1,2,3,3,3-hexafluoropropanesulfonate [bmim][HFPS], 1-butyl-3-methylimidazolium 1,1,2-trifluoro-2-(perfluoroethoxy)ethanesulfonate [bmim][TPES], 1-butyl-3-methylimidazolium 1,1,2-trifluoro-2-(trifluoromethoxy)ethanesulfonate [bmim][TPES], tetradecyl(trihexyl) phosphonium 1,1,2-trifluoro-2-(perfluoroethoxy) ethanesulfonate [6,6,6,14-P][TPES], and tributyl(tetradecyl)phosphonium 1,1,2,3,3,3-hexafluoropropanesulfonate [4,4,4,14-P][HFPS].

16. An apparatus according to claim 12 wherein an ionic liquid is selected from one or more members of the group consisting of 1-butyl-3-methylimidazolium hexafluorophosphate [bmim][PF6], 1-ethyl-3-methylimidazolium bis(pentafluoroethylsulfonyl)imide [emim][BEI], 1-butyl-3-methylimidazolium 1,1,2,3,3,3-hexafluoropropanesulfonate [bmim][HFPS], 1-butyl-3-methylimidazolium 1,1,2-trifluoro-2-(perfluoroethoxy)ethanesulfonate [bmim][TPES],
1-butyl-3-methylimidazolium 1,1,2-trifluoro-2-(trifluoromethoxy)ethanesulfonate [bmim][TTES],
tetradecyl(trihexyl) phosphonium 1,1,2-trifluoro-2-(perfluoroethoxy) ethanesulfonate [6,6,6,14-P][TPES], and
tributyl(tetradecyl)phosphonium 1,1,2,3,3,3-hexafluoropropanesulfonate [4,4,4,14-P][HFPS].

17. A process according to claim 13 wherein an ionic liquid is selected from one or more members of the group consisting of 1-butyl-3-methylimidazolium hexafluorophosphate [bmim][PF6],
1-ethyl-3-methylimidazolium bis(pentafluoroethylsulfonyl)imide [emim][BEI],
1-butyl-3-methylimidazolium 1,1,2,3,3,3-hexafluoropropanesulfonate [bmim][HFPS],
1-butyl-3-methylimidazolium 1,1,2-trifluoro-2-(perfluoroethoxy)ethanesulfonate [bmim][TPES],
1-butyl-3-methylimidazolium 1,1,2-trifluoro-2-(trifluoromethoxy)ethanesulfonate [bmim][TTES],
tetradecyl(trihexyl) phosphonium 1,1,2-trifluoro-2-(perfluoroethoxy) ethanesulfonate [6,6,6,14-P][TPES], and
tributyl(tetradecyl)phosphonium 1,1,2,3,3,3-hexafluoropropanesulfonate [4,4,4,14-P][HFPS].

18. A process according to claim 14 wherein an ionic liquid is selected from one or more members of the group consisting of 1-butyl-3-methylimidazolium hexafluorophosphate [bmim][PF6],
1-ethyl-3-methylimidazolium bis(pentafluoroethylsulfonyl)imide [emim][BEI],
1-butyl-3-methylimidazolium 1,1,2,3,3,3-hexafluoropropanesulfonate [bmim][HFPS],
1-butyl-3-methylimidazolium 1,1,2-trifluoro-2-(perfluoroethoxy)ethanesulfonate [bmim][TPES],
1-butyl-3-methylimidazolium 1,1,2-trifluoro-2-(trifluoromethoxy)ethanesulfonate [bmim][TTES],
tetradecyl(trihexyl) phosphonium 1,1,2-trifluoro-2-(perfluoroethoxy) ethanesulfonate [6,6,6,14-P][TPES], and
tributyl(tetradecyl)phosphonium 1,1,2,3,3,3-hexafluoropropanesulfonate [4,4,4,14-P][HFPS].

* * * * *